US012666275B2

(12) United States Patent
Yu et al.

(10) Patent No.: US 12,666,275 B2
(45) Date of Patent: Jun. 23, 2026

(54) METHOD AND DEVICE FOR MULTI-ENTITY CONDITIONAL CONFIGURATION IN WIRELESS COMMUNICATIONS

(71) Applicant: Apogee 5G Global, LLC, Plano, TX (US)

(72) Inventors: Qiaoling Yu, Shanghai (CN); Xiaobo Zhang, Shanghai (CN)

(73) Assignee: APOGEE 5G GLOBAL, LLC, Plano, TX (US)

( * ) Notice: Subject to any disclaimer, the term of this patent is extended or adjusted under 35 U.S.C. 154(b) by 366 days.

(21) Appl. No.: 18/200,551

(22) Filed: May 22, 2023

(65) Prior Publication Data

US 2023/0300637 A1 Sep. 21, 2023

Related U.S. Application Data

(63) Continuation of application No. PCT/CN2021/132049, filed on Nov. 22, 2021.

(30) Foreign Application Priority Data

| | | |
|---|---|---|
| Nov. 23, 2020 | (CN) | 202011321196.6 |
| Nov. 26, 2020 | (CN) | 202011347620.4 |
| Dec. 10, 2020 | (CN) | 202011433041.1 |

(51) Int. Cl.
H04W 24/02 (2009.01)
H04W 24/10 (2009.01)

(52) U.S. Cl.
CPC ........... *H04W 24/02* (2013.01); *H04W 24/10* (2013.01)

(58) Field of Classification Search
CPC .............................. H04W 25/02; H04W 24/10
See application file for complete search history.

(56) References Cited

U.S. PATENT DOCUMENTS

| | | | |
|---|---|---|---|
| 2015/0358846 A1* | 12/2015 | Wu | H04W 24/08 |
| | | | 370/252 |
| 2018/0279193 A1 | 9/2018 | Park et al. | |

(Continued)

FOREIGN PATENT DOCUMENTS

| | | |
|---|---|---|
| CN | 110896546 A | 3/2020 |
| CN | 110933725 A | 3/2020 |

(Continued)

OTHER PUBLICATIONS

Extended European search report of the patent application No. 21894057.5 dated Apr. 22, 2024.

(Continued)

*Primary Examiner* — Siming Liu
(74) *Attorney, Agent, or Firm* — Volpe Koenig

(57) ABSTRACT

The present application discloses a method and a device in a communication node used for wireless communications. A communication node receives a first signaling; the first signaling being used to determine a first measurement configuration set, the first measurement configuration set being associated with a first index; and receives a second signaling, the second signaling being used to determine a first conditional configuration set, the first conditional configuration set comprising the first index; when the first conditional configuration set comes from a first entity, performs a measurement according to the first measurement configuration set; when the first conditional configuration set comes from a second entity, performs a measurement according to a second measurement configuration set. The present application can support simultaneous CPC configurations by both MN and SN.

16 Claims, 8 Drawing Sheets

100A

First node receiving first signaling; the first signaling being used to determine first measurement configuration set, the first measurement configuration set being associated with first index → 101A receiving second signaling, the second signaling being used to determine first conditional configuration set, the first conditional configuration set comprising the first index → 102A when the first conditional configuration set comes from first entity, performing a measurement according to the first measurement configuration set; when the first conditional configuration set comes from second entity, performing a measurement according to second measurement configuration set → 103A

(56) References Cited

U.S. PATENT DOCUMENTS

| | | | |
|---|---|---|---|
| 2019/0254042 A1 | 8/2019 | Cirik | |
| 2020/0260300 A1 | 8/2020 | Cirik et al. | |
| 2023/0217329 A1* | 7/2023 | Wallentin .......... | H04W 36/0058 |
| | | | 370/331 |

FOREIGN PATENT DOCUMENTS

| | | |
|---|---|---|
| CN | 111278122 A | 6/2020 |
| CN | 111447636 A | 7/2020 |
| CN | 111615141 A | 9/2020 |
| CN | 111970101 A | 11/2020 |
| CN | 113950163 A | 1/2022 |
| WO | 2019162904 A1 | 8/2019 |

OTHER PUBLICATIONS

First Office Action of Chinese patent application No. CN202011321196.6 dated Feb. 1, 2024.
First Search Report of Chinese patent application No. CN202011321196.6 dated Jan. 31, 2024.
First Office Action of Chinese patent application No. CN202011433041.1 dated Nov. 3, 2022.
First Search Report of Chinese patent application No. CN202011433041.1 dated Oct. 26, 2022.
Notification to Grant Patent Right for Invention of Chinese patent application No. CN202011433041.1 dated Feb. 23, 2023.
ISR received in application No. PCT/CN2021/132049 dated Feb. 14, 2022.
ZTE Corporation, Sanechips Discussion on conditional PSCell addition/change 3GPP TSG-RAN WG2 Meeting #112 electronic R2-2009379 Oct. 23, 2020.
Nokia, Nokia Shanghai Bell On Rel-17 Conditional PSCell Addition and Change (CPAC) 3GPP TSG-RAN WG2 Meeting #112 Electronic R2-2009771 Oct. 22, 2020.
NEC Framework of Inter-SN Conditional PSCell change 3GPP TSG-RAN WG2 #112e R2-2009816 Oct. 23, 2020.
Third Generation Partnership Project, "Technical Specification Group Radio Access Network; Evolved Universal Terrestrial Radio Access (E-UTRA) and NR; Multi-connectivity; Stage 2 (Release 16)," 3GPP TS 37.340 V16.3.D (Sep. 2020).
Third Generation Partnership Project, "Technical Specification Group Radio Access Network; NR; Multiplexing and channel coding (Release 16)," 3GPP TS 38.212 V16.3.0 (Sep. 2020).
Third Generation Partnership Project, "Technical Specification Group Radio Access Network; NR; Physical layer procedures for control (Release 16)," 3GPP TS 38.213 V16.3.0 (Sep. 2020).
Third Generation Partnership Project, "Technical Specification Group Radio Access Network; NR; Physical layer procedures for data (Release 16)," 3GPP TS 38.214 V16.3.0 (Sep. 2020).
Third Generation Partnership Project, "Technical Specification Group Radio Access Network; NR; NR and NG-RAN Overall Description; Stage 2 (Release 16)," 3GPP TS 38.300 V16.3.0 (Sep. 2020).
Third Generation Partnership Project, "Technical Specification Group Radio Access Network; NR; Requirements for support of radio resource management (Release 16)," 3GPP TS 38.133 V16.5.0 (Sep. 2020).
Third Generation Partnership Project, "Technical Specification Group Radio Access Network; NR; Medium Access Control (MAC) protocol specification (Release 16)," 3GPP TS 38.321 V16.2.1 (Sep. 2020).
Third Generation Partnership Project, "Technical Specification Group Radio Access Network; NR; Radio Resource Control (RRC) protocol specification (Release 16)," 3GPP TS 38.331 V16.2.0 (Sep. 2020).
VIVO, "Discussion on MTRP multi-beam enhancement," 3GPP TSG RAN WG1 #102-e, R1-2005366, e-Meeting, (Aug. 17-28, 2020).

* cited by examiner

100A

100B

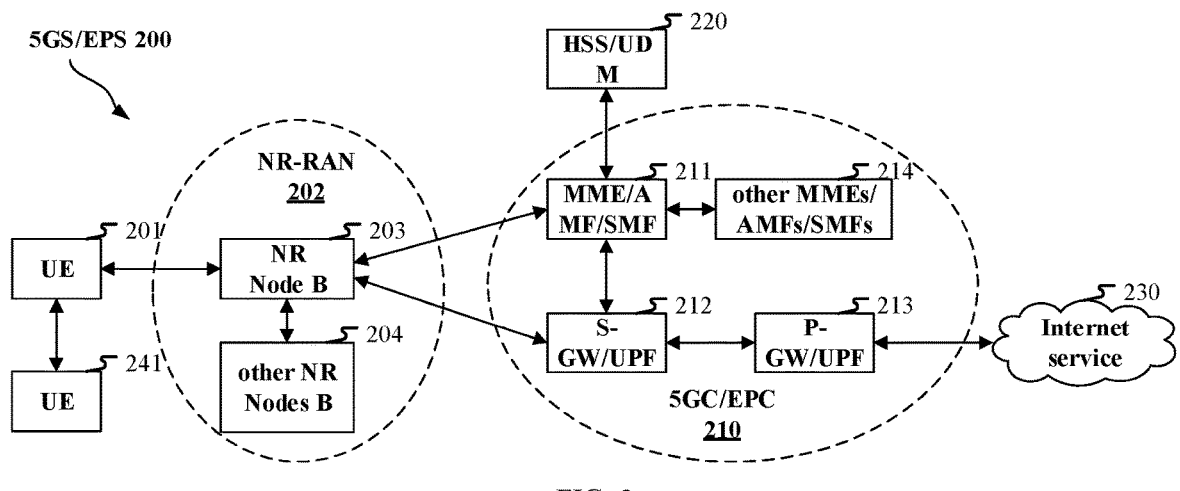
FIG. 2
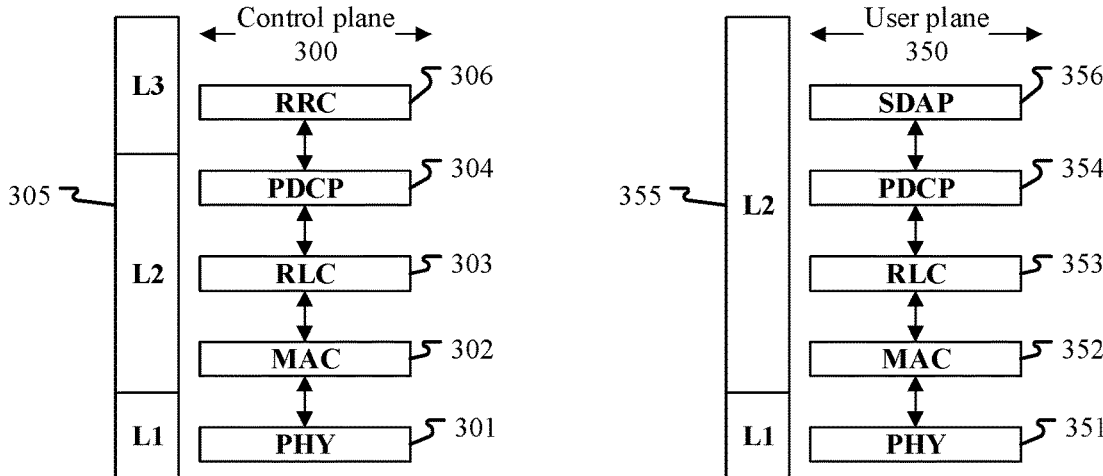
FIG. 3
FIG. 4

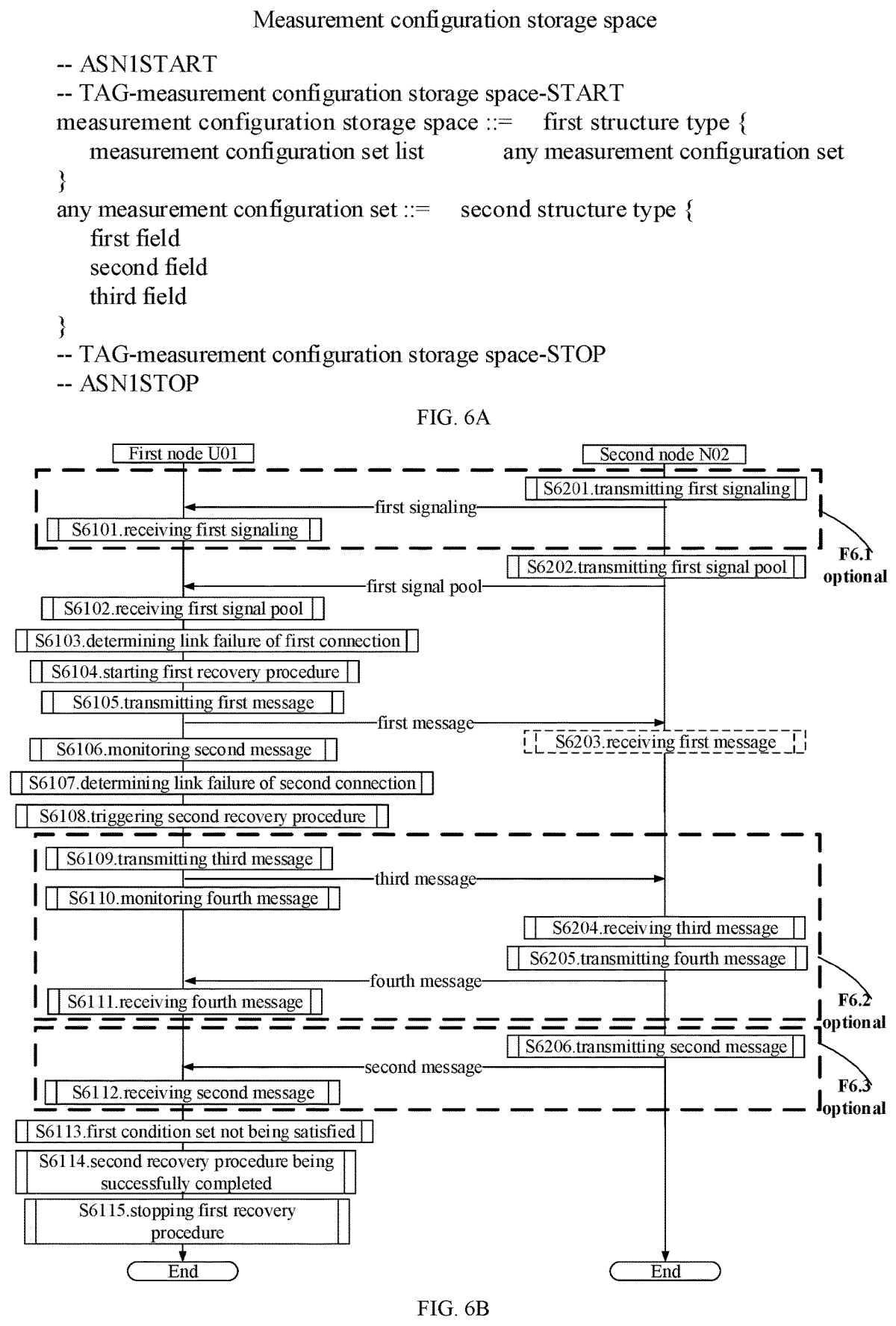

Measurement configuration storage space

-- ASN1START
-- TAG-measurement configuration storage space-START
measurement configuration storage space ::=    first structure type {
    measurement configuration set list        any measurement configuration set
}
any measurement configuration set ::=    second structure type {
    first field
    second field
    third field
}
-- TAG-measurement configuration storage space-STOP
-- ASN1STOP

FIG. 6A

| First node U01 | | Second node N02 |

S6201.transmitting first signaling first signaling

S6101.receiving first signaling

F6.1 optional

S6202.transmitting first signal pool first signal pool

S6102.receiving first signal pool

S6103.determining link failure of first connection

S6104.starting first recovery procedure

S6105.transmitting first message first message

S6203.receiving first message

S6106.monitoring second message

S6107.determining link failure of second connection

S6108.triggering second recovery procedure

S6109.transmitting third message third message

S6110.monitoring fourth message

S6204.receiving third message

S6205.transmitting fourth message fourth message

S6111.receiving fourth message

F6.2 optional

S6206.transmitting second message second message

S6112.receiving second message

F6.3 optional

S6113.first condition set not being satisfied

S6114.second recovery procedure being successfully completed

S6115.stopping first recovery procedure

End       End

FIG. 6B

Conditional configuration storage space

```
-- ASN1START
-- TAG-conditional configuration storage space-START
conditional configuration storage space ::=    first structure type {
    conditional configuration set list        any conditional configuration set
}
any conditional configuration set ::=    second structure type {
    sixth field
    seventh field
}
-- TAG-conditional configuration storage space-STOP
-- ASN1STOP
```

FIG. 7A

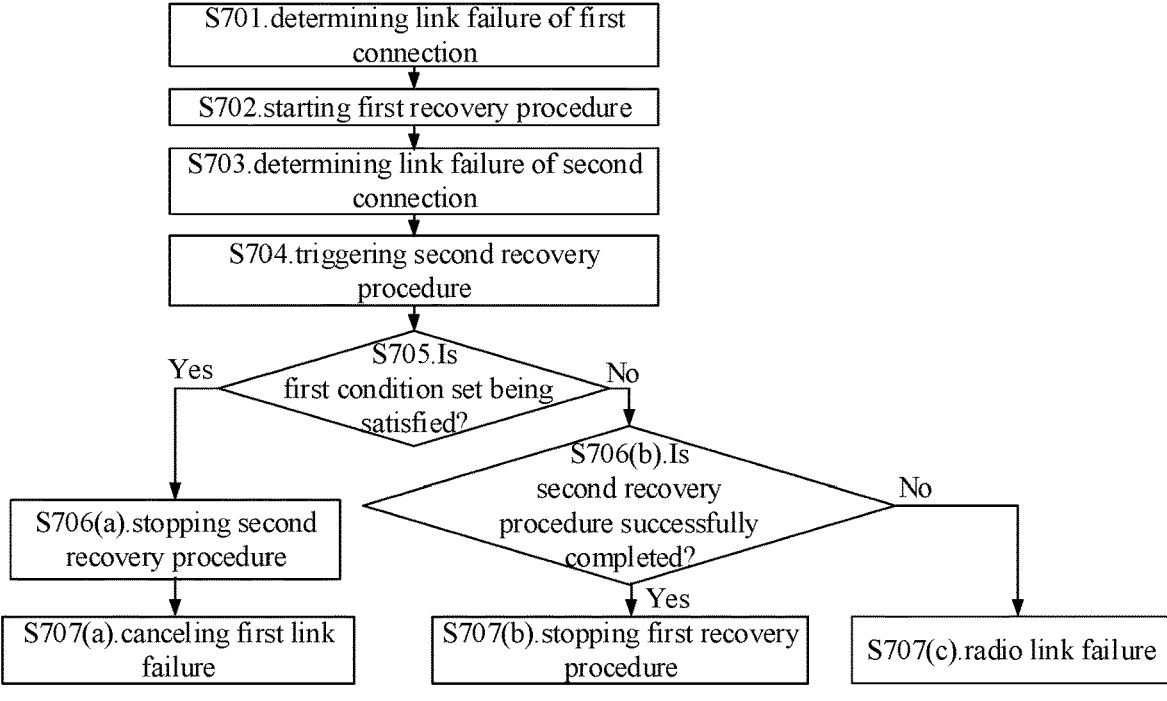

FIG. 7B

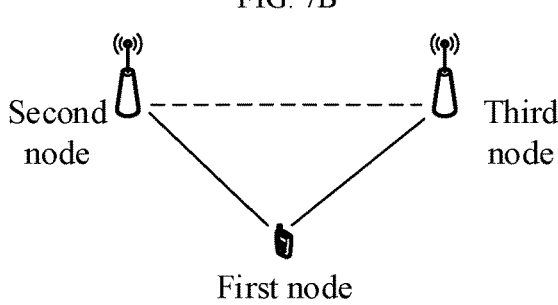

First node

FIG. 8A

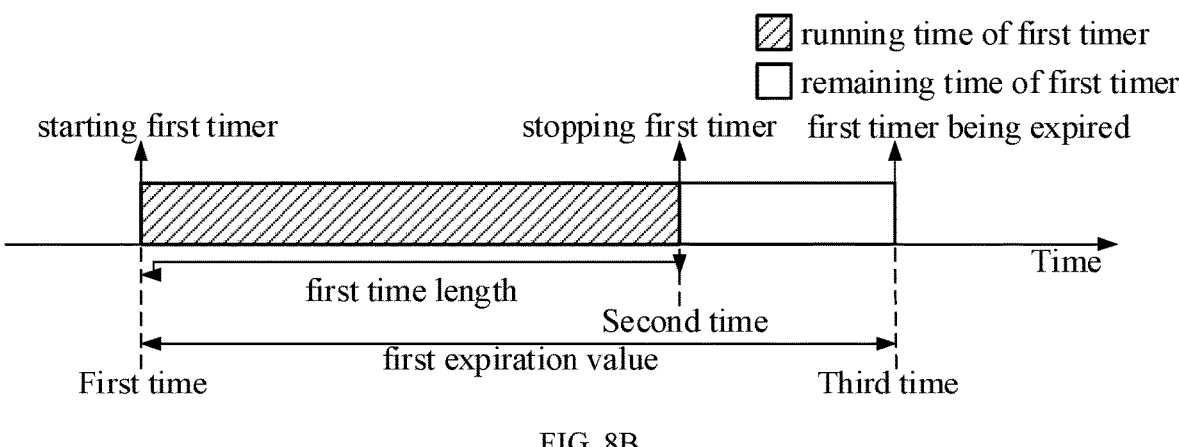

☒ running time of first timer
☐ remaining time of first timer starting first timer          stopping first timer    first timer being expired first time length Second time first expiration value First time                                                    Third time

FIG. 8B

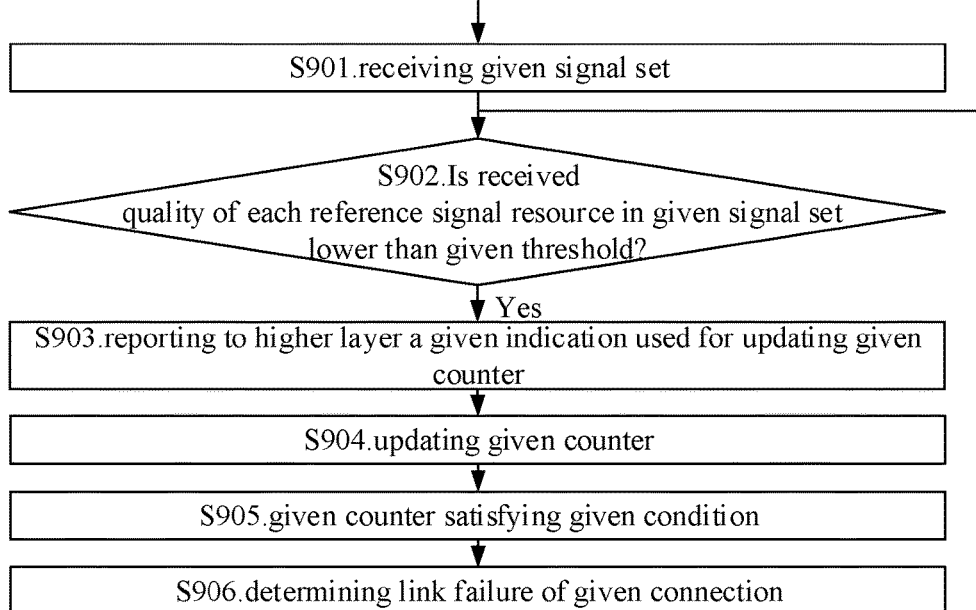

First receiver 901      First node

First transceiver 902

First transmitter 903

FIG. 9A

S901.receiving given signal set

S902.Is received quality of each reference signal resource in given signal set lower than given threshold?

Yes

S903.reporting to higher layer a given indication used for updating given counter S904.updating given counter S905.given counter satisfying given condition S906.determining link failure of given connection

FIG. 9B

1000
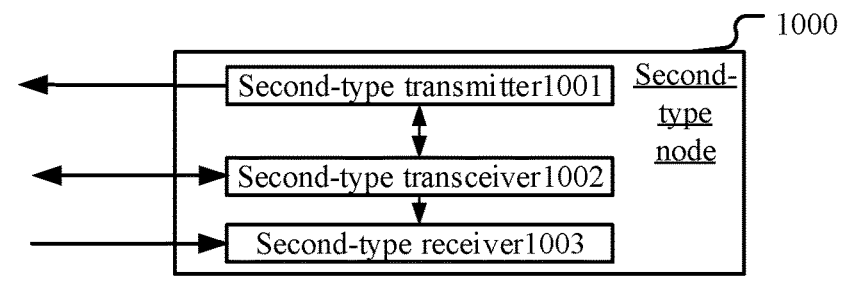
FIG. 10A
First condition set $\xrightarrow{\text{comprising}}$ Second reference signal resource belonging to first resource pool
FIG. 10B
1100
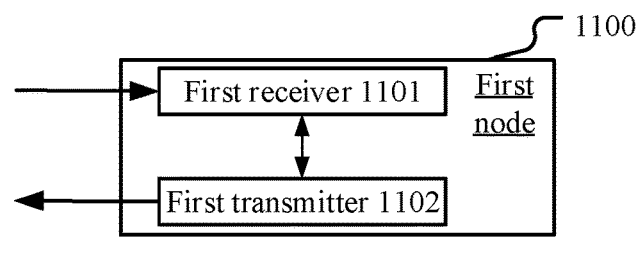
FIG. 11
1200
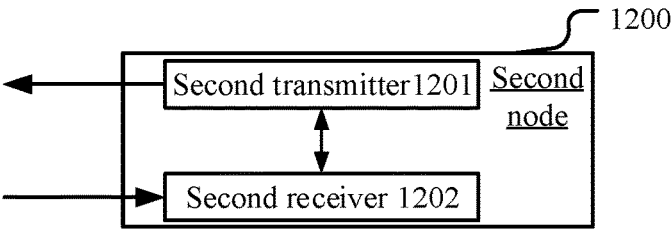
FIG. 12
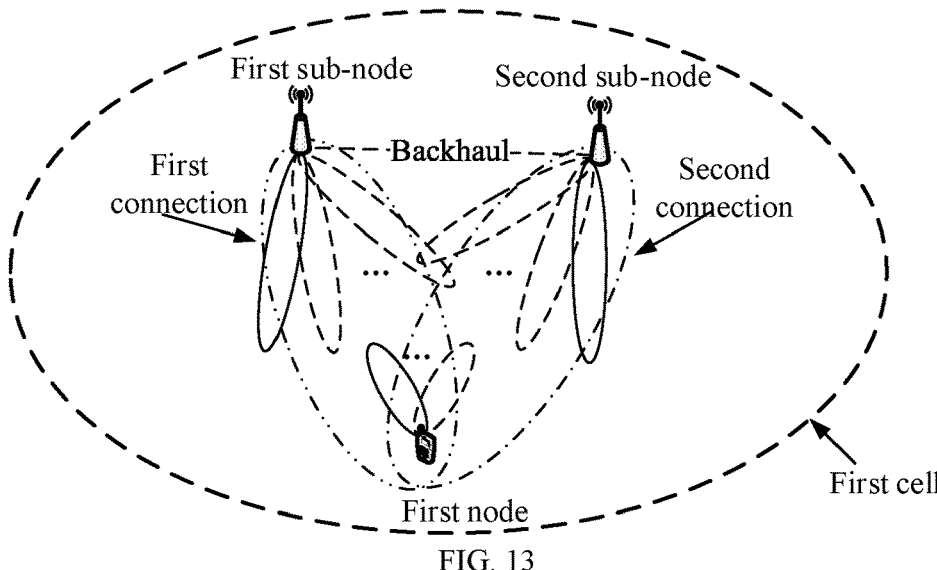
FIG. 13

METHOD AND DEVICE FOR MULTI-ENTITY CONDITIONAL CONFIGURATION IN WIRELESS COMMUNICATIONS

CROSS REFERENCE TO RELATED APPLICATIONS

This application is the continuation of the international patent application No. PCT/CN2021/132049, filed on Nov. 22, 2021, and claims the priority benefit of Chinese Patent Application No. 202011321196.6, filed on Nov. 23, 2020, and claims the priority benefit of Chinese Patent Application No. 202011347620.4, filed on Nov. 26, 2020, and claims the priority benefit of Chinese Patent Application No. 202011433041.1, filed on Dec. 10, 2020, the full disclosure of which is incorporated herein by reference.

BACKGROUND

Technical Field

The present application relates to transmission methods and devices in wireless communication systems, and in particular to a method and a device for multi-connection or multi-TRP transmission.

Related Art

During the formulation of the 3rd Generation Partnership Project (3GPP) Release 16, the mobility enhancement in New Radio (NR) and Long Term Evolution (LTE) has been accomplished for the purpose of reducing data transmission interruptions within handover as well as enhancing the robustness of handover. And for the Work Item (WI) of enhanced Dual Connection and Carrier Aggregation (eDCCA) and Mobility Enhancement, discussions are focused on Conditional PSCell (i.e., Primary SCG Cell) Addition/Change (CPAC) but the conclusion has not yet been reached due to the time limit. At the RAN 86 conference a WI of "further enhancement on Multi-Radio Dual-Connectivity (MR-DC)" in Release 17 has been approved to promote studies on CPAC and provide support to more scenarios not mentioned in Release 16.

For Beam Management (BM), the 3GPP introduces a mechanism of Beam Failure Recovery (BFR) for the Special Cell (SpCell) in Release 15 (R15), and then a BFR mechanism for Secondary Cell (SCell) is introduced in R16. With the BFR mechanism, the Radio Link Failure (RLF) in any higher layer can be avoided. A Work Item (WI) of "Further enhancements on Multiple Input Multiple Output (MIMO) for NR" has been decided at the 3GPP Radio Access Network (RAN) #80 conference to be conducted for enhancing the Multiple-Transmitter- and Receiver-Point (multi-TRP) BFR mechanism.

SUMMARY

Both a Master Node (MN) and a Secondary Node (SN) can initiate a Conditional PSCell Change (CPC), for which the Execution Condition is up to either the MN or the SN to decide. A User Equipment (UE) maintains two measurement configuration storage spaces respectively associated with the MN and the SN. Due to the time limit, the 3GPP Release 16 is designed only targeting CPC initiated by the SN and not joined by the MN. How to select a corresponding measurement configuration when both the SN and MN are configuring for CPC still remains unsolved.

To address the above problem, the present application provides a solution. In view of the description of the above problem, the scenario of Terrestrial Network (TN) has been taken as an example; the present application is also applicable to scenarios such as Non-Terrestrial Network (NTN), and V2X, where technical effects similar to TN scenario can be achieved. Additionally, the adoption of a unified solution for various scenarios contributes to the reduction of hardcore complexity and costs.

The BFR mechanism in the current protocols is cell-level, when it comes to multi-TRP BFR, a practicable scheme is to configure an independent BFR procedure per TRP in a cell, which is to define a TRP-level BFR, therefore, when the UE simultaneously supports cell-level BFR and TRP-level BFR, the combined designing of cell-level BFR and TRP-level BFR shall be enhanced.

To address the above problem, the present application provides a solution. The description above only took Massive Multiple Input Multiple Output (MIMO) and beam-based communication scenarios for example; this disclosure is also applicable to scenarios with Long Term Evolution (LTE) multi-antenna system, where technical effects similar to those in Massive MIMO and beam-based communications can be achieved. Additionally, the adoption of a unified solution for various scenarios contributes to the reduction of hardcore complexity and costs.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:

receiving a first signaling, the first signaling being used to determine a first measurement configuration set, the first measurement configuration set being associated with a first index; receiving a second signaling, the second signaling being used to determine a first conditional configuration set, the first conditional configuration set comprising the first index; when the first conditional configuration set comes from a first entity, performing a measurement according to the first measurement configuration set; when the first conditional configuration set comes from a second entity, performing a measurement according to a second measurement configuration set;

herein, the first measurement configuration set is a measurement configuration set in a first measurement configuration storage space, the first measurement configuration storage space comprising at least one measurement configuration set; the first index is a non-negative integer; the first measurement configuration set and the second measurement configuration set are different.

In one embodiment, the second measurement configuration set is associated with a first index.

In one subembodiment, the phrase that the second measurement configuration set is associated with a first index comprises that: the second measurement configuration set comprises the first index.

In one subembodiment, the phrase that the second measurement configuration set is associated with a first index comprises that: the second measurement configuration set is identified by the first index.

In one embodiment, the second measurement configuration set comprises the second index, the second index being associated with the first index.

According to one aspect of the present application, characterized in comprising:

the first index indicating that the first conditional configuration set comes from the first entity or comes from the second entity.

In one embodiment, the first index coming from the first entity indicates that the first conditional configuration set comes from the first entity.

In one subembodiment, the phrase of the first index coming from the first entity comprises that: the first index is an index in a first index set, the first index set coming from the first entity; the first index set comprises at least one index, and any index in the first index set is a non-negative integer.

In one embodiment, the first index coming from the second entity indicates that the first conditional configuration set comes from the second entity.

In one subembodiment, the phrase of the first index coming from the second entity comprises that: the first index is an index in a second index set, the second index set coming from the second entity; the second index set comprises at least one index, and any index in the first index set is a non-negative integer.

In one embodiment, the second measurement configuration set is a measurement configuration set in the first measurement configuration storage space.

In one subembodiment, the phrase that the first measurement configuration set and the second measurement configuration set are different comprises that: fields in the first measurement configuration set and the second measurement configuration set are totally different or partially different.

According to another aspect of the present application, characterized in comprising:

the first conditional configuration set comprises an eighth field, the eighth field indicating that the first conditional configuration set comes from the first entity or comes from the second entity.

In one embodiment, the phrase of coming from a first entity in the present application comprises: being associated with the first entity.

In one embodiment, the phrase of coming from a first entity in the present application comprises: being received via an SRB1.

In one embodiment, the phrase of coming from a second entity in the present application comprises: being associated with the second entity.

In one embodiment, the phrase of coming from a second entity in the present application comprises: being received via an SRB3.

According to another aspect of the present application, characterized in comprising:

the second measurement configuration set being associated with the first index.

In one subembodiment, the phrase that the second measurement configuration set is associated with a first index comprises that: the second measurement configuration set comprises the first index.

In one subembodiment, the phrase that the second measurement configuration set is associated with a first index comprises that: the second measurement configuration set is identified by the first index.

In one embodiment, the second measurement configuration set comprises the second index, the second index being associated with the first index.

The present application provides a method in a second-type node for wireless communications, comprising:

transmitting a first signaling, the first signaling being used to determine a first measurement configuration set, the first measurement configuration set being associated with a first index; and transmitting a second signaling, the second signaling being used to determine a first conditional configuration set, the first conditional configuration set comprising the first index;

herein, the first measurement configuration set is a measurement configuration set in a first measurement configuration storage space, the first measurement configuration storage space comprising at least one measurement configuration set; the first index is a non-negative integer; when the first conditional configuration set comes from a first entity, a measurement is performed according to the first measurement configuration set; when the first conditional configuration set comes from a second entity, a measurement is performed according to a second measurement configuration set; the first measurement configuration set and the second measurement configuration set are different.

The present application provides a first node for wireless communications, comprising:

a first receiver, receiving a first signaling, the first signaling being used to determine a first measurement configuration set, the first measurement configuration set being associated with a first index;

receiving a second signaling, the second signaling being used to determine a first conditional configuration set, the first conditional configuration set comprising the first index; when the first conditional configuration set comes from a first entity, performing a measurement according to the first measurement configuration set; when the first conditional configuration set comes from a second entity, performing a measurement according to a second measurement configuration set;

herein, the first measurement configuration set is a measurement configuration set in a first measurement configuration storage space, the first measurement configuration storage space comprising at least one measurement configuration set; the first index is a non-negative integer; the first measurement configuration set and the second measurement configuration set are different.

The present application provides a second-type node for wireless communications, comprising:

a second transmitter, transmitting a first signaling, the first signaling being used to determine a first measurement configuration set, the first measurement configuration set being associated with a first index;

transmitting a second signaling, the second signaling being used to determine a first conditional configuration set, the first conditional configuration set comprising the first index;

herein, the first measurement configuration set is a measurement configuration set in a first measurement configuration storage space, the first measurement configuration storage space comprising at least one measurement configuration set; the first index is a non-negative integer; when the first conditional configuration set comes from a first entity, a measurement is performed according to the first measurement configuration set; when the first conditional configuration set comes from a second entity, a measurement is performed according to a second measurement configuration set; the first measurement configuration set and the second measurement configuration set are different.

In one embodiment, a problem to be solved in the present application includes: how to select a corresponding measurement configuration when both the SN and MN are configuring for CPC.

In one embodiment, an advantage of the above method includes: supporting the MN and the SN in performing CPC configuration simultaneously.

In one embodiment, an advantage of the above method includes: no more extra information will be needed for indicating the selection of a measurement configuration set.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:

receiving a first signal pool, the first signal pool comprising a first signal set and a second signal set;

determining a link failure of a first connection; and as a response to the action of determining the link failure of the first connection, starting a first recovery procedure; as a response to the action of starting the first recovery procedure, transmitting a first message;

monitoring a second message;

determining a link failure of a second connection; and as a response to the action of determining the link failure of the second connection, triggering a second recovery procedure; and determining whether the second recovery procedure is to be stopped according to a first condition set; the first condition set comprising receiving the second message;

herein, each of the first signal set and the second signal set respectively comprises at least one reference signal resource, and there exists at least one reference signal resource that only belongs to one of the first signal set or the second signal set; a measurement of the first signal set is used to determine the link failure of the first connection; a measurement of the second signal set is used to determine the link failure of the second connection; only a latter one of the first recovery procedure and the second recovery procedure is related to a random access procedure; the first recovery procedure comprises triggering a first link failure; the first message is related to the link failure of the first connection.

In one embodiment, a problem to be solved in the present application includes: how to realize combined designing of cell-level BFR and TRP-level BFR.

In one embodiment, a problem to be solved in the present application includes: how to make a TRP-level BFR back off to a cell-level BFR.

In one embodiment, a problem to be solved in the present application includes: during the cell-level BFR procedure, after the TRP-level BFR is successfully completed, how to deal with the cell-level BFR procedure.

In one embodiment, characteristics of the above method include: during the cell-level BFR procedure, immediately after the TRP-level BFR is successfully completed, the cell-level BFR procedure is stopped.

In one embodiment, characteristics of the above method include: the second message being received is used to determine that TRP-level BFR is successfully completed.

In one embodiment, characteristics of the above method include: cell-level BFR is related to random access, while TRP-level BFR is unrelated to random access.

In one embodiment, an advantage of the above method includes: supporting cell-level BFR and TRP-level BFR at the same time.

In one embodiment, an advantage of the above method includes: supporting single-TRP BFR, hence avoidance of any link interruption.

In one embodiment, an advantage of the above method includes: supporting the backoff of TRP-level BFR to cell-level BFR, so as to perform cell-level BFR in advance.

In one embodiment, an advantage of the above method includes: supporting the backoff of TRP-level BFR to cell-level BFR, so as to increase the success rate of link recovery.

In one embodiment, an advantage of the above method includes: during the cell-level BFR procedure, immediately after the TRP-level BFR is successfully completed, the cell-level BFR procedure is stopped, thus avoiding redundant BFR procedure.

In one embodiment, the first message comprises a first identifier, the first identifier being used to indicate the link failure of the first connection.

According to one aspect of the present application, characterized in that the phrase that a measurement of the first signal set is used to determine the link failure of the first connection comprises: as a response to a received quality of each reference signal resource in the first signal set being lower than a first threshold, reporting to higher layers a first-type indication used for updating a first counter; the phrase that a measurement of the second signal set is used to determine the link failure of the second connection comprises: as a response to a received quality of each reference signal resource in the second signal set being lower than a second threshold, reporting to higher layers a second-type indication used for updating a second counter.

According to one aspect of the present application, characterized in comprising:

monitoring a fourth message;

herein, the random access procedure comprised in the second recovery procedure comprises transmitting a third message, the third message being used to trigger the fourth message.

According to one aspect of the present application, characterized in comprising:

as a response to the second recovery procedure being successfully completed, stopping the first recovery procedure; the second recovery procedure being successfully completed comprises receiving the fourth message.

According to one aspect of the present application, characterized in that the first message is used to indicate a first reference signal resource in a first resource pool; the third message is used to indicate a second reference signal resource; the first condition set comprises that the second reference signal resource belongs to the first resource pool, the first resource pool comprising at least one reference signal resource.

According to one aspect of the present application, characterized in comprising:

as a response to the first condition set being satisfied, canceling the first link failure.

According to one aspect of the present application, characterized in comprising:

receiving a first signaling; as a response to the action of triggering a second recovery procedure, starting a first timer; and as a response to the first condition set being satisfied, stopping the first timer;

herein, the first signaling is used to indicate a first expiration value.

The present application provides a method in a second node for wireless communications, comprising:

transmitting a first signal pool, the first signal pool comprising a first signal set and a second signal set;

receiving a first message;

and as a response to receiving the first message, transmitting a second message;

herein, a link failure of a first connection is determined; as a response to the link failure of the first connection being determined, a first recovery procedure is started; a link failure of a second connection is determined; as a response to the link failure of the second connection being determined, a second recovery procedure is triggered; whether the second recovery procedure is to be stopped is determined according to a first condition set; the first condition set comprising the second message being received; each of the first signal set and the second signal set respectively comprises at least one reference signal resource, and there exists at least one reference signal resource that only belongs to one of the first signal set or the second signal set; a measurement of the first signal set is used to determine the link failure of the first connection; a measurement of the second signal set is used to determine the link failure of the second connection; only a latter one of the first recovery procedure and the second recovery procedure is related to a random access procedure; the first recovery procedure comprises triggering a first link failure; the first message is related to the link failure of the first connection.

In one embodiment, the first message comprises a first identifier, the first identifier being used to indicate the link failure of the first connection.

According to one aspect of the present application, characterized in that the phrase that a measurement of the first signal set is used to determine the link failure of the first connection comprises: as a response to a received quality of each reference signal resource in the first signal set being lower than a first threshold, reporting to higher layers a first-type indication used for updating a first counter; the phrase that a measurement of the second signal set is used to determine the link failure of the second connection comprises: as a response to a received quality of each reference signal resource in the second signal set being lower than a second threshold, reporting to higher layers a second-type indication used for updating a second counter.

According to one aspect of the present application, characterized in comprising:

as a response to receiving a third message, transmitting a fourth message;

herein, the random access procedure comprised in the second recovery procedure comprises the third message being transmitted, the third message being used to trigger the fourth message.

According to one aspect of the present application, characterized in that as a response to the second recovery procedure being successfully completed, the first recovery procedure is stopped; the second recovery procedure being successfully completed comprises the fourth message being received.

According to one aspect of the present application, characterized in that the first message is used to indicate a first reference signal resource in a first resource pool; the third message is used to indicate a second reference signal resource; the first condition set comprises that the second reference signal resource belongs to the first resource pool, the first resource pool comprising at least one reference signal resource.

According to one aspect of the present application, characterized in that as a response to the first condition set being satisfied, the first link failure is canceled.

According to one aspect of the present application, characterized in comprising:

transmitting a first signaling;

herein, as a response to the second recovery procedure being triggered, a first timer is started; as a response to the first condition set being satisfied, the first timer is stopped; the first signaling is used to indicate a first expiration value.

The present application provides a first node for wireless communications, comprising:

a first receiver, receiving a first signal pool, the first signal pool comprising a first signal set and a second signal set; and determining a link failure of a first connection; and monitoring a second message; and determining a link failure of a second connection; and a first transmitter, as a response to the action of determining the link failure of the first connection, starting a first recovery procedure; and as a response to the action of starting the first recovery procedure, transmitting a first message; and as a response to the action of determining the link failure of the second connection, triggering a second recovery procedure; and determining whether the second recovery procedure is to be stopped according to a first condition set; the first condition set comprising receiving the second message;

herein, each of the first signal set and the second signal set respectively comprises at least one reference signal resource, and there exists at least one reference signal resource that only belongs to one of the first signal set or the second signal set; a measurement of the first signal set is used to determine the link failure of the first connection; a measurement of the second signal set is used to determine the link failure of the second connection; only a latter one of the first recovery procedure and the second recovery procedure is related to a random access procedure; the first recovery procedure comprises triggering a first link failure; the first message is related to the link failure of the first connection.

The present application provides a second node for wireless communications, comprising:

a second transmitter, transmitting a first signal pool, the first signal pool comprising a first signal set and a second signal set; and as a response to receiving a first message, transmitting a second message; and a second receiver, receiving the first message;

herein, a link failure of a first connection is determined; as a response to the link failure of the first connection being determined, a first recovery procedure is started; a link failure of a second connection is determined; as a response to the link failure of the second connection being determined, a second recovery procedure is triggered; whether the second recovery procedure is to be stopped is determined according to a first condition set; the first condition set comprising the second message being received; each of the first signal set and the second signal set respectively comprises at least one reference signal resource, and there exists at least one reference signal resource that only belongs to one of the first signal set or the second signal set; a measurement of the first signal set is used to determine the link failure of the first connection; a measurement of the second signal set is used to determine the link failure of the second connection; only a latter one of the first recovery procedure and the second recovery procedure is related to a random access procedure; the first recovery procedure comprises triggering a first link failure; the first message is related to the link failure of the first connection.

In one embodiment, compared with the prior art, the present application is advantageous in the following aspects:

supporting cell-level BFR and TRP-level BFR at the same time;

supporting single-TRP BFR, hence avoidance of any link interruption;

supporting the backoff of TRP-level BFR to cell-level BFR, so as to perform cell-level BFR in advance;

supporting the backoff of TRP-level BFR to cell-level BFR, so as to increase the success rate of link recovery;

during the cell-level BFR procedure, immediately after the TRP-level BFR is successfully completed, the cell-level BFR procedure is stopped, thus avoiding redundant BFR procedure.

BRIEF DESCRIPTION OF THE DRAWINGS

Other features, objects and advantages of the present application will become more apparent from the detailed description of non-restrictive embodiments taken in conjunction with the following drawings:

FIG. 2 illustrates a schematic diagram of a network architecture according to one embodiment of the present application.

FIG. 3 illustrates a schematic diagram of a radio protocol architecture of a user plane and a control plane according to one embodiment of the present application.

FIG. 4 illustrates a schematic diagram of a first communication device and a second communication device according to one embodiment of the present application.

FIG. 6A illustrates a schematic diagram of the structure of a measurement configuration storage space according to one embodiment of the present application.

FIG. 6B illustrates a flowchart of radio signal transmission according to another embodiment of the present application.

FIG. 7A illustrates a schematic diagram of the structure of a conditional configuration storage space according to one embodiment of the present application.

FIG. 7B illustrates a schematic diagram of combined designing of a first recovery procedure and a second recovery procedure according to one embodiment of the present application.

FIG. 8A illustrates a schematic diagram of a first node in connection with a second node and a third node simultaneously according to one embodiment of the present application.

FIG. 8B illustrates a schematic diagram of a first timer according to one embodiment of the present application.

FIG. 9A illustrates a structure block diagram of a processing device used in a first node according to one embodiment of the present application.

FIG. 9B illustrates a schematic diagram of a measurement for a given signal set being used to determine a link failure of a given connection according to one embodiment of the present application.

FIG. 10A illustrates a structure block diagram of a processing device used in a second-type node according to one embodiment of the present application.

FIG. 10B illustrates a schematic diagram of a first condition set comprising a second reference signal resource belonging to a first resource pool according to one embodiment of the present application.

FIG. 11 illustrates a structure block diagram of a processing device used in a first node according to one embodiment of the present application.

FIG. 12 illustrates a structure block diagram of a processing device used in a second node according to one embodiment of the present application.

FIG. 13 illustrates a schematic diagram of a relation between a first connection and a second connection according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1A

Figure 1A:
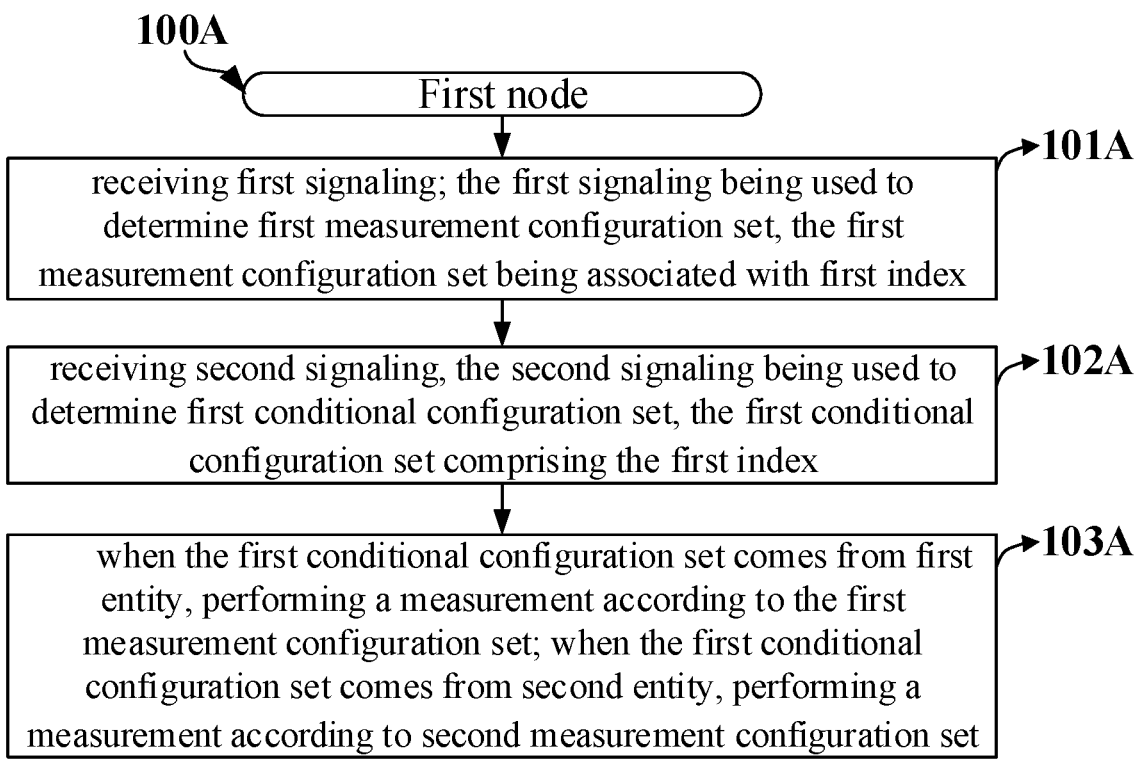
FIG. 1A illustrates a flowchart of transmission of a first signaling according to one embodiment of the present application.

Embodiment 1A illustrates a flowchart of transmission of a first signaling according to one embodiment of the present application, as shown in FIG. 1A. In FIG. 1A, each step represents a step, it should be particularly noted that the sequence order of each box herein does not imply a chronological order of steps marked respectively by these boxes.

In Embodiment 1A, the first node in the present application receives a first signaling in step 101A, the first signaling being used to determine a first measurement configuration set, the first measurement configuration set being associated with a first index; receives a second signaling in step 102A, the second signaling being used to determine a first conditional configuration set, the first conditional configuration set comprising the first index; and in step 103A, when the first conditional configuration set comes from a first entity, performs a measurement according to the first measurement configuration set; when the first conditional configuration set comes from a second entity, performing a measurement according to a second measurement configuration set;

herein, the first measurement configuration set is a measurement configuration set in a first measurement configuration storage space, the first measurement configuration storage space comprising at least one measurement configuration set; the first measurement configuration set and the second measurement configuration set are different.

In one embodiment, the first signaling comprises all or part of a RRCReconfiguration message.

In one embodiment, the first signaling comprises all or part of a RRCConnectionReconfiguration message.

In one embodiment, the first signaling comprises a Radio Resource Control (RRC) Message.

In one embodiment, the first signaling comprises all or part of Information Elements (IEs) in an RRC message.

In one embodiment, the first signaling comprises all or part of fields of an IE in an RRC message.

In one embodiment, the first signaling comprises all or part of an upper layer signaling.

In one embodiment, the first signaling comprises all or part of a higher layer signaling.

In one embodiment, the first signaling is transmitted by an SRB1.

In one embodiment, the first signaling is transmitted by an SRB2.

In one embodiment, the first signaling is transmitted by an SRB3.

In one embodiment, a transmitter transmitting the first signaling includes a maintenance base station for a PCell.

In one embodiment, a transmitter transmitting the first signaling includes a maintenance base station for a PSCell.

In one embodiment, a transmitter transmitting the first signaling includes the second node N02.

In one embodiment, a transmitter transmitting the first signaling includes the second node N03.

In one embodiment, the first signaling comes from a first entity.

In one embodiment, the first signaling comes from a second entity.

In one embodiment, the phrase of the first signaling being used to determine a first measurement configuration set comprises: modifying the first measurement configuration set according to the first signaling.

In one embodiment, the phrase of the first signaling being used to determine a first measurement configuration set comprises: modifying all or partial fields in the first measurement configuration set according to the first signaling.

In one embodiment, the phrase of the first signaling being used to determine a first measurement configuration set comprises: modifying all or partial IEs in the first measurement configuration set according to the first signaling.

In one embodiment, the action of modifying in the present application includes: deleting.

In one embodiment, the action of modifying in the present application includes: substituting/replacing.

In one embodiment, the action of modifying in the present application includes: generating.

In one embodiment, the action of modifying in the present application includes: adding.

In one embodiment, the action of modifying in the present application includes: configuring.

In one embodiment, the phrase of the first signaling being used to determine a first measurement configuration set comprises: as a response to receiving the first signaling, the first measurement configuration set being determined.

In one embodiment, the phrase of the first signaling being used to determine a first measurement configuration set comprises: the first signaling comprises the first measurement configuration set.

In one embodiment, the phrase of the first signaling being used to determine a first measurement configuration set comprises: retaining the first measurement configuration set according to the first signaling.

In one embodiment, the phrase of the first signaling being used to determine a first measurement configuration set comprises: as a response to receiving the first signaling, adding the first measurement configuration in the first measurement configuration storage space.

In one embodiment, the phrase of the first signaling being used to determine a first measurement configuration set comprises: setting the first measurement configuration storage space, as a response to receiving the first signaling.

In one subembodiment, the phrase of setting the first measurement configuration storage space comprises: modifying any measurement configuration set in the first measurement configuration storage space.

In one subembodiment, the phrase of setting the first measurement configuration storage space comprises: modifying all or partial fields in any measurement configuration set in the first measurement configuration storage space.

In one embodiment, the first index is a non-negative integer.

In one embodiment, the first index is no greater than 32.

In one embodiment, the first index is no greater than 64.

In one embodiment, the first index is no greater than 128.

In one embodiment, the first index comprises an Information Element (IE) CondReconfigId.

In one embodiment, the first index comprises all or part of an Information Element (IE) CondReconfigId.

In one embodiment, the first index comprises all or part of a condReconfigId field.

In one embodiment, the first index is used for identifying a Conditional Handover (CHO) or CPC configuration.

In one embodiment, the first index comprises an Information Element (IE) MeasID.

In one embodiment, the first index comprises all or part of an Information Element (IE) MeasID.

In one embodiment, the first index comprises all or part of a measId field.

In one embodiment, the first index is used for identifying a measurement configuration.

In one embodiment, the first index comprises an Information Element (IE) MeasObjectId.

In one embodiment, the first index comprises all or part of an Information Element (IE) MeasObjectId.

In one embodiment, the first index comprises all or part of a measObjectId field.

In one embodiment, the first index is used for identifying a measurement target configuration.

In one embodiment, the first index comprises an Information Element (IE) ReportConfigId.

In one embodiment, the first index comprises all or part of an Information Element (IE) ReportConfigId.

In one embodiment, the first index comprises all or part of a reportConfigId field.

In one embodiment, the first index is used for identifying a measurement reporting configuration.

In one embodiment, the first index comprises all or part of a condConfigId field.

In one embodiment, the first index comprises all or part of a condReconfigurationId field.

In one embodiment, the phrase of the first measurement configuration set being associated with a first index comprises that: the first measurement configuration set is identified by the first index.

In one embodiment, the phrase of the first measurement configuration set being associated with a first index comprises that: the first measurement configuration set comprises the first index.

In one embodiment, the phrase of the first measurement configuration set being associated with a first index comprises that: the first measurement configuration set comprises a second index, the second index being associated with the first index.

In one embodiment, the phrase of the first measurement configuration set being associated with a first index comprises that: the first measurement configuration set is identified by a second index, the second index being associated with the first index.

In one subembodiment, the first index comprises a condReconfigId, while the second index comprises a measId.

In one subembodiment, the first index comprises a measId, while the second index comprises a condReconfigId.

In one subembodiment, the first index comprises all or part of a condReconfigId field, while the second index comprises all or part of a measId field.

In one subembodiment, the first index comprises all or part of a measId field, while the second index comprises all or part of a condReconfigId field.

In one subembodiment, the phrase of the second index being associated with the first index comprises that: the first index corresponds to the second index.

In one subembodiment, the phrase of the second index being associated with the first index comprises that: the first index and the second index are configured in a same IE in an RRC message.

In one subembodiment, the phrase of the second index being associated with the first index comprises that: the first index and the second index are stored in a same IE.

In one subsidiary embodiment of the above subembodiment, the same IE comprises a MeasIdToAddMod.

In one subsidiary embodiment of the above subembodiment, the same IE comprises a CondReconfigToAddMod.

In one embodiment, the second index in the present application is a non-negative integer.

In one embodiment, the second index in the present application is no greater than 32.

In one embodiment, the second index in the present application is no greater than 64.

In one embodiment, the second index in the present application is no greater than 128.

In one embodiment, the second index in the present application comprises all or part of a condReconfigId field.

In one embodiment, the second index in the present application comprises an Information Element (IE) CondReconfigId.

In one embodiment, the second index in the present application is used for identifying a CHO or CPC configuration.

In one embodiment, the second index in the present application comprises an Information Element (IE) MeasID.

In one embodiment, the second index in the present application comprises all or part of a measId field.

In one embodiment, the second index in the present application is used for identifying a measurement configuration.

In one embodiment, the second index in the present application comprises an Information Element (IE) MeasObjectId.

In one embodiment, the second index in the present application comprises all or part of a measObjectId field.

In one embodiment, the second index in the present application is used for identifying a measurement target configuration.

In one embodiment, the second index in the present application comprises an Information Element (IE) ReportConfigId.

In one embodiment, the second index in the present application comprises all or part of a reportConfigId field.

In one embodiment, the second index in the present application is used for identifying a measurement reporting configuration.

In one embodiment, the second index in the present application comprises all or part of a condConfigId field.

In one embodiment, the second index in the present application comprises all or part of a condReconfigurationId field.

In one embodiment, the first signaling indicates the first index.

In one embodiment, the first signaling indicates the second index.

In one embodiment, the first measurement configuration storage space comprises a measurement configuration storage space.

In one embodiment, the measurement configuration storage space in the present application comprises at least one measurement configuration set.

In one subembodiment, any measurement configuration set in the measurement configuration storage space comprises at least one of a first field, a second field or a third field, where the first field comprises a measurement index, the measurement index being a non-negative integer, the second field comprises a measurement target index, the measurement target index being a non-negative integer, and the third field comprises a reporting configuration index, the reporting configuration index being a non-negative integer.

In one subsidiary embodiment of the above subembodiment, any measurement configuration set in the measurement configuration storage space comprises the first field, the second field and the third field.

In one subembodiment, any measurement configuration set in the measurement configuration storage space comprises at least one of a fourth field or a fifth field, where the fourth field comprises a said measurement target index, the measurement target index being a non-negative integer, and the fifth field indicates a measurement target.

In one subsidiary embodiment of the above subembodiment, any measurement configuration set in the measurement configuration storage space comprises the fourth field and the fifth field.

In one subembodiment, the measurement configuration storage space comprises multiple measurement configuration sets, with the measurement configuration set being one of the multiple measurement configuration sets.

In one subembodiment, the measurement configuration storage space comprises K1 measurement configuration set(s), with the measurement configuration set being one of the K1 measurement configuration set(s), K1 being a non-negative integer.

In one subsidiary embodiment of the above subembodiment, K1 is no greater than 64.

In one subsidiary embodiment of the above subembodiment, K1 is no greater than 128.

In one embodiment, the measurement configuration storage space in the present application comprises a measurement configuration set list, the measurement configuration set list comprising at least one measurement configuration set.

In one subsidiary embodiment of the above subembodiment, any measurement configuration set in the measurement configuration set list comprises at least one of the first field, the second field or the third field, where the first field comprises a measurement index, the measurement index being a non-negative integer, the second field comprises a measurement target index, the measurement target index being a non-negative integer, and the third field comprises a reporting configuration index, the reporting configuration index being a non-negative integer.

In one subsidiary embodiment of the above subembodiment, any measurement configuration set in the measurement configuration set list comprises at least one of a fourth field or a fifth field, where the fourth field comprises a measurement target index, the measurement target index being a non-negative integer, and the fifth field indicates a measurement target.

In one subembodiment, the measurement configuration set list comprises multiple measurement configuration sets, with the measurement configuration set being one of the multiple measurement configuration sets.

In one subembodiment, the measurement configuration set list comprises K2 measurement configuration set(s), with the measurement configuration set being one of the K2 measurement configuration set(s), K2 being a non-negative integer.

In one subsidiary embodiment of the above subembodiment, K2 is equal to 0.

In one subsidiary embodiment of the above subembodiment, K2 is no greater than 64.

In one subsidiary embodiment of the above subembodiment, K2 is no greater than 128.

In one subsidiary embodiment of the above subembodiment, K2 is no greater than 1024.

In one embodiment, the measurement configuration storage space in the present application comprises all or part of a UE variable VarConditionalReconfig.

In one embodiment, the measurement configuration storage space in the present application comprises accumulated Conditional Handover (CHO) configurations or Conditional PSCell Change (CPC) configurations.

In one subembodiment, the CHO configuration or CPC configuration comprises at least one pointer, where any pointer in the CHO configuration or CPC configuration indicates an execution condition for a CHO or a CPC.

In one subsidiary embodiment of the above subembodiment, the execution condition for a CHO or a CPC comprises one or more measIDs being associated.

In one subembodiment, the CHO configuration or CPC configuration comprises RRC configuration of a target candidate SpCell being stored.

In one subsidiary embodiment of the above subembodiment, the special cell includes a PSCell and a PCell.

In one subsidiary embodiment of the above subembodiment, the RRC configuration comprises all or part of an RRC reconfiguration message.

In one embodiment, the measurement configuration storage space in the present application comprises all or part of a UE variable VarMeasConfig.

In one embodiment, the measurement configuration storage space in the present application comprises a measurement of accumulated configurations, the measurement being performed by the UE, and the measurement covering intra-frequency, inter-frequency and inter-Radio Access Technology (inter-RAT) mobility-related measurements.

In one embodiment, the measurement configuration storage space in the present application comprises all or part of an IE MeasIdToAddModList.

In one embodiment, the measurement configuration storage space in the present application comprises all or part of a measIdToAddModList field.

In one embodiment, the measurement configuration storage space in the present application comprises a measurement identity list, the measurement identity list comprising at least one measurement identity.

In one subembodiment, any measurement identity in the measurement target list is added or modified.

In one subembodiment, any measurement identity in the measurement target list comprises MeasIdToAddMod.

In one embodiment, the measurement configuration storage space in the present application comprises all or part of an IE MeasObjectToAddModList.

In one embodiment, the measurement configuration storage space in the present application comprises all or part of a measObjectList field.

In one embodiment, the measurement configuration storage space in the present application comprises all or part of a measObjectToAddModList field.

In one embodiment, the measurement configuration set list in the present application comprises a measurement target list.

In one embodiment, the measurement target list in the present application comprises at least one measurement target.

In one subembodiment, any measurement target in the measurement target list is added or modified.

In one subembodiment, any measurement target in the measurement target list comprises MeasObjectToAddMod.

In one subembodiment, the measurement target list comprises K3 measurement target(s), with a measurement target being one of the K3 measurement target(s), K3 being a non-negative integer.

In one subsidiary embodiment of the above subembodiment, K3 is no greater than 64.

In one subsidiary embodiment of the above subembodiment, K3 is no greater than 128.

In one subsidiary embodiment of the above subembodiment, K3 is no greater than 1024.

In one embodiment, the measurement configuration storage space in the present application comprises one said measurement target list.

In one embodiment, the measurement configuration storage space in the present application comprises the measurement target list.

In one embodiment, the measurement configuration storage space in the present application comprises all or part of a UE variable VarMeasConfigSL.

In one embodiment, the measurement configuration storage space in the present application comprises a measurement of accumulated configurations, the measurement being for NR Sidelink, and the measurement being performed by the UE, the UE being a unicast destination.

In one embodiment, the measurement configuration storage space in the present application comprises a measurement of accumulated configurations, the measurement being for Sidelink, and the measurement being performed by the UE, the UE being a unicast destination.

In one embodiment, the measurement configuration storage space in the present application comprises all or part of an IE SL-MeasIdList.

In one embodiment, the measurement configuration storage space in the present application comprises all or part of a measIdList field.

In one embodiment, the measurement configuration storage space in the present application comprises a sidelink measurement target list, the sidelink measurement target list comprising at least one sidelink measurement target.

In one subembodiment, any sidelink measurement target in the sidelink measurement target list is added or modified.

In one embodiment, the first measurement configuration storage space comprises all or part of a sl-MeasObjectList-Common field.

In one embodiment, the first measurement configuration storage space comprises all or part of a sl-MeasObjectToAddModList field.

In one embodiment, the first measurement configuration storage space comprises all or part of an IE SL-MeasObjectList.

In one embodiment, the measurement configuration storage space in the present application comprises a UE variable.

In one embodiment, the measurement configuration storage space in the present application comprises all or partial IEs in a UE variable.

In one embodiment, the measurement configuration storage space in the present application comprises all or partial IEs in an RRC message.

In one embodiment, the measurement configuration storage space in the present application comprises all or partial fields in an IE in an RRC message.

In one embodiment, the measurement configuration storage space in the present application comprises all or partial fields in an RRC layer IE.

In one subembodiment, the phrase RRC layer IE comprises: the IE being defined by an RRC layer.

In one embodiment, the measurement configuration set list in the present application comprises all or part of an IE MeasIdToAddModList.

In one embodiment, the measurement configuration set list in the present application comprises all or part of a measIdToAddModList field.

In one embodiment, the measurement configuration storage space in the present application comprises all or part of an IE MeasObjectToAddModList.

In one embodiment, the measurement configuration set list in the present application comprises all or part of a measObjectList field.

In one embodiment, the measurement configuration set list in the present application comprises all or part of a measObjectToAddModList field.

In one embodiment, the measurement configuration set list in the present application comprises the measurement target list.

In one embodiment, the measurement configuration set list in the present application comprises all or part of an IE SL-MeasIdList.

In one embodiment, the measurement configuration set list in the present application comprises all or part of a measIdList field.

In one embodiment, the measurement configuration set list in the present application comprises a sidelink measurement target list, the sidelink measurement target list comprising at least one sidelink measurement target.

In one subembodiment, any sidelink measurement target in the sidelink measurement target list is added or modified.

In one embodiment, the measurement configuration set list in the present application comprises all or partial IEs in an RRC message.

In one embodiment, the measurement configuration set list in the present application comprises all or partial fields in an IE in an RRC message.

In one embodiment, the measurement configuration set list in the present application comprises all or partial fields in an RRC layer IE.

In one embodiment, the phrase RRC layer IE in the present application comprises the IE being defined by an RRC layer.

In one embodiment, any measurement configuration set in the measurement configuration storage space in the present application comprises all or part of MeasIdToAddMod.

In one embodiment, any measurement configuration set in the measurement configuration storage space in the present application comprises all or part of a MeasIdToAddMod field.

In one embodiment, any measurement configuration set in the measurement configuration storage space in the present application comprises all or part of MeasObjectToAddMod.

In one embodiment, any measurement configuration set in the measurement configuration storage space in the present application comprises all or partial IEs in an RRC message.

In one embodiment, any measurement configuration set in the measurement configuration storage space in the present application comprises all or partial fields in an IE in an RRC message.

In one embodiment, any measurement configuration set in the measurement configuration storage space in the present application comprises all or partial fields in an RRC layer IE.

In one embodiment, the phrase of any measurement configuration set in the measurement configuration storage space in the present application comprises: any measurement configuration set in the measurement configuration set list.

In one embodiment, any measurement configuration set in the measurement configuration set list in the present application comprises all or part of MeasIdToAddMod.

In one embodiment, any measurement configuration set in the measurement configuration set list in the present application comprises all or part of MeasObjectToAddMod.

In one embodiment, the first field in the present application comprises all or part of a measId field.

In one embodiment, the first field in the present application comprises all or part of an IE MeasID.

In one embodiment, the measurement index in the present application is used for identifying a measurement configuration.

In one embodiment, the measurement index in the present application is no greater than 64.

In one embodiment, the measurement index in the present application is no greater than 128.

In one embodiment, the second field in the present application comprises all or part of a measObjectId field.

In one embodiment, the second field in the present application comprises all or part of an IE MeasObjectId.

In one embodiment, the measurement target index in the present application is used for identifying a measurement target configuration.

In one embodiment, the measurement target index in the present application is no greater than 64.

In one embodiment, the measurement target index in the present application is no greater than 128.

In one embodiment, the third field in the present application comprises all or part of a reportConfigId field.

In one embodiment, the third field in the present application comprises all or part of an IE ReportConfigId.

In one embodiment, the reporting configuration index in the present application is used for identifying a measurement reporting configuration.

In one embodiment, the reporting configuration index in the present application is no greater than 64.

In one embodiment, the reporting configuration index in the present application is no greater than 128.

In one embodiment, the fourth field in the present application comprises all or part of a measObjectId field.

In one embodiment, the fourth field in the present application comprises all or part of an IE MeasObjectId.

In one embodiment, the fifth field in the present application comprises all or part of a measObject field.

In one embodiment, the fifth field in the present application comprises all or part of an IE MeasObjectNR.

In one embodiment, the fifth field in the present application comprises all or part of an IE MeasObjectEUTRA.

In one embodiment, the fifth field in the present application comprises all or part of an IE MeasObjectUTRA-FDD.

In one embodiment, the fifth field in the present application comprises all or part of an IE MeasObjectNR-SL.

In one embodiment, the fifth field in the present application comprises all or part of an IE MeasObjectCLI.

In one embodiment, the fifth field in the present application comprises at least one of IEs MeasObjectNR, MeasObjectEUTRA, MeasObjectUTRA-FDD, MeasObjectNR-SL or MeasObjectCLI.

In one embodiment, the first measurement configuration storage space comes from a first entity.

In one embodiment, the first measurement configuration storage space comes from a second entity.

In one embodiment, the first measurement configuration set comprises a CHO or CPC configuration.

In one embodiment, the first measurement configuration set comprises a measurement target.

In one embodiment, the first measurement configuration set comprises all or partial Information Elements (IEs) in an RRC message.

In one embodiment, the first measurement configuration set comprises all or partial fields of an IE in an RRC message.

In one embodiment, the first measurement configuration set comprises all or partial fields in an IE.

In one embodiment, the first measurement configuration set comprises all or partial fields in an IE, where the IE is defined by an RRC layer.

In one embodiment, the first measurement configuration set comprises all or partial fields in an RRC layer IE.

In one embodiment, the phrase that the first measurement configuration set is a measurement configuration set in a first measurement configuration storage space comprises that: the first measurement configuration set is a measurement configuration set in the measurement configuration set list comprised in the first measurement configuration storage space.

In one embodiment, the phrase of the first measurement configuration set being associated with a first index comprises that: the first field in the first measurement set comprises the first index.

In one embodiment, the phrase of the first measurement configuration set being associated with a first index comprises that: the second field in the first measurement set comprises the first index.

In one embodiment, the phrase of the first measurement configuration set being associated with a first index comprises that: the third field in the first measurement set comprises the first index.

In one embodiment, the phrase of the first measurement configuration set being associated with a first index comprises that: the fourth field in the first measurement set comprises the first index.

In one embodiment, the phrase of the first measurement configuration set being associated with a first index comprises that: the first index is a measurement index comprised in a first field in the first measurement set.

In one embodiment, the phrase of the first measurement configuration set being associated with a first index comprises that: the first index is a measurement target index comprised in the second field in the first measurement set.

In one embodiment, the phrase of the first measurement configuration set being associated with a first index comprises that: the first index is a reporting configuration index comprised in the third field in the first measurement set.

In one embodiment, the phrase of the first measurement configuration set being associated with a first index comprises that: the first index is a measurement target index comprised in the fourth field in the first measurement set.

In one embodiment, the second index in the present application is comprised by the first field in the first measurement set.

In one embodiment, the second index in the present application is comprised by the second field in the first measurement set.

In one embodiment, the second index in the present application is comprised by the third field in the first measurement set.

In one embodiment, the second index in the present application is comprised by the fourth field in the first measurement set.

In one embodiment, the second index in the present application is a measurement index comprised in the first field in the first measurement set.

In one embodiment, the second index in the present application is a measurement target index comprised in the second field in the first measurement set.

In one embodiment, the second index in the present application is a reporting configuration index comprised in the third field in the first measurement set.

In one embodiment, the second index in the present application is a measurement target index comprised in the fourth field in the first measurement set.

In one embodiment, the first signaling comprises a first configuration set.

In one subembodiment, the first configuration set comprises all or part of a measId field.

In one subembodiment, the first configuration set comprises all or part of a reportConfigId field.

In one subembodiment, the first configuration set comprises all or part of a measObjectId field.

In one subembodiment, the first configuration set comprises all or part of a measObject field.

In one subembodiment, the first configuration set comprises at least one of a measId field, a measObject field, a measObjectId field or a reportConfigId field.

In one subembodiment, the first configuration set is used to determine the first measurement configuration set.

In one subembodiment, the phrase of the first signaling being used to determine a first measurement configuration set comprises: replacing at least one of the first field, the second field or the third field in the first measurement configuration set with the first configuration set.

In one subembodiment, the phrase of the first signaling being used to determine a first measurement configuration set comprises: replacing the first field in the first measurement configuration set with the first configuration set.

In one subembodiment, the phrase of the first signaling being used to determine a first measurement configuration set comprises: replacing the second field in the first measurement configuration set with the first configuration set.

In one subembodiment, the phrase of the first signaling being used to determine a first measurement configuration set comprises: replacing the third field in the first measurement configuration set with the first configuration set.

In one subembodiment, the phrase of the first signaling being used to determine a first measurement configuration set comprises: at least one of the first field, the second field or the third field in the first measurement configuration set comprising all or part of the first configuration set.

In one subembodiment, the phrase of the first signaling being used to determine a first measurement configuration set comprises: the first configuration set replacing the fourth field in the first measurement configuration set.

In one subembodiment, the phrase of the first signaling being used to determine a first measurement configuration set comprises: the first configuration set replacing the fifth field in the first measurement configuration set.

In one subembodiment, the phrase of the first signaling being used to determine a first measurement configuration set comprises: the first configuration set replacing at least one of the fourth field or the fifth field in the first measurement configuration set.

In one subembodiment, the phrase of the first signaling being used to determine a first measurement configuration set comprises: at least one of the fourth field or the fifth field in the first measurement configuration set comprising all or part of the first configuration set.

In one embodiment, the first measurement configuration storage space comes from a first entity.

In one embodiment, the first measurement configuration storage space comes from a second entity.

In one embodiment, the phrase of coming from a first entity in the present application comprises: being associated with the first entity.

In one embodiment, the phrase of coming from a first entity in the present application comprises: being received via an SRB1.

In one embodiment, the phrase of coming from a first entity in the present application comprises: being comprised by an RRCReconfiguration message, the RRCReconfiguration message being received via an SRB1.

In one embodiment, the phrase of coming from a first entity in the present application comprises: being received via an SRB3.

In one embodiment, the phrase of coming from a first entity in the present application comprises: being comprised by an RRCReconfiguration message, the RRCReconfiguration message being received via an SRB3.

In one embodiment, the phrase of coming from a first entity in the present application comprises: being comprised by an RRC message, the RRC message being received via an SRB3.

In one embodiment, the phrase of coming from a first entity in the present application comprises: being comprised by an RRCReconfiguration message, the RRCReconfiguration message being embedded in another RRCReconfiguration message, which is received via an SRB1.

In one embodiment, the phrase of coming from a first entity in the present application comprises: being comprised by an RRC message, the RRC message being embedded in another RRC message, which is received via an SRB1.

In one embodiment, the phrase of coming from a first entity in the present application comprises: being configured by the first entity.

In one embodiment, the phrase of coming from a first entity in the present application comprises: being allocated by the first entity.

In one embodiment, the phrase of coming from a first entity in the present application comprises: being received via the first entity.

In one embodiment, the phrase of coming from a first entity in the present application comprises: being related to the first entity.

In one embodiment, the phrase of coming from a first entity in the present application comprises: being transmitted through the first entity.

In one embodiment, the phrase of coming from a first entity in the present application comprises: being started by the first entity.

In one embodiment, the phrase of coming from a first entity in the present application comprises: being originated from the first entity.

In one embodiment, the phrase of coming from a first entity in the present application comprises: being generated by the first entity.

In one embodiment, the phrase of coming from a first entity in the present application comprises: being configured for the first entity.

In one embodiment, the phrase of coming from a second entity in the present application comprises: being configured by the second entity.

In one embodiment, the phrase of coming from a second entity in the present application comprises: being associated with the second entity.

In one embodiment, the phrase of coming from a second entity in the present application comprises: being received via an SRB1.

In one embodiment, the phrase of coming from a second entity in the present application comprises: being comprised by an RRCReconfiguration message, the RRCReconfiguration message being received via an SRB1.

In one embodiment, the phrase of coming from a second entity in the present application comprises: being comprised by an RRC message, the RRC message being received via an SRB1.

In one embodiment, the phrase of coming from a second entity in the present application comprises: being received via an SRB3.

In one embodiment, the phrase of coming from a second entity in the present application comprises: being comprised by an RRCReconfiguration message, the RRCReconfiguration message being received via an SRB3.

In one embodiment, the phrase of coming from a second entity in the present application comprises: being comprised by an RRC message, the RRC message being received via an SRB3.

In one embodiment, the phrase of coming from a second entity in the present application comprises: being comprised by an RRCReconfiguration message, the RRCReconfiguration message being embedded in another RRCReconfiguration message, which is received via an SRB1.

In one embodiment, the phrase of coming from a second entity in the present application comprises: being comprised by an RRC message, the RRC message being embedded in another RRC message, which is received via an SRB1.

In one embodiment, the phrase of coming from a second entity in the present application comprises: being allocated by the second entity.

In one embodiment, the phrase of coming from a second entity in the present application comprises: being received via the second entity.

In one embodiment, the phrase of coming from a second entity in the present application comprises: being related to the second entity.

In one embodiment, the phrase of coming from a second entity in the present application comprises: being transmitted through the second entity.

In one embodiment, the phrase of coming from a second entity in the present application comprises: being started by the second entity.

In one embodiment, the phrase of coming from a second entity in the present application comprises: being originated from the second entity.

In one embodiment, the phrase of coming from a second entity in the present application comprises: being generated by the second entity.

In one embodiment, the phrase of coming from a second entity in the present application comprises: being configured for the second entity.

In one embodiment, the first entity in the present application comprises a Master Cell Group (MCG), while the second entity in the present application comprises a Secondary Cell Group (SCG).

In one embodiment, the first entity in the present application comprises an SCG, while the second entity in the present application comprises an MCG.

In one embodiment, the first entity in the present application comprises an MN, while the second entity in the present application comprises an SN.

In one embodiment, the first entity in the present application comprises an SN, while the second entity in the present application comprises an MN.

In one embodiment, the first entity in the present application comprises a PCell, while the second entity in the present application comprises a PSCell.

In one embodiment, the first entity in the present application comprises a PSCell, while the second entity in the present application comprises a PCell.

In one embodiment, the first entity in the present application is an NR entity, while the second entity in the present application is an LTE entity.

In one embodiment, the first entity in the present application is an LTE entity, while the second entity in the present application is an NR entity.

In one embodiment, the first entity and the second entity in the present application are respectively NR entities.

In one embodiment, the first entity and the second entity in the present application are respectively LTE entities.

In one embodiment, the first entity and the second entity in the present application are identical.

In one embodiment, the first entity and the second entity in the present application are different.

In one embodiment, the first entity and the second entity in the present application respectively comprise a communication Node.

In one embodiment, the first entity and the second entity in the present application respectively comprise 2 gNB s.

In one embodiment, the first entity and the second entity in the present application respectively comprise 2 eNB s.

In one embodiment, the first entity and the second entity in the present application respectively comprise a gNB and an eNB.

In one embodiment, the first entity and the second entity in the present application respectively comprise an eNB and a gNB.

In one embodiment, the first entity and the second entity in the present application respectively comprise 2 Signaling Radio Bears (SRBs).

In one subembodiment, the SRB comprises an SRB1, the SRB1 being used for an MN, or the SRB1 being used for a Primary Cell (PCell), or the SRB1 being used for a Master Cell Group (MCG).

In one subembodiment, the SRB comprises an SRB2, the SRB2 being used for an MN, or the SRB2 being used for a PCell, or the SRB2 being used for an MCG.

In one subembodiment, the SRB comprises an SRB3, the SRB3 being used for an SN, or the SRB3 being used for a PSCell, or the SRB3 being used for a Secondary Cell Group (SCG).

In one embodiment, the first entity in the present application comprises an SRB1, while the second entity in the present application comprises an SRB3.

In one embodiment, the first entity in the present application comprises an SRB3, while the second entity in the present application comprises an SRB1.

In one embodiment, the first entity and the second entity in the present application respectively comprise 2 Radio Link Control (RLC) entities.

In one embodiment, the second signaling comprises all or part of a RRCReconfiguration message.

In one embodiment, the second signaling comprises all or part of a RRCConnectionReconfiguration message.

In one embodiment, the second signaling comprises a Radio Resource Control (RRC) Message.

In one embodiment, the second signaling comprises all or part of Information Elements (IEs) in an RRC message.

In one embodiment, the second signaling comprises all or part of fields of an IE in an RRC message.

In one embodiment, the second signaling comprises all or part of an upper layer signaling.

In one embodiment, the second signaling comprises all or part of a higher layer signaling.

In one embodiment, the second signaling is transmitted by an SRB1.

In one embodiment, the second signaling is transmitted by an SRB2.

In one embodiment, the second signaling is transmitted by an SRB3.

In one embodiment, a transmitter transmitting the second signaling includes a maintenance base station for a PCell.

In one embodiment, a transmitter transmitting the second signaling includes a maintenance base station for a PSCell.

In one embodiment, a transmitter transmitting the second signaling includes the second node N02.

In one embodiment, a transmitter transmitting the second signaling includes the second node N03.

In one embodiment, the second signaling comes from a first entity.

In one embodiment, the second signaling comes from a second entity.

In one embodiment, the first signaling and the second signaling are transmitted in a same RRC message.

In one embodiment, the first signaling and the second signaling are transmitted in different RRC messages.

In one embodiment, the second signaling indicates the first index.

In one embodiment, the second signaling indicates the second index.

In one embodiment, the second signaling indicates the first index.

In one embodiment, the second signaling indicates the second index.

In one embodiment, the phrase of the second signaling being used to determine a first conditional configuration set comprises: modifying the first conditional configuration set according to the second signaling.

In one embodiment, the phrase of the second signaling being used to determine a first conditional configuration set comprises: modifying all or partial fields in the first conditional configuration set according to the second signaling.

In one embodiment, the phrase of the second signaling being used to determine a first conditional configuration set comprises: modifying all or partial IEs in the first conditional configuration set according to the second signaling.

In one embodiment, the phrase of the second signaling being used to determine a first conditional configuration set comprises: the second signaling comprising all or partial fields in the first conditional configuration set.

In one embodiment, the phrase of the second signaling being used to determine a first conditional configuration set comprises: as a response to receiving the second signaling, the first conditional configuration set being determined.

In one embodiment, the phrase of the second signaling being used to determine a first conditional configuration set comprises: retaining the first measurement configuration set according to the second signaling.

In one embodiment, the first conditional configuration set is a conditional configuration set in a first conditional configuration storage space.

In one embodiment, the first conditional configuration storage space in the present application comprises a conditional configuration storage space.

In one embodiment, the conditional configuration storage space in the present application comprises at least one conditional configuration set, and any conditional configuration set in the conditional configuration storage set comprises at least one of a sixth field or a seventh field; the sixth field comprises a target index, and the seventh field comprises at least one target condition index.

In one subembodiment, the conditional configuration storage space comprises multiple conditional configuration sets, with the conditional configuration set being one of the multiple conditional configuration sets.

In one subembodiment, the conditional configuration storage space comprises Q1 conditional configuration set(s), with the conditional configuration set being one of the Q1 conditional configuration set(s), Q1 being a non-negative integer.

In one subsidiary embodiment of the above subembodiment, Q1 is no greater than 64.

In one subsidiary embodiment of the above subembodiment, Q1 is no greater than 128.

In one subsidiary embodiment of the above subembodiment, Q1 is no greater than 1024.

In one subembodiment, any conditional configuration set in the conditional configuration storage space comprises the sixth field and the seventh field.

In one subembodiment, the seventh field comprises multiple target condition indexes, with the target condition index being one of the multiple target condition indexes.

In one subembodiment, the seventh field comprises Q2 target condition index(es), with the target condition index being one of the Q2 target condition index(es), Q2 being a non-negative integer.

In one subsidiary embodiment of the above subembodiment, Q2 is equal to 1.

In one subsidiary embodiment of the above subembodiment, Q2 is no greater than 2.

In one subsidiary embodiment of the above subembodiment, Q2 is no greater than 1024.

In one embodiment, the conditional configuration storage space in the present application comprises a conditional configuration set list, the conditional configuration set list comprising at least one conditional configuration set, where any conditional configuration set in the conditional configuration set list comprises at least one of a sixth field or a seventh field; the sixth field comprises a target index, and the seventh field comprises at least one target condition index.

In one subembodiment, the conditional configuration set list comprises multiple conditional configuration sets, with the conditional configuration set being one of the multiple conditional configuration sets.

In one subembodiment, the conditional configuration set list comprises Q3 conditional configuration set(s), with the conditional configuration set being one of the Q3 conditional configuration set(s), Q3 being a non-negative integer.

In one subsidiary embodiment of the above subembodiment, Q3 is no greater than 64.

In one subsidiary embodiment of the above subembodiment, Q3 is no greater than 128.

In one subsidiary embodiment of the above subembodiment, Q3 is no greater than 1024.

In one embodiment, the conditional configuration storage space in the present application comprises all or part of a UE variable VarConditionalReconfig.

In one embodiment, the conditional configuration storage space in the present application comprises accumulated Conditional Handover (CHO) configurations or Conditional PSCell Change (CPC) configurations.

In one subembodiment, the CHO configuration or CPC configuration comprises at least one pointer, where any pointer in the CHO configuration or CPC configuration indicates an execution condition for a CHO or a CPC.

In one subsidiary embodiment of the above subembodiment, the execution condition for a CHO or a CPC comprises one or more measIDs being associated.

In one subembodiment, the CHO configuration or CPC configuration comprises RRC configuration of a target candidate SpCell being stored.

In one subsidiary embodiment of the above subembodiment, the special cell includes a PSCell and a PCell.

In one subsidiary embodiment of the above subembodiment, the RRC configuration comprises all or part of an RRC reconfiguration message.

In one embodiment, the conditional configuration storage space in the present application comprises all or part of a condReconfigToAddModList field.

In one embodiment, the conditional configuration storage space in the present application comprises all or part of a condReconfigList field.

In one embodiment, the conditional configuration storage space in the present application comprises all or part of an IE CondReconfigToAddModList.

In one embodiment, the conditional configuration storage space in the present application comprises a UE variable.

In one embodiment, the conditional configuration storage space in the present application comprises all or partial IEs in a UE variable.

In one embodiment, the conditional configuration storage space in the present application comprises all or partial IEs in an RRC message.

In one embodiment, the conditional configuration storage space in the present application comprises all or partial fields in an IE in an RRC message.

In one embodiment, the conditional configuration storage space in the present application comprises all or partial fields in an RRC layer IE.

In one embodiment, the conditional configuration set list in the present application comprises all or part of a condReconfigToAddModList field.

In one embodiment, the conditional configuration set list in the present application comprises all or part of a condReconfigList field.

In one embodiment, the conditional configuration set list in the present application comprises all or part of an IE CondReconfigToAddModList.

In one embodiment, the conditional configuration set list in the present application comprises a candidate SpCell configuration list.

In one embodiment, the candidate SpCell configuration list in the present application comprises at least one candidate special cell configuration.

In one subembodiment, any candidate special cell configuration in the candidate SpCell configuration list is added or modified, where the addition or modification is for a CHO or a CPC.

In one subembodiment, any candidate special cell configuration in the candidate SpCell configuration list comprises CondReconfigToAddMod.

In one subembodiment, the candidate SpCell configuration list comprises multiple candidate special cell configurations, where the candidate special cell configuration is one of the multiple candidate special cell configurations.

In one subembodiment, the candidate SpCell configuration list comprises Q4 candidate special cell configuration(s), where the candidate special cell configuration is one of the Q4 candidate special cell configuration(s), Q4 being a non-negative integer.

In one subsidiary embodiment of the above subembodiment, Q4 is no greater than 64.

In one subsidiary embodiment of the above subembodiment, Q4 is no greater than 128.

In one subsidiary embodiment of the above subembodiment, Q4 is no greater than 1024.

In one embodiment, the conditional configuration storage space in the present application comprises the candidate SpCell configuration list.

In one embodiment, the conditional configuration storage space in the present application comprises a said candidate SpCell configuration list.

In one embodiment, the conditional configuration set list in the present application comprises a conditional reconfiguration list.

In one embodiment, a conditional reconfiguration list in the present application comprises at least one conditional reconfiguration.

In one subembodiment, any conditional reconfiguration in the conditional reconfiguration list is added or modified.

In one subembodiment, any conditional reconfiguration in the conditional reconfiguration list comprises a condReconfigId and associated condExecutionCond and condExecutionCond.

In one subembodiment, the conditional reconfiguration list comprises multiple conditional reconfigurations, with the conditional reconfiguration being one of the multiple candidate special cell configurations.

In one subembodiment, the conditional reconfiguration list comprises Q5 conditional reconfiguration(s), with the conditional reconfiguration being one of the Q5 conditional reconfiguration(s), Q5 being a non-negative integer.

In one subsidiary embodiment of the above subembodiment, Q5 is no greater than 64.

In one subsidiary embodiment of the above subembodiment, Q5 is no greater than 128.

In one subsidiary embodiment of the above subembodiment, Q5 is no greater than 1024.

In one embodiment, the conditional configuration storage space in the present application comprises the conditional reconfiguration list.

In one embodiment, the conditional configuration storage space in the present application comprises a said conditional reconfiguration list.

In one embodiment, the conditional configuration set list in the present application comprises all or partial IEs in an RRC message.

In one embodiment, the conditional configuration set list in the present application comprises all or partial fields in an IE in an RRC message.

In one embodiment, the conditional configuration set list in the present application comprises all or partial fields in an RRC layer IE.

In one embodiment, any conditional configuration set in the conditional configuration storage space in the present application comprises all or part of CondReconfigToAddMod.

In one embodiment, any conditional configuration set in the conditional configuration storage space in the present application comprises all or part of a CondReconfigToAddMod field.

In one embodiment, any conditional configuration set in the conditional configuration storage space in the present application comprises all or partial IEs in an RRC message.

In one embodiment, any conditional configuration set in the conditional configuration storage space in the present application comprises all or partial fields in an IE in an RRC message.

In one embodiment, any conditional configuration set in the conditional configuration storage space in the present application comprises all or partial fields in an RRC layer IE.

In one embodiment, any conditional configuration set in the conditional configuration storage space in the present application comprises: any conditional configuration set in the conditional configuration set list.

In one embodiment, the sixth field in the present application comprises a measId field.

In one embodiment, the sixth field in the present application comprises all or part of a measId field.

In one embodiment, the sixth field in the present application comprises a condReconfigId field.

In one embodiment, the sixth field in the present application comprises all or part of a condReconfigId field.

In one embodiment, the sixth field in the present application comprises a condConfigId field.

In one embodiment, the sixth field in the present application comprises all or part of a condConfigId field.

In one embodiment, the seventh field in the present application comprises a measId field.

In one embodiment, the seventh field in the present application comprises all or part of a measId field.

In one embodiment, the seventh field in the present application comprises a condReconfigId field.

In one embodiment, the seventh field in the present application comprises all or part of a condReconfigId field.

In one embodiment, the seventh field in the present application comprises a condConfigId field.

In one embodiment, the seventh field in the present application comprises all or part of a condConfigId field.

In one embodiment, the target index in the present application is a non-negative integer.

In one embodiment, the target index in the present application is no greater than 16.

In one embodiment, the target index in the present application is no greater than 32.

In one embodiment, the target index in the present application is no greater than 64.

In one embodiment, the target index in the present application is no greater than 1024.

In one embodiment, the first conditional configuration storage space in the present application comprises a UE variable VarConditionalReconfig.

In one embodiment, a conditional configuration set in the first conditional configuration storage space in the present application comes from a first entity.

In one embodiment, a conditional configuration set in the first conditional configuration storage space in the present application comes from a second entity.

In one embodiment, a conditional configuration set in the first conditional configuration storage space in the present application is used for inter-SN CPC.

In one embodiment, a conditional configuration set in the first conditional configuration storage space in the present application is used for intra-SN CPC.

In one embodiment, a conditional configuration set in the first conditional configuration storage space in the present application is used for CPC.

In one embodiment, a conditional configuration set in the first conditional configuration storage space in the present application is used for CPA.

In one embodiment, any conditional configuration set in the first conditional configuration storage space in the present application is used for inter-SN CPC.

In one embodiment, any conditional configuration set in the first conditional configuration storage space in the present application is used for intra-SN CPC.

In one embodiment, two conditional configuration sets in the first conditional configuration storage space in the present application are respectively used for inter-SN CPC and intra-SN CPC.

In one embodiment, two conditional configuration sets in the first conditional configuration storage space in the present application are respectively used for CPC and CPA.

In one embodiment, the first conditional configuration set comprises all or part of CondReconfigToAddMod.

In one embodiment, the first conditional configuration set comprises all or part of a CondReconfigToAddMod field.

In one embodiment, the first conditional configuration set comprises all or partial IEs in an RRC message.

In one embodiment, the first conditional configuration set comprises all or partial fields of an IE in an RRC message.

In one embodiment, the first conditional configuration set comprises all or partial fields in an RRC layer IE.

In one embodiment, the phrase that the first conditional configuration set is a conditional configuration set in a first conditional configuration storage space comprises that: the first conditional configuration set is a conditional configuration set in a conditional configuration set list comprised in the first conditional configuration storage space.

In one embodiment, whether to perform a measurement according to the first measurement configuration set or to perform a measurement according to the second measurement configuration set depends on whether the first conditional configuration set comes from a first entity or from a second entity.

In one embodiment, whether to perform a measurement according to the first measurement configuration set or to perform a measurement according to the second measurement configuration set depends on whether the first conditional configuration set comes from a first entity.

In one embodiment, whether to perform a measurement according to the first measurement configuration set or to perform a measurement according to the second measurement configuration set depends on whether the first conditional configuration set comes from a second entity.

In one embodiment, the first conditional configuration set coming from a first entity or a second entity is used to determine that a measurement is performed according to the first measurement configuration set or the second measurement configuration set.

In one embodiment, whether the first conditional configuration set comes from a first entity is used to determine whether a measurement is performed according to the first measurement configuration set or according to the second measurement configuration set.

In one embodiment, whether the first conditional configuration set comes from a second entity is used to determine whether a measurement is performed according to the first measurement configuration set or according to the second measurement configuration set.

In one embodiment, at least one of a Reference Signal Received Power (RSRP), or a Reference Signal Received Quality (RSRQ), or a Received Signal Strength Indicator (RSSI), or a Signal to Noise and Interference Ratio (SINR), or a Channel Status Information reference signal resource indicator (CRI) is acquired through the action of performing a measurement.

In one embodiment, the measurement is for at least one of a Channel Status Information Reference Signal (CSI-RS), a Cell Reference Signal (CRS), a Synchronization Signal Block (SSB) or a Synchronization Signal/Physical Broadcast Channel (SS/PBCH) block.

In one embodiment, the action of performing a measurement comprises: obtaining an RSRP by measuring a CSI-RS.

In one embodiment, the action of performing a measurement comprises: obtaining an RSRP by measuring an SSB.

In one embodiment, the action of performing a measurement comprises: obtaining an RSRP by measuring a CRS.

In one embodiment, the action of performing a measurement comprises: obtaining an RSRQ by measuring a CSI-RS.

In one embodiment, the action of performing a measurement comprises: obtaining an RSRQ by measuring an SSB.

In one embodiment, the action of performing a measurement comprises: obtaining an RSRQ by measuring a CRS.

In one embodiment, the second measurement configuration set is a measurement configuration set in the first measurement configuration storage space.

In one subembodiment, the phrase that the first measurement configuration set and the second measurement configuration set are different comprises that: fields in the first measurement configuration set and the second measurement configuration set are totally different or partially different.

In one subembodiment, the phrase that the first measurement configuration set and the second measurement configuration set are different comprises that: the first field in the phrase of the first measurement configuration set and the first field in the phrase of the second measurement configuration set are different.

In one subembodiment, the phrase that the first measurement configuration set and the second measurement configuration set are different comprises that: the second field in the phrase of the first measurement configuration set and the second field in the phrase of the second measurement configuration set are different.

In one subembodiment, the phrase that the first measurement configuration set and the second measurement configuration set are different comprises that: the third field in the phrase of the first measurement configuration set and the third field in the phrase of the third measurement configuration set are different.

In one subembodiment, the phrase that the first measurement configuration set and the second measurement configuration set are different comprises that: the fourth field in the phrase of the first measurement configuration set and the fourth field in the phrase of the third measurement configuration set are different.

In one subembodiment, the phrase that the first measurement configuration set and the second measurement configuration set are different comprises that: the fifth field in the phrase of the first measurement configuration set and the fifth field in the phrase of the third measurement configuration set are different.

In one embodiment, the phrase that the first measurement configuration set and the second measurement configuration set are different comprises that: the first measurement configuration set and the second measurement configuration set are respectively measurement configuration sets comprised in different measurement configuration storage spaces.

In one embodiment, the second measurement configuration set is a measurement configuration set in the second measurement configuration storage space.

In one embodiment, the second measurement configuration storage space in the present application is a said measurement configuration storage space.

In one embodiment, the second measurement configuration storage space in the present application comes from a second entity.

In one embodiment, the second measurement configuration storage space in the present application comes from a first entity.

In one embodiment, the second measurement configuration storage space in the present application comes from a second entity, while the first measurement configuration storage space in the present application comes from a first entity.

In one embodiment, the phrase that the first measurement configuration set and the second measurement configuration set are different comprises that: the first measurement configuration set and the second measurement configuration set are respectively measurement configuration sets in different measurement configuration set lists comprised in a same measurement configuration storage space.

In one embodiment, the first measurement configuration storage space comprises a second measurement configuration set list, the second measurement configuration set list being different from the measurement configuration set list comprised in the first measurement configuration storage space.

In one subembodiment, any measurement configuration set in the second measurement configuration set list comprises at least one of the first field, the second field or the third field, where the first field comprises a measurement index, the measurement index being a non-negative integer, the second field comprises a measurement target index, the measurement target index being a non-negative integer, and the third field comprises a reporting configuration index, the reporting configuration index being a non-negative integer.

In one subembodiment, any measurement configuration set in the second measurement configuration set list comprises at least one of the fourth field or the fifth field, where the fourth field comprises a measurement target index, the measurement target index being a non-negative integer, and the fifth field indicates a measurement target.

In one subembodiment, the phrase that the first measurement configuration set and the second measurement configuration set are different comprises that: the first measurement configuration set and the second measurement configuration set are respectively measurement configuration sets comprised in different measurement configuration set lists.

In one subembodiment, the second measurement configuration set list comes from a first entity.

In one subembodiment, the second measurement configuration set list comes from a second entity.

In one subembodiment, the measurement configuration set list comprised in the first measurement configuration storage space comes from a first entity.

In one subembodiment, the measurement configuration set list comprised in the first measurement configuration storage space comes from a second entity.

In one embodiment, a problem to be solved in the present application includes: how to select a corresponding measurement configuration when both the SN and MN are configuring for CPC.

In one embodiment, an advantage of the above method includes: supporting the MN and the SN in performing CPC configuration simultaneously.

In one embodiment, an advantage of the above method includes: no more extra information will be needed for indicating the selection of a measurement configuration set.

Embodiment 1B

Figure 1B:
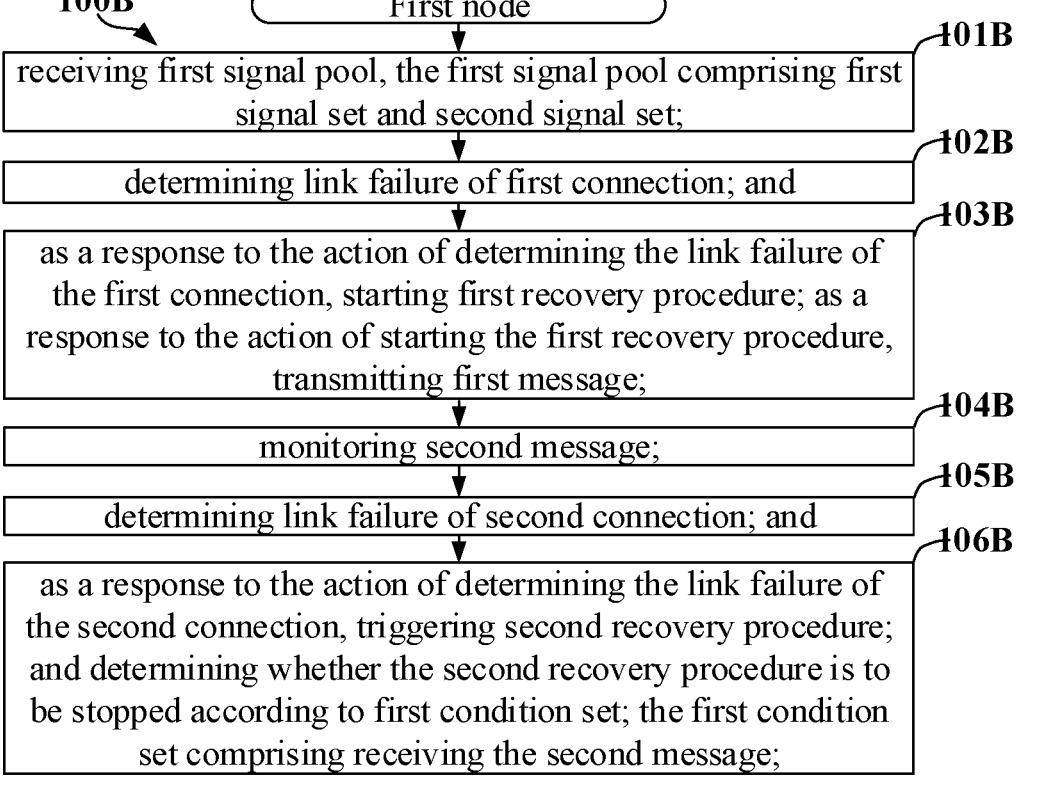
FIG. 1B illustrates a flowchart of transmissions of a first signal pool, a first signal set, and a second signal set, a first message and a second message according to one embodiment of the present application.

Embodiment 1B illustrates a flowchart of transmissions of a first signal pool, a first signal set, and a second signal set, a first message and a second message according to one embodiment of the present application, as shown in FIG. 1B. In FIG. 1B, each step represents a step, it should be particularly noted that the sequence order of each box herein does not imply a chronological order of steps marked respectively by these boxes.

In Embodiment 1B, the first node in the present application receives a first signal pool in step 101B, the first signal pool comprising a first signal set and a second signal set; and determines a link failure of a first connection in step 102B; in step 103B, as a response to the action of determining the link failure of the first connection, starts a first recovery procedure; as a response to the action of starting the first recovery procedure, transmits a first message; and monitors a second message in step 104B; and determines a link failure of a second connection in step 105B; in step 106B, as a response to the action of determining the link failure of the second connection, triggers a second recovery procedure; and determines whether the second recovery procedure is to be stopped according to a first condition set; the first condition set comprising receiving the second message; herein, each of the first signal set and the second signal set respectively comprises at least one reference signal resource, and there exists at least one reference signal resource that only belongs to one of the first signal set or the second signal set; a measurement of the first signal set is used to determine the link failure of the first connection; a measurement of the second signal set is used to determine the link failure of the second connection; only a latter one of the first recovery procedure and the second recovery procedure is related to a random access procedure; the first recovery procedure comprises triggering a first link failure; the first message is related to the link failure of the first connection.

In one embodiment, the first signal pool comprises M signal sets, where M is a positive integer greater than 1, and M is no greater than 10240; the first signal set and the second signal set are respectively signal sets in the first signal pool.

In one subembodiment, the M signal sets correspond to M connections, where the first connection and the second connection are respectively two connections among the M connections.

In one subembodiment, any of the M connections corresponds to a TRP.

In one subembodiment, any of the M connections corresponds to a DU.

In one subembodiment, any of the M connections corresponds to a Base Station (BS).

In one subembodiment, any two connections among the M connections correspond to different TRPs.

In one subembodiment, any two connections among the M connections correspond to a same TRP.

In one subembodiment, any two connections among the M connections correspond to different cells.

In one subembodiment, any two connections among the M connections correspond to a same cell.

In one subembodiment, there exists an independent identifier for any connection among the M connections.

In one subembodiment, the first node has different RNTIs for the M connections.

In one subembodiment, for a connection among the M connections, the first node is assigned a first RNTI, the first RNTI being related to the connection but unrelated to any other of the M connections.

In one embodiment, the first connection and the second connection have different Transmission Configuration Indicators (TCIs).

In one embodiment, the first connection and the second connection have a same TCI.

In one embodiment, the first connection and the second connection have different Quasi-Co-Locations (QCLs).

In one embodiment, the first connection and the second connection have a same QCL.

In one embodiment, the first connection and the second connection have a same COntrol REsource SET (CORESET).

In one embodiment, the first connection and the second connection have different CORESETs.

In one embodiment, the first connection and the second connection are both associated with a first cell.

In one subembodiment, the first cell is a SpCell, the SpCell including a Primary Cell (PCell) or a Primary SCG Cell (PSCell).

In one subembodiment, the first cell is a serving cell of the first node.

In one embodiment, the first connection is associated with the first cell, while the second connection is associated with a second cell.

In one embodiment, the first cell and the second cell refer to physical cells.

In one embodiment, the first cell and the second cell are identified by Physical Cell Identities (PCIs).

In one embodiment, for the first connection and the second connection, the first node has an identical C-RNTI.

In one embodiment, for the first connection and the second connection, the first node has different C-RNTIs.

In one embodiment, the first connection and the second connection are respectively associated with two connection identifiers.

In one subembodiment, the connection identifier that the first connection is associated with and the connection identifier that the second connection is associated with are different.

In one subembodiment, the connection identifier that the first connection is associated with includes the first identifier.

In one embodiment, the first signal pool comprises at least one reference signal resource associated with a serving cell other than the first cell.

In one embodiment, the phrase of the first signal pool comprising a first signal set and a second signal set comprises that: the first signal set and the second signal set are respectively signal sets in the first signal pool.

In one embodiment, the phrase of the first signal pool comprising a first signal set and a second signal set comprises that: reference signal resources in the first signal set and the second signal set both belong to the first signal pool.

In one embodiment, the phrase of the first signal pool comprising a first signal set and a second signal set comprises that: the first signal pool also comprises other reference signal resources.

In one embodiment, the phrase of the first signal pool comprising a first signal set and a second signal set comprises that: the first signal pool is divided into a positive integer number of groups, where the first signal set and the second signal set are respectively two groups among the positive integer number of groups, the positive integer being greater than 1 and no greater than 10240.

In one subembodiment, the first signal pool comprises one or more go s.

In one subembodiment, the first signal pool is associated with a Bandwidth Part (BWP) of the first cell.

In one subembodiment, the first signal pool is associated with the first cell.

In one embodiment, the first signal pool is configured by an RRC message.

In one subembodiment, names of the RRC message include RRCReconfiguration.

In one subembodiment, names of the RRC message include RRCResume.

In one subembodiment, names of the RRC message include RRCSetup.

In one embodiment, the first signal pool is configured by an IE in an RRC message.

In one subembodiment, names of the IE include RadioLinkMonitoringConfig.

In one subembodiment, names of the IE include RadioLinkMonitoringRS-Id.

In one subembodiment, names of the IE include BWP-DownlinkDedicated.

In one subembodiment, names of the IE include BWP-Downlink.

In one subembodiment, names of the IE include ServingCellConfig.

In one subembodiment, names of the IE include CellGroupConfig.

In one embodiment, the first signal pool is configured by a field in an RRC message.

In one subembodiment, names of the field include failureDetectionResourcesToAddModList.

In one subembodiment, names of the field include failureDetectionResourcesToReleaseList.

In one subembodiment, names of the field include RadioLinkMonitoringRS.

In one subembodiment, names of the field include detectionResource.

In one subembodiment, names of the field include ssb-Index.

In one subembodiment, names of the field include csi-RS-Index.

In one embodiment, the first signal set and the second signal set are identical.

In one embodiment, the first signal set and the second signal set are different.

In one embodiment, the first signal set and the second signal set are respectively transmitted by different TRPs.

In one embodiment, the first signal set and the second signal set are associated with a first cell.

In one subembodiment, each of the first signal set and the second signal set respectively comprises at least one reference signal resource being associated with a first cell.

In one subembodiment, the first signal set or the second signal set comprises at least one reference signal resource being associated with a second cell.

In one subembodiment, at least one reference signal resource of the first signal set and at least one reference signal resource of the second signal set are respectively associated with two different TRPs of the first cell.

In one embodiment, the first signal set and the second signal set are associated with two different cells.

In one subembodiment, the first signal set comprises at least one reference signal resource associated with a first cell, while the second signal set comprises at least one reference signal resource associated with a second cell.

In one subembodiment, the first signal set or the second signal set comprises at least one reference signal resource being associated with a second cell.

In one embodiment, the first signal set is associated with the first connection, while the second signal set is associated with the second connection.

In one embodiment, the phrase that each of the first signal set and the second signal set respectively comprises at least one reference signal resource comprises that: the first signal set comprises at least one reference signal resource, and the second signal set comprises at least one reference signal resource.

In one embodiment, the phrase that each of the first signal set and the second signal set respectively comprises at least one reference signal resource comprises that: each of the first signal set and the second signal set respectively consists of one or more reference signal resources.

In one embodiment, the first signal pool comprises K3 reference signal resource(s); the first signal set comprises K1 reference signal resource(s), and the second signal set comprises K2 reference signal resource(s); K1 and K2 are both positive integers; K3 is a positive integer.

In one subembodiment, at least one of the K1 reference signal resource(s) belongs to the first signal set.

In one subembodiment, at least one of the K2 reference signal resource(s) belongs to the second signal set.

In one subembodiment, any of the K1 reference signal resource(s) is different from any of the K2 reference signal resource(s).

In one subembodiment, at least one of the K1 reference signal resource(s) is identical to at least one of the K2 reference signal resource(s).

In one subembodiment, K1 and K2 are configurable.

In one subembodiment, K1 and K2 are equal.

In one subembodiment, K1 and K2 are unequal.

In one subembodiment, a sum of K1 and K2 is equal to K3.

In one subembodiment, a sum of K1 and K2 is less than K3.

In one embodiment, the phrase that there exists at least one reference signal resource that only belongs to one of the first signal set or the second signal set comprises that: there exists at least one reference signal resource that belongs to the second signal set and does not belong to the first signal set.

In one embodiment, the phrase that there exists at least one reference signal resource that only belongs to one of the first signal set or the second signal set comprises that: each reference signal resource in the second signal set does not belong to the first signal set.

In one embodiment, the phrase that there exists at least one reference signal resource that only belongs to one of the first signal set or the second signal set comprises that: there is one reference signal in the second signal set that belongs to both the second signal set and the first signal set.

In one embodiment, there exists at least one reference signal associated with a first cell that belongs to both the first signal set and the second signal set.

In one embodiment, the first signal set comprises the second signal set.

In one embodiment, the first signal set comprises at least one reference signal in the second signal set.

In one embodiment, any reference signal in the first signal set does not belong to the second signal set.

In one embodiment, at least one reference signal in the first signal set is transmitted by a same TRP as the second signal set.

In one embodiment, at least one reference signal in the first signal set is transmitted by a different TRP from the second signal set.

In one embodiment, a reference signal resource is associated with a cell.

In one embodiment, a reference signal resource is associated with a beam.

In one embodiment, a reference signal resource is associated with a TRP.

In one embodiment, a reference signal resource is associated with an antenna port.

In one embodiment, a reference signal resource comprises a Channel State Information-Reference Signal (CSI-RS) resource.

In one embodiment, a reference signal resource comprises a Periodic CSI-RS.

In one embodiment, a reference signal resource comprises a Synchronization Signal Block (SSB) indicated by an SSB index.

In one embodiment, a reference signal resource comprises a CSI-RS resource or an SSB linked with an SSB index.

In one embodiment, a reference signal resource comprises a Synchronization Signal/Physical Broadcast CHannel (SS/PBCH) Block.

In one embodiment, a reference signal resource comprises an SS/PBCH Block indicated by an SS/PBCH Block index.

In one embodiment, the first signal set and the second signal set are used for Beam Failure Detection (BFD) in a Beam Failure Recovery (BFR) mechanism.

In one embodiment, for the detailed meaning of the BFR mechanism, refer to 3GPP TS38.213, Section 6.

In one embodiment, the first signal set comprises a $\bar{q}_0$ or a subset of $\bar{q}_0$.

In one embodiment, the second signal set comprises a $\bar{q}_0$ or a subset of $\bar{q}_0$.

In one embodiment, for the detailed meaning of the go, refer to 3GPP TS38.213, Section 6.

In one embodiment, the first signal set comprises reference signal resources indicated by a TCI state of corresponding CORESET(s) for monitoring a Physical Downlink Control CHannel (PDCCH).

In one embodiment, the second signal set comprises reference signal(s) indicated by a TCI state of corresponding CORESET(s) for monitoring a Physical Downlink Control CHannel (PDCCH).

In one embodiment, the first signal set comprises reference signal(s) indicated by a TCI state corresponding to a first CORESET set, while the second signal set comprises reference signal(s) indicated by a TCI state corresponding to a second CORESETset.

In one embodiment, a name of an index of the first CORESET set includes CORESETPoolIndex, while a name of an index of the second CORESET set includes CORESETPoolIndex.

In one embodiment, a name of an index of the first CORESET set includes CORESET, while a name of an index of the second CORESET set includes CORESET.

In one embodiment, the first signal set comprises reference signal(s) indicated by a TCI state of CORESET(s) associated with a first search space set, while the second signal set comprises reference signal(s) indicated by a TCI state of CORESET(s) associated with a second search space set.

In one embodiment, the first CORESET set comprises at least one CORESET in the second CORESET set.

In one embodiment, the first CORESET set comprises the second CORESET set.

In one embodiment, any CORESET in the first CORESET set does not belong to the second CORESET set.

In one embodiment, the first search space set comprises at least one Search Space in the second search space set.

In one embodiment, the first search space set comprises the second search space set.

In one embodiment, any search space in the first search space set does not belong to the second search space set.

In one embodiment, a TCI state is used to indicate a positive integer number of reference signal resource(s).

In one embodiment, reference signal resource(s) indicated by a TCI state comprises/comprise at least one of a CSI-RS, an SRS or an SS/PBCH block.

In one embodiment, reference signal resource(s) indicated by a TCI state comprises/comprise a reference signal resource of which the type is QCL-TypeD.

In one embodiment, for the detailed meaning of the QCL-TypeD, refer to 3GPP TS38.214, Section 5.1.5.

In one embodiment, reference signal resource(s) indicated by a TCI state is(are) used to determine a QCL parameter.

In one embodiment, reference signal resource(s) indicated by a TCI state is(are) used to determine a spatial domain filter.

In one embodiment, reference signal resource(s) indicated by a TCI state is(are) used to determine a spatial Reception parameter.

In one embodiment, reference signal resource(s) indicated by a TCI state is(are) used to determine a spatial transmission parameter.

In one embodiment, the first signal set corresponds to a first index, while the second signal set corresponds to a second index, the first index and the second index being two non-negative integers different from each other.

In one subembodiment, the first index and the second index respectively correspond to two TRPs of the first cell.

In one subembodiment, the first index is an index of the first signal set, while the second index is an index of the second signal set.

In one subembodiment, the first index is an index of the first CORESET set, while the second index is an index of the second CORESET set.

In one subembodiment, the first index is an index of the first search space set, while the second index is an index of the second search space set.

In one subembodiment, a name of an index includes set or SET.

In one subembodiment, a name of an index includes CORESETPoolIndex.

In one subembodiment, a name of an index includes CORESET or coreset.

In one subembodiment, a name of an index includes TRP.

In one subembodiment, a name of an index includes TCI or tci.

In one subembodiment, a name of an index includes group or GROUP.

In one subembodiment, a name of an index includes link or LINK.

In one subembodiment, the index includes the first index or the second index.

In one embodiment, the first signal set and the second signal set are configured by a same IE in an RRC message.

In one embodiment, the first signal set and the second signal set are configured respectively by two IEs in an RRC message.

In one embodiment, a name of an IE for configuring the first signal set includes BeamFailureRecovery.

In one embodiment, a name of an IE for configuring the first signal set includes BeamFailure.

In one embodiment, a name of an IE for configuring the second signal set includes BeamFailureRecovery.

In one embodiment, a name of an IE for configuring the second signal set includes BeamFailure.

In one embodiment, the first signal set is configured by failureDetectionResources.

In one embodiment, the second signal set is configured by failureDetectionResources.

In one embodiment, for the detailed meaning of the failureDetectionResources, refer to 3GPP TS38.213, Section 6.

In one embodiment, the meaning of the link failure includes: a connection failure.

In one embodiment, the meaning of the link failure includes: a Beam Failure (BF).

In one embodiment, the meaning of the link failure includes: a Beam Link Failure.

In one embodiment, the meaning of the link failure includes: a Radio Link Failure (RLF).

In one embodiment, the meaning of the link failure includes: BFI_COUNTER>=beamFailureInstanceMaxCount.

In one embodiment, the meaning of the link failure includes: the given counter in the present application reaching the given value in the present application.

In one embodiment, the meaning of the link failure includes: a PDCCH failure.

In one embodiment, the meaning of the link failure includes: a downlink control channel failure.

In one embodiment, the action of determining a link failure of a first connection comprises: determining that the link failure occurs in the first connection.

In one embodiment, the action of determining a link failure of a first connection comprises: assuming that the connection failure occurs in the first connection.

In one embodiment, the action of determining a link failure of a first connection comprises: the first counter in the present application being no smaller than a given value.

In one embodiment, the action of determining a link failure of a second connection comprises: determining that the link failure occurs in the second connection.

In one embodiment, the action of determining a link failure of a second connection comprises: assuming that the connection failure occurs in the second connection.

In one embodiment, the action of determining a link failure of a second connection comprises: the second counter in the present application being no smaller than a given value.

In one embodiment, the sentence that "as a response to the action of determining the link failure of the first connection, starting a first recovery procedure" comprises: when the link failure of the first connection is determined, starting the first recovery procedure.

In one embodiment, the sentence that "as a response to the action of determining the link failure of the first connection, starting a first recovery procedure" comprises: determining the link failure of the first connection being used to determine that a first recovery procedure is started.

In one embodiment, the action of starting a first recovery procedure comprises: triggering the first link failure.

In one embodiment, the action of starting a first recovery procedure comprises: transmitting the first message.

In one embodiment, the action of starting a first recovery procedure comprises: generating a BFR Medium Access Control (MAC) layer Control Element (CE) or a Truncated BFR MAC CE.

In one embodiment, the action of starting a first recovery procedure comprises: the first message.

In one embodiment, the action of starting a first recovery procedure comprises: triggering the first link failure for the first connection.

In one embodiment, the phrase of triggering a first link failure comprises: triggering a BFR.

In one embodiment, the phrase of triggering a first link failure comprises: determining a BFR.

In one embodiment, a first link failure refers to a BFR of the first connection.

In one embodiment, a first link failure refers to a beam failure recovery of the first connection.

In one embodiment, the sentence that "as a response to the action of starting the first recovery procedure, transmitting a first message" comprises: when starting the first recovery procedure, transmitting the first message.

In one embodiment, the sentence that "as a response to the action of starting the first recovery procedure, transmitting a first message" comprises: transmitting the first message being an action in the starting of the first recovery procedure.

In one embodiment, as a response to the action of starting a first recovery procedure, triggering a first link failure, and transmitting a first message.

In one embodiment, as a response to the action of starting a first recovery procedure, triggering a first link failure; as a response to the first link failure being triggered and not being canceled, transmitting a first message if any uplink resource is available.

In one embodiment, as a response to the action of starting a first recovery procedure, triggering a first link failure; as a response to the first link failure being triggered and not being canceled, if any UL-SCH resource is available, and the uplink resource can contain the first link failure MAC CE and its subheader, generating the first link failure MAC CE and transmitting a first message.

In one embodiment, as a response to the action of starting a first recovery procedure, triggering a first link failure; as a response to the first link failure being triggered and not being canceled, if any UL-SCH resource is available, but the uplink resource cannot contain the first link failure MAC CE and its subheader, triggering a Scheduling Request (SR).

In one embodiment, as a response to the action of starting a first recovery procedure, triggering a first link failure; as a response to the first link failure being triggered and not being canceled, triggering an SR if no uplink resource is available.

In one embodiment, as a response to the action of starting a first recovery procedure, triggering a first link failure; as a response to the first link failure being triggered and not being canceled, triggering an SR if no uplink resource is available, or transmitting an SR if there is an available Physical Uplink Control Channel (PUCCH) resource for transmitting the SR.

In one embodiment, as a response to the action of starting a first recovery procedure, triggering a first link failure; as a response to the first link failure being triggered and not being canceled, triggering an SR if no uplink resource is available, or triggering a random access procedure if there is no available PUCCH resource for transmitting the SR.

In one embodiment, the SR is used for requesting resources used for bearing the first message.

In one embodiment, a UL Grant resource requested by the SR is used for the first message.

In one embodiment, a UL Grant resource requested by the SR is used for transmitting a Buffer Status Report (BSR), and a UL Grant resource requested by the BSR is used for the first message.

In one embodiment, the meaning of the phrase that only a latter one of the first recovery procedure and the second recovery procedure is related to a random access procedure does not include a random access procedure in an SR procedure.

In one embodiment, the uplink resource comprises a UL-SCH resource.

In one embodiment, the uplink resource comprises a PUCCH resource.

In one embodiment, the uplink resource comprises a PUSCH resource.

In one embodiment, the first message is transmitted via an air interface.

In one embodiment, the first message is transmitted via an antenna port.

In one embodiment, the first message is transmitted via a physical layer signaling.

In one embodiment, the first message is transmitted via a higher layer signaling.

In one embodiment, the first message comprises an Uplink (UL) signal.

In one embodiment, the first message comprises a MAC layer signaling.

In one embodiment, the first message is transmitted by the uplink resource.

In one embodiment, the first message comprises a Layer2 (L2) message.

In one embodiment, the first message comprises a MAC Protocol Data Unit (PDU).

In one embodiment, the first message comprises a MAC CE or a Truncated MAC CE.

In one embodiment, the first message comprises a MAC subheader.

In one embodiment, the first message comprises a BFR MAC CE or a Truncated BFR MAC CE.

In one embodiment, the first message comprises a SP field.

In one subembodiment, the SP field comprises a bit.

In one subembodiment, the SP field is used for indicating that a beam failure is detected in a SpCell.

In one subembodiment, the SP field is set to 0.

In one subembodiment, the SP field is set to 1.

In one embodiment, the first message does not comprise a SP field.

In one embodiment, the first message comprises the first identifier.

In one embodiment, the first message comprises a field, the field being used to determine an entity in which a beam failure occurs.

In one subembodiment, the entity comprises a cell.

In one subsidiary embodiment of the above subembodiment, the cell comprises a SpCell.

In one subsidiary embodiment of the above subembodiment, the cell comprises a SCell.

In one embodiment, the entity is associated with one of the M connections in the present application.

In one embodiment, the first message comprises a field used for indicating a cell in which the beam failure occurs, and the first message comprises a field used for indicating a connection in which the beam failure occurs.

In one embodiment, the first message comprises a field, the field indicating a reference signal resource corresponding to a candidate beam used for recovery of the beam failure.

In one embodiment, the first message comprises a field, the field indicating whether the beam failure occurs in the entity.

In one embodiment, the first message comprises a Reserved bit, the Reserved bit being set to 0.

In one embodiment, the first message comprises a Candidate RS ID field.

In one embodiment, the first message comprises an AC field.

In one embodiment, the first message comprises a Ci field.

In one embodiment, the second message is transmitted via an air interface.

In one embodiment, the second message is transmitted via an antenna port.

In one embodiment, the second message is transmitted via a physical layer signaling.

In one embodiment, the second message is transmitted via a higher layer signaling.

In one embodiment, the second message comprises a Downlink (DL) signal.

In one embodiment, the second message comprises a MAC layer signaling.

In one embodiment, the second message comprises a PDCCH.

In one embodiment, the second message comprises a notification sent to a MAC layer of the first node when a physical layer of the first node receives a PDCCH.

In one embodiment, the second message is associated with a Cell Radio Network Temporary Identifier (C-RNTI) of the first node.

In one embodiment, the second message is associated with the first index.

In one embodiment, the second message is associated with the first connection.

In one embodiment, the second message is addressed to a C-RNTI of the first node.

In one embodiment, the second message is addressed to an RNTI of the first connection.

In one embodiment, the second message is addressed to an identifier of the first connection.

In one embodiment, the second message is addressed to the first identifier.

In one embodiment, the second message is received in a given search space, the given search space being associated with the first connection.

In one embodiment, the second message comprises a MAC CE, the MAC CE carrying the first identifier.

In one embodiment, the second message is scrambled by the first identifier.

In one embodiment, the second message is scrambled by the first RNTI.

In one embodiment, the action of monitoring a second message comprises: detecting the existence of the second message on a channel occupied by the second message.

In one embodiment, the action of monitoring a second message comprises: detecting the existence of the second message through Cyclic Redundancy Check (CRC).

In one embodiment, the action of monitoring a second message comprises: detecting the existence of the second message through blind detection.

In one embodiment, the action of monitoring a second message comprises: detecting the existence of the second message through coherent detection of a characteristic sequence.

In one embodiment, the action of monitoring a second message comprises: receiving the second message when the second message is detected.

In one embodiment, the action of monitoring a second message comprises: determining whether the second message exists by monitoring a PDCCH.

In one embodiment, the meaning of the monitoring includes to monitor.

In one embodiment, the meaning of the monitoring includes to detect.

In one embodiment, the meaning of the monitoring includes to listen over.

In one embodiment, the meaning of the monitoring includes to receive.

In one embodiment, the sentence that "as a response to the action of determining the link failure of the second connection, triggering a second recovery procedure" comprises: when the link failure of the second connection is determined, triggering the second recovery procedure.

In one embodiment, the sentence that "as a response to the action of determining the link failure of the second connection, triggering a second recovery procedure" comprises: when the link failure of the second connection is determined, triggering the second recovery procedure, the second recovery procedure comprises a random access procedure, where the random access procedure comprised in the second recovery procedure comprises transmitting a third message.

In one embodiment, the sentence that "as a response to the action of determining the link failure of the second connection, triggering a second recovery procedure" comprises: determining the link failure of the second connection being used to trigger a second recovery procedure.

In one embodiment, the action of triggering a second recovery procedure comprises: triggering a random access procedure.

In one embodiment, the action of triggering a second recovery procedure comprises: updating a fourth counter, when the fourth counter reaches a fourth value, triggering the random access procedure.

In one subembodiment, the fourth counter is for the first cell.

In one subembodiment, an initial value of the fourth counter equals 0.

In one subembodiment, the fourth counter comprises a BFI

In one subembodiment, the fourth counter is passed.

In one subembodiment, before an occurrence of the link failure of the second connection, the fourth counter is not updated.

In one subembodiment, the link failure occurring in each of the M connections is used to determine that the fourth counter is updated.

In one subembodiment, the fourth value comprises beamFailureInstanceMaxCount.

In one subembodiment, the fourth value is configured via an RRC signaling.

In one subembodiment, the fourth value is configured via one of an RRCReconfiguration message, or an RRCResume message, or an RRCSetup message, or a SIB1 message.

In one subembodiment, the fourth value is configured via an RRC message, where names of an Information Element (IE) in the RRC message include RadioLinkMonitoringConfig.

In one embodiment, the action of triggering a second recovery procedure comprises: not updating a fourth counter, when the link failure of the first connection and the link failure of the second connection are determined, triggering the random access procedure.

In one subembodiment, the random access procedure comprises: a Contention-based Random Access (CBRA).

In one subembodiment, the random access procedure comprises: a Contention-free Random Access (CFRA).

In one subembodiment, the random access procedure comprises: a 4-step RA.

In one subembodiment, the random access procedure comprises: a 2-step RA.

In one embodiment, the action of triggering a second recovery procedure comprises: transmitting the third message.

In one embodiment, the action of triggering a second recovery procedure comprises: receiving the fourth message.

In one embodiment, the meaning of the triggering includes to initiate.

In one embodiment, the meaning of the triggering includes to trigger.

In one embodiment, the meaning of the triggering includes to start.

In one embodiment, the phrase of determining whether the second recovery procedure is to be stopped according to a first condition set comprises: whether the first condition set is satisfied determines whether the second recovery procedure is to be stopped or not.

In one embodiment, the phrase of determining whether the second recovery procedure is to be stopped according to a first condition set comprises: whether to stop the second recovery procedure or continue the second recovery procedure is related to whether the first condition set is satisfied.

In one embodiment, the phrase of determining whether the second recovery procedure is to be stopped according to a first condition set comprises: the first condition set is one of multiple condition sets for stopping the second recovery procedure.

In one embodiment, the phrase of determining whether the second recovery procedure is to be stopped according to a first condition set comprises: the first condition set is used to determine whether the second recovery procedure is to be stopped.

In one embodiment, the phrase of determining whether the second recovery procedure is to be stopped according to a first condition set comprises: when the first condition set is unsatisfied, the second recovery procedure is not stopped because of any condition related to the first condition set.

In one subembodiment, when the first condition set is unsatisfied, the second recovery procedure can be stopped after being triggered by other events.

In one subsidiary embodiment of the above subembodiment, the other events are unrelated to the first condition set.

In one subsidiary embodiment of the above subembodiment, the other events include another random access procedure being triggered.

In one subsidiary embodiment of the above subembodiment, the other events include a handover of BWP.

In one subsidiary embodiment of the above subembodiment, the other events include an LBT triggering a BWP handover and triggering a random access procedure.

In one embodiment, the phrase of determining whether the second recovery procedure is to be stopped according to a first condition set comprises: the first condition set being satisfied is used to determine that the second recovery procedure is to be stopped.

In one embodiment, the phrase of determining whether the second recovery procedure is to be stopped according to a first condition set comprises: the first condition set being unsatisfied is not used to determine that the second recovery procedure is to be stopped.

In one embodiment, the phrase of determining whether the second recovery procedure is to be stopped according to a first condition set comprises: the first condition set being satisfied is a triggering condition for stopping the second recovery procedure.

In one embodiment, the phrase of determining whether the second recovery procedure is to be stopped according to a first condition set comprises: as a response to a first condition set being satisfied, stopping the second recovery procedure.

In one embodiment, the phrase of determining whether the second recovery procedure is to be stopped according to a first condition set comprises: as a response to a first condition set being unsatisfied, not stopping the second recovery procedure.

In one embodiment, the phrase of determining whether the second recovery procedure is to be stopped according to a first condition set comprises: when the second recovery procedure is ongoing, determining whether the second recovery procedure is to be stopped according to a first condition set.

In one embodiment, the phrase of the first condition set comprising receiving the second message comprises: reception of the second message is a condition comprised in the first condition set.

In one embodiment, the phrase of the first condition set comprising receiving the second message comprises: the first condition set is the reception of the second message.

In one embodiment, the phrase of the first condition set comprising receiving the second message comprises: the first condition set comprises multiple conditions, where the reception of the second message is one condition in the first condition set.

In one embodiment, the second recovery procedure is not being performed when the first condition set is satisfied.

In one embodiment, the second recovery procedure is being performed when the first condition set is satisfied.

In one subembodiment, the second recovery procedure being performed comprises that: the fourth counter is unequal to zero, and the fourth counter does not reach the fourth value.

In one subembodiment, the second recovery procedure being performed comprises that: the third message is transmitted, and the fourth message is not received.

In one subembodiment, the second recovery procedure being performed comprises that: the third message is not transmitted, and the fourth message is not received.

In one embodiment, when the first condition set is satisfied, the fourth counter is reset.

In one embodiment, when the first condition set is satisfied, a second timer is stopped, the second timer comprising a beamFailureDetectionTimer, the beamFailureDetection-Timer being associated with the fourth counter.

In one subembodiment, the second timer is for the first cell.

In one subembodiment, when the link failure occurs in each of the M connections, the fourth timer is started or restarted.

In one subembodiment, when the second timer is expired, the fourth counter is reset.

In one subembodiment, a name of the second timer includes beamFailureDetectionTimer.

In one embodiment, when the first condition set is satisfied, the second recovery procedure is stopped.

In one embodiment, when the first condition set is satisfied, the first timer in the present application is stopped.

In one embodiment, when the first condition set is satisfied, the random access procedure in the second recovery procedure is stopped.

In one embodiment, when the first condition set is satisfied, the first link failure is canceled.

In one embodiment, when the first condition set is satisfied, the first counter is reset.

In one embodiment, when the first condition set is satisfied, a third timer is stopped.

In one subembodiment, the third timer is for the first connection.

In one subembodiment, upon reception of the first-type indication in the present application, the third timer is started or restarted.

In one subembodiment, when the third timer is expired, the first counter is reset.

In one subembodiment, a name of the third timer includes beamFailureDetectionTimer.

In one subembodiment, a name of the third timer includes beamFailureDetectionTRPTimer.

In one embodiment, the meaning of the first condition set being satisfied comprises the second message being received.

In one embodiment, the meaning of the first condition set being satisfied comprises the first recovery procedure being successfully completed.

In one embodiment, the phrase that a measurement of the first signal set is used to determine the link failure of the first connection comprises that: the first signal set is associated with the first connection.

In one embodiment, the phrase that a measurement of the first signal set is used to determine the link failure of the first connection comprises that: as a response to a received quality of each reference signal resource in the first signal set being lower than a first threshold, reporting to higher layers a first-type indication used for updating a first counter.

In one embodiment, the phrase that a measurement of the first signal set is used to determine the link failure of the first connection comprises that: a measurement of the first signal set is used to directly determine the link failure of the first connection.

In one embodiment, the phrase that a measurement of the first signal set is used to determine the link failure of the first connection comprises that: a measurement of the first signal set is used to indirectly determine the link failure of the first connection.

In one embodiment, the phrase of a measurement of the first signal set comprises: a measurement of all reference signal resources in the first signal set.

In one embodiment, the phrase of a measurement of the first signal set comprises: a measurement of each reference signal resource in the first signal set.

In one embodiment, the phrase of a measurement of the first signal set comprises: a measurement of any reference signal resource in the first signal set.

In one embodiment, the phrase that a measurement of the second signal set is used to determine the link failure of the second connection comprises that: the second signal set is associated with the second connection.

In one embodiment, the phrase that a measurement of the second signal set is used to determine the link failure of the second connection comprises that: as a response to a received quality of each reference signal resource in the second signal set being lower than a second threshold, reporting to higher layers a second-type indication used for updating a second counter.

In one embodiment, the phrase that a measurement of the second signal set is used to determine the link failure of the second connection comprises that: a measurement of the second signal set is used to directly determine the link failure of the second connection.

In one embodiment, the phrase that a measurement of the second signal set is used to determine the link failure of the second connection comprises that: a measurement of the second signal set is used to indirectly determine the link failure of the second connection.

In one embodiment, the phrase of a measurement of the second signal set comprises: a measurement of all reference signal resources in the second signal set.

In one embodiment, the phrase of a measurement of the second signal set comprises: a measurement of each reference signal resource in the second signal set.

In one embodiment, the phrase of a measurement of the second signal set comprises: a measurement of any reference signal resource in the second signal set.

In one embodiment, the phrase that only a latter one of the first recovery procedure and the second recovery procedure is related to a random access procedure comprises: the first recovery procedure does not comprise a random access procedure, while the second recovery procedure comprises a random access procedure.

In one embodiment, the phrase that only a latter one of the first recovery procedure and the second recovery procedure is related to a random access procedure comprises: the first recovery procedure is unrelated to a random access procedure, while the second recovery procedure is related to a random access procedure.

In one embodiment, the phrase that only a latter one of the first recovery procedure and the second recovery procedure is related to a random access procedure comprises: a candidate beam is indicated via a MAC CE in the first recovery procedure, while a candidate beam is indicated via a PRACH in the second recovery procedure.

In one embodiment, the phrase that only a latter one of the first recovery procedure and the second recovery procedure is related to a random access procedure comprises: the first recovery procedure does not indicate a reference signal resource corresponding to a candidate beam through a random access procedure, while the second recovery procedure indicates a reference signal resource corresponding to a candidate beam through a random access procedure.

In one embodiment, the first link failure comprises a BFR.

In one embodiment, the first link failure comprises a BFR MAC CE.

In one embodiment, the first link failure comprises a BFR for the first connection.

In one embodiment, the first link failure comprises a BFR MAC CE for the first connection.

In one embodiment, the first link failure comprises a beam failure recovery for the first connection.

In one embodiment, the first link failure comprises a MAC CE for a beam failure recovery for the first connection.

In one embodiment, the phrase that the first recovery procedure comprises triggering a first link failure comprises that: triggering the first link failure is a step in the first recovery procedure.

In one embodiment, the phrase that the first recovery procedure comprises triggering a first link failure comprises that: as a response to the action of starting the first recovery procedure, a first link failure is triggered.

In one embodiment, the phrase that the first message is related to the link failure of the first connection comprises that: the first message is used to indicate the link failure of the first connection.

In one embodiment, the phrase that the first message is related to the link failure of the first connection comprises that: the first message is related to the first connection.

In one embodiment, the phrase that the first message is related to the link failure of the first connection comprises that: the first message comprises a first identifier, the first identifier being used to indicate the link failure of the first connection.

In one subembodiment, the phrase that the first message comprises a first identifier comprises: a value of a field in the first message being set to the first identifier.

In one subembodiment, the phrase of the first identifier being used to indicate the link failure of the first connection comprises: determining according to the first identifier that the link failure corresponds to the first connection.

In one subembodiment, the phrase of the first identifier being used to indicate the link failure of the first connection comprises: the first identifier being associated with the first connection.

In one subembodiment, the phrase of the first identifier being used to indicate the link failure of the first connection comprises: the first identifier explicitly indicating the first connection.

In one subsidiary embodiment of the above subembodiment, the first identifier comprises an identifier of the first connection.

In one subsidiary embodiment of the above subembodiment, the first identifier is used for indicating the first connection.

In one subsidiary embodiment of the above subembodiment, the first identifier comprises a TRP ID.

In one subsidiary embodiment of the above subembodiment, the first identifier comprises a Serving Cell ID.

In one subsidiary embodiment of the above subembodiment, the first identifier comprises a CORESET ID.

In one subsidiary embodiment of the above subembodiment, the first identifier comprises a TCI State ID.

In one subsidiary embodiment of the above subembodiment, the first identifier comprises a QCL ID.

In one subsidiary embodiment of the above subembodiment, the first identifier comprises a Link ID.

In one subsidiary embodiment of the above subembodiment, the first identifier comprises a group ID.

In one subsidiary embodiment of the above subembodiment, the first identifier comprises a RS group ID.

In one subembodiment, the phrase of the first identifier being used to indicate the link failure of the first connection comprises: the first identifier implicitly indicating the first connection.

In one subsidiary embodiment of the above subembodiment, the first identifier comprises P2 bit(s), where P2 is an integer no greater than 1024.

In one specific embodiment of the above subsidiary embodiment, P2 is of a fixed size.

In one specific embodiment of the above subsidiary embodiment, P2 is configurable.

In one specific embodiment of the above subsidiary embodiment, P2 is preconfigured via an RRC message.

In one specific embodiment of the above subsidiary embodiment, the P2 bit(s) is/are used for identifying at most (2^P2) connections.

In one specific embodiment of the above subsidiary embodiment, P2 is equal to 1, where the P2 bit being equal to 0 indicates the first connection, while the P2 bit being equal to 1 indicates the second connection.

In one specific embodiment of the above subsidiary embodiment, P2 is equal to 2, where the P2 bits being equal to 00 indicates the first connection, while the P2 bits being equal to 01 indicates the second connection, while the P2 bits being equal to 10 indicates a third connection.

In one specific embodiment of the above subsidiary embodiment, P2 is equal to 2, where the P2 bits being equal to 00 indicates the first connection, while the P2 bits being equal to 01 indicates the second connection, while the P2 bits being equal to 10 indicates a third connection, while the P2 bits being equal to 11 indicates a fourth connection.

In one specific embodiment of the above subsidiary embodiment, the P2 bit(s) is/are used for identifying P2 connection(s).

In one specific embodiment of the above subsidiary embodiment, the P2 bit(s) constitute a bitmap, where each bit in the bitmap is used to indicate a connection; a corresponding bit set to 0 indicates that no link failure occurs, while a corresponding bit set to 1 indicates that a link failure occurs.

In one specific embodiment of the above subsidiary embodiment, P2 is equal to 8, where the P2 bits being set to 00000001 indicates the first connection, while the P2 bits being set to 00000010 indicates the second connection; and so on; in a bitmap there can exist one bit or multiple bits being set to 1 at the same time.

In one subembodiment, the phrase of the first identifier being used to indicate the link failure of the first connection comprises: the first identifier comprises an identifier of the first connection.

In one subsidiary embodiment of the above subembodiment, resetting a counter comprises: setting the counter to 0.

In one subsidiary embodiment of the above subembodiment, resetting a counter comprises: setting the counter to an initial value.

Embodiment 2

Embodiment 2 illustrates a schematic diagram of a network architecture according to one embodiment of the present application, as shown in FIG. 2. FIG. 2 is a diagram illustrating a network architecture 200 of 5G New Radio (NR), Long-Term Evolution (LTE) and Long-Term Evolution Advanced (LTE-A) systems. The 5G NR or LIE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 supports transmissions in NTN.

In one embodiment, the UE 201 supports transmissions in large-delay-difference networks.

In one embodiment, the UE 201 supports transmissions in TN.

In one embodiment, the UE 201 is a UE.

In one embodiment, the UE 201 is an aircraft.

In one embodiment, the UE 201 is a vehicle-mounted terminal.

In one embodiment, the UE 201 is a relay.

In one embodiment, the UE 201 is a vessel.

In one embodiment, the UE 201 is an IoT terminal.

In one embodiment, the UE 201 is an IIoT terminal.

In one embodiment, the UE 201 is a piece of equipment supporting transmissions with low delay and high reliability.

In one embodiment, the gNB203 corresponds to the second-type node in the present application.

In one subembodiment, the second-type node includes the second node in the present application.

In one subembodiment, the second-type node includes the third node in the present application.

In one embodiment, the gNB203 comprises a master node.

In one embodiment, the gNB203 comprises a secondary node.

In one embodiment, the gNB203 comprises a Basestation (BS).

In one embodiment, the gNB203 comprises a UE.

In one embodiment, the gNB203 supports transmissions in NTN.

In one embodiment, the gNB203 supports transmissions in large-delay-difference networks.

In one embodiment, the gNB203 supports transmissions in TN.

In one embodiment, the gNB 203 is a MacroCellular base station.

In one embodiment, the gNB203 is a Micro Cell base station.

In one embodiment, the gNB203 is a Pico Cell base station.

In one embodiment, the gNB203 is a Femtocell.

In one embodiment, the gNB203 is a base station supporting large time-delay difference.

In one embodiment, the gNB203 is a flight platform.

In one embodiment, the gNB203 is satellite equipment.

In one embodiment, the gNB203 is a UE.

In one embodiment, the gNB203 is a Gateway.

In one embodiment, the gNB203 is an NR-supporting base station.

In one embodiment, the gNB203 is an EUTRA-supporting base station.

In one embodiment, the gNB203 is a WLAN-supporting base station.

In one embodiment, the gNB203 is a BT-supporting base station.

Embodiment 3

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, which comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for inter-cell handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resource block) in a cell, as well as for HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics.

In one embodiment, the radio protocol architecture in FIG. 3 is applicable to the first node in the present application.

In one embodiment, the radio protocol architecture in FIG. 3 is applicable to the second-type node in the present application.

In one subembodiment, the second-type node includes the second node in the present application.

In one subembodiment, the second-type node includes the third node in the present application.

In one embodiment, the first signaling in the present application is generated by the RRC 306.

In one embodiment, the second signaling in the present application is generated by the RRC 306.

In one embodiment, the third signaling in the present application is generated by the RRC 306.

In one embodiment, the fourth signaling in the present application is generated by the RRC 306.

In one embodiment, the fifth signaling in the present application is generated by the RRC 306.

Embodiment 4

Embodiment 4 illustrates a schematic diagram of a first communication device and a second communication device according to the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming.

The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication node 450 comprises at least one processor and at least one memory, the at least one memory comprises computer program codes; the at least one memory and the computer program codes are configured to be used in collaboration with the at least one processor, the first communication device 450 at least: receives a first signaling, the first signaling being used to determine a first measurement configuration set, the first measurement configuration set being associated with a first index; receives a second signaling, the second signaling being used to determine a first conditional configuration set, the first conditional configuration set comprising the first index; when the first conditional configuration set comes from a first entity, performs a measurement according to the first measurement configuration set; when the first conditional configuration set comes from a second entity, performs a measurement according to a second measurement configuration set; the first measurement configuration set is a measurement configuration set in a first measurement configuration storage space, the first measurement configuration storage space comprising at least one measurement configuration set; the first index is a non-negative integer; the first measurement configuration set and the second measurement configuration set are different.

In one embodiment, the first communication node 450 comprises a memory that stores a computer readable instruction program, the computer readable instruction program generates actions when executed by at least one processor, which include: receiving a first signaling, the first signaling being used to determine a first measurement configuration set, the first measurement configuration set being associated with a first index; receiving a second signaling, the second signaling being used to determine a first conditional configuration set, the first conditional configuration set comprising the first index; when the first conditional configuration set comes from a first entity, performing a measurement according to the first measurement configuration set; when the first conditional configuration set comes from a second entity, performing a measurement according to a second measurement configuration set; the first measurement configuration set is a measurement configuration set in a first measurement configuration storage space, the first measurement configuration storage space comprising at least one measurement configuration set; the first index is a non-negative integer; the first measurement configuration set and the second measurement configuration set are different.

In one embodiment, the second communication node 410 comprises at least one processor and at least one memory, the at least one memory comprises computer program codes; the at least one memory and the computer program codes are configured to be used in collaboration with the at least one processor. The second communication device 410 at least: transmits a first signaling, the first signaling being used to determine a first measurement configuration set, the first measurement configuration set being associated with a first index; and transmits a second signaling, the second signaling being used to determine a first conditional configuration set, the first conditional configuration set comprising the first index; the first measurement configuration set is a measurement configuration set in a first measurement configuration storage space, the first measurement configuration storage space comprising at least one measurement configuration set; the first index is a non-negative integer; when the first conditional configuration set comes from a first entity, a measurement is performed according to the first measurement configuration set; when the first conditional configuration set comes from a second entity, a measurement is performed according to a second measurement configuration set; the first measurement configuration set and the second measurement configuration set are different.

In one embodiment, the second communication node 410 comprises a memory that stores a computer readable instruction program, the computer readable instruction program generates actions when executed by at least one processor, which include: transmitting a first signaling, the first signaling being used to determine a first measurement configuration set, the first measurement configuration set being associated with a first index; and transmitting a second signaling, the second signaling being used to determine a first conditional configuration set, the first conditional configuration set comprising the first index; the first measurement configuration set is a measurement configuration set in a first measurement configuration storage space, the first measurement configuration storage space comprising at least one measurement configuration set; the first index is a non-negative integer; when the first conditional configuration set comes from a first entity, a measurement is performed according to the first measurement configuration set; when the first conditional configuration set comes from a second entity, a measurement is performed according to a second measurement configuration set; the first measurement configuration set and the second measurement configuration set are different.

In one embodiment, the antenna 452, the receiver 454, the receiving processor 456, and the controller/processor 459 are used for receiving a first signaling; at least one of the antenna 420, the transmitter 418, the transmitting processor 416 or the controller/processor 475 is used for transmitting a first signaling.

In one embodiment, the antenna 452, the receiver 454, the receiving processor 456, and the controller/processor 459 are used for receiving a second signaling; at least one of the antenna 420, the transmitter 418, the transmitting processor 416 or the controller/processor 475 is used for transmitting a second signaling.

In one embodiment, the antenna 452, the transmitter 454, the transmitting processor 468 and the controller/processor 459 are used for transmitting a first signaling; at least one of the antenna 420, the receiver 418, the receiving processor 470 or the controller/processor 475 is used for receiving a first signaling.

In one embodiment, the antenna 452, the transmitter 454, the transmitting processor 468 and the controller/processor 459 are used for transmitting a second signaling; at least one of the antenna 420, the receiver 418, the receiving processor 470 or the controller/processor 475 is used for receiving a second signaling.

In one embodiment, the first communication device 450 corresponds to the first node in the present application.

In one embodiment, the second communication device 410 corresponds to the second-type node in the present application.

In one subembodiment, the second-type node includes the second node in the present application.

In one subembodiment, the second-type node includes the third node in the present application.

In one embodiment, the first communication device 450 is a UE.

In one embodiment, the first communication device 450 is a UE supporting large delay difference.

In one embodiment, the first communication device 450 is a UE supporting NTN.

In one embodiment, the first communication device 450 is an aircraft.

In one embodiment, the first communication device 450 is capable of positioning.

In one embodiment, the first communication device 450 is incapable of positioning.

In one embodiment, the first communication device 450 is a UE supporting TN.

In one embodiment, the second communication device 410 is a base station (gNB/eNB/ng-eNB).

In one embodiment, the second communication device 410 is a base station supporting large delay difference.

In one embodiment, the second communication device 410 is a base station supporting NTN.

In one embodiment, the second communication device 410 is satellite equipment.

In one embodiment, the second communication device 410 is a flight platform.

In one embodiment, the second communication device 410 is a base station supporting TN.

In one embodiment, the second communication device 410 is a UE.

Embodiment 5A

Figure 5A:
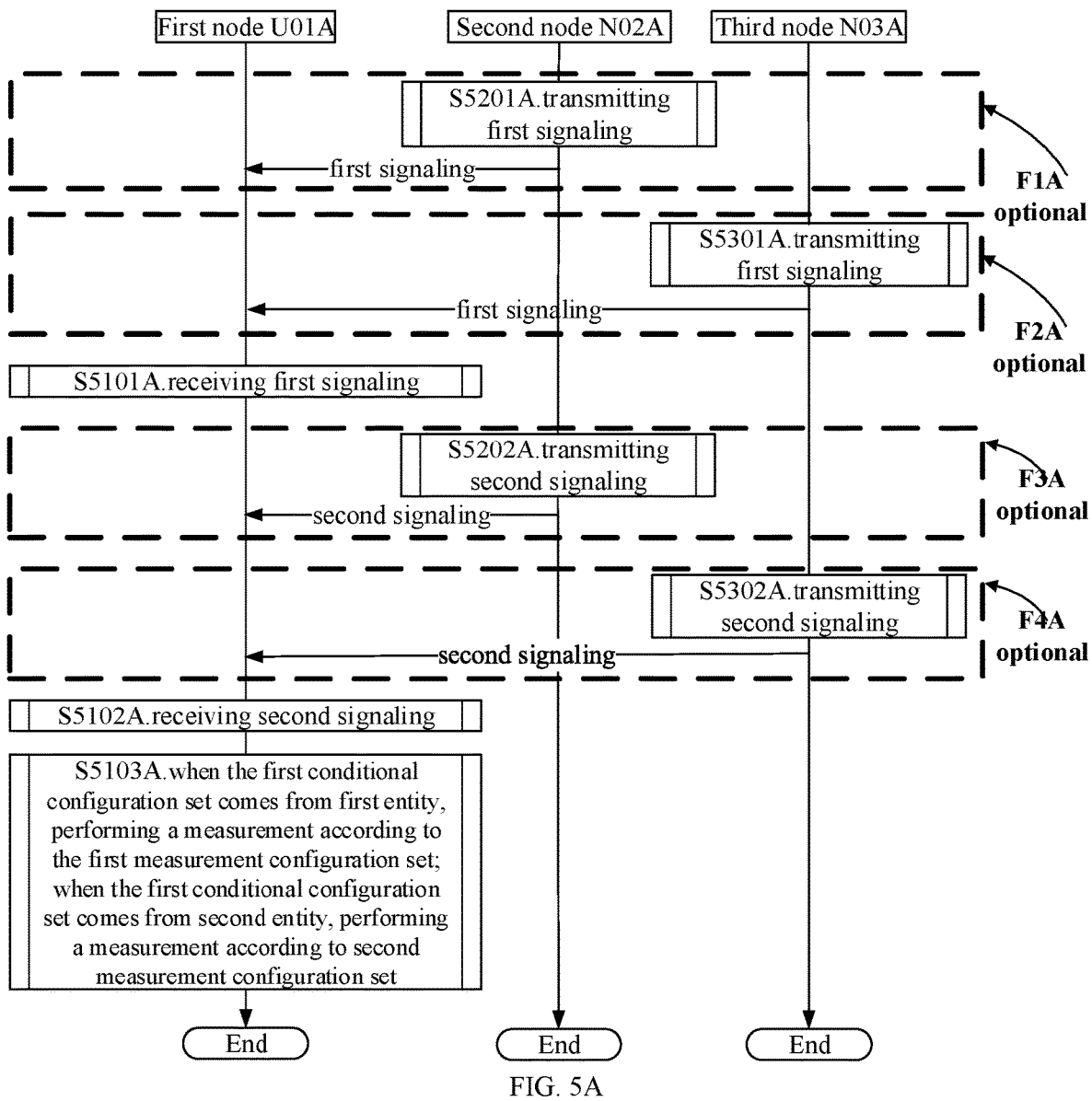
FIG. 5A illustrates a flowchart of radio signal transmission according to one embodiment of the present application.

Embodiment 5A illustrates a flowchart of radio signal transmission according to one embodiment of the present application, as shown in FIG. 5A. It should be particularly noted that the sequence illustrated herein does not set any limit to the signal transmission order or implementation order in the present application.

The first node U01A receives a first signaling in step S5101A, the first signaling being used to determine a first measurement configuration set, the first measurement configuration set being associated with a first index; and receives a second signaling in step S5102A, the second signaling being used to determine a first conditional configuration set, the first conditional configuration set comprising the first index; and in step S5103A, when the first conditional configuration set comes from a first entity, performs a measurement according to the first measurement configuration set; when the first conditional configuration set comes from a second entity, performs a measurement according to a second measurement configuration set;

the second node N02A transmits a first signaling in step S5201A; transmits a second signaling in step S5202A;

the third node N03A transmits a first signaling in step S5301A; and transmits a second signaling in step S5302A.

In Embodiment 5A, the first measurement configuration set is a measurement configuration set in a first measurement configuration storage space, the first measurement configuration storage space comprising at least one measurement configuration set; the first index is a non-negative integer; the first measurement configuration set and the second measurement configuration set are different.

In one embodiment, the first signaling is transmitted on a Uu interface.

In one embodiment, the first signaling is transmitted in a sidelink.

In one embodiment, as a response to receiving the first signaling, a fourth signaling is transmitted.

In one subembodiment, the fourth signaling indicates that a first signaling is successfully received.

In one subembodiment, the fourth signaling indicates that configurations comprised in a first signaling are successfully performed.

In one subembodiment, the fourth signaling comprises all or part of a RRCReconfigurationComplete message.

In one subembodiment, the fourth signaling comprises all or part of a RRCReconfigurationCompleteSidelink message.

In one subembodiment, the fourth signaling comprises a Radio Resource Control (RRC) Message.

In one subembodiment, the fourth signaling comprises all or partial Information Elements (IEs) in an RRC message.

In one subembodiment, the fourth signaling comprises all or partial fields in an IE in an RRC message.

In one subembodiment, the fourth signaling comprises all or part of an upper layer signaling.

In one subembodiment, the fourth signaling comprises all or part of a higher layer signaling.

In one subembodiment, the fourth signaling is transmitted on a Uu interface.

In one subembodiment, the fourth signaling is transmitted in a sidelink.

In one embodiment, the second signaling is transmitted on a Uu interface.

In one embodiment, the second signaling is transmitted in a sidelink.

In one embodiment, as a response to receiving the second signaling, a fifth signaling is transmitted.

In one subembodiment, the fifth signaling indicates that a second signaling is successfully received.

In one subembodiment, the fifth signaling indicates that configurations comprised in a second signaling are successfully performed.

In one subembodiment, the fifth signaling comprises all or part of a RRCReconfigurationComplete message.

In one subembodiment, the fifth signaling comprises all or part of a RRCReconfigurationCompleteSidelink message.

In one subembodiment, the fifth signaling comprises a Radio Resource Control (RRC) Message.

In one subembodiment, the fifth signaling comprises all or partial Information Elements (IEs) in an RRC message.

In one subembodiment, the fifth signaling comprises all or partial fields in an IE in an RRC message.

In one subembodiment, the fifth signaling comprises all or part of an upper layer signaling.

In one subembodiment, the fifth signaling comprises all or part of a higher layer signaling.

In one subembodiment, the fifth signaling is transmitted on a Uu interface.

In one subembodiment, the fifth signaling is transmitted in a sidelink.

In one embodiment, the second signaling is transmitted before the first signaling.

In one embodiment, the second signaling is transmitted after the first signaling.

In one embodiment, the second signaling is transmitted at the same time as the first signaling.

In one embodiment, the second signaling and the first signaling are identical.

In one embodiment, the second signaling and the first signaling are different.

In one embodiment, the second node A comprises an MCG.

In one embodiment, the second node A comprises an SCG.

In one embodiment, the third node A comprises an MCG.

In one embodiment, the third node A comprises an SCG.

In one embodiment, the second node A comprises an MCG, while the third node A comprises an SCG.

In one embodiment, the second node A comprises an SCG, while the third node A comprises an MCG.

In one embodiment, the second node A comprises an MN.

In one embodiment, the second node A comprises an SN.

In one embodiment, the third node A comprises an MN.

In one embodiment, the third node A comprises an SN.

In one embodiment, the second node A comprises an MN, while the third node A comprises an SN.

In one embodiment, the second node A comprises an SN, while the third node A comprises an MN.

In one embodiment, the dotted-line box F1A is optional.

In one embodiment, the dotted-line box F1A exists.

In one embodiment, the dotted-line box F1A does not exist.

In one embodiment, the dotted-line box F2A is optional.

In one embodiment, the dotted-line box F2A exists.

In one embodiment, the dotted-line box F2A does not exist.

In one embodiment, the dotted-line box F3A is optional.

In one embodiment, the dotted-line box F3A exists.

In one embodiment, the dotted-line box F3A does not exist.

In one embodiment, the dotted-line box F4A is optional.

In one embodiment, the dotted-line box F4A exists.

In one embodiment, the dotted-line box F4A does not exist.

In one embodiment, the first index indicates that the first conditional configuration set comes from the first entity or comes from the second entity.

In one embodiment, the first index explicitly indicates that the first conditional configuration set comes from the first entity or comes from the second entity.

In one embodiment, the first index implicitly indicates that the first conditional configuration set comes from the first entity or comes from the second entity.

In one subembodiment, when the first index comes from the first entity, the first conditional configuration set comes from the first entity.

In one subembodiment, the first index coming from the first entity indicates that the first conditional configuration set comes from the first entity.

In one subsidiary embodiment of the above subembodiment, the phrase of the first index coming from the first entity comprises that: the first index is an index in a first index set, the first index set coming from the first entity; the first index set comprises at least one index, and any index in the first index set is a non-negative integer.

In one subsidiary embodiment of the above subembodiment, the phrase of the first index coming from the first entity comprises that: the first index is smaller than or equal to a first threshold.

In one subsidiary embodiment of the above subembodiment, the phrase of the first index coming from the first entity comprises that: the first index is smaller than a first threshold.

In one subsidiary embodiment of the above subembodiment, the phrase of the first index coming from the first entity comprises that: the first index is larger than a first threshold.

In one subsidiary embodiment of the above subembodiment, the phrase of the first index coming from the first entity comprises that: the first index is larger than or equal to a first threshold.

In one subembodiment, when the first index comes from the second entity, the first conditional configuration set comes from the second entity.

In one subembodiment, the first index coming from the second entity indicates that the first conditional configuration set comes from the second entity.

In one subsidiary embodiment of the above subembodiment, the phrase of the first index coming from the second entity comprises that: the first index is an index in a second index set, the second index set coming from the second entity; the second index set comprises at least one index, and any index in the first index set is a non-negative integer.

In one subsidiary embodiment of the above subembodiment, the phrase of the first index coming from the second entity comprises that: the first index is smaller than or equal to a first threshold.

In one subsidiary embodiment of the above subembodiment, the phrase of the first index coming from the second entity comprises that: the first index is smaller than a first threshold.

In one subsidiary embodiment of the above subembodiment, the phrase of the first index coming from the second entity comprises that: the first index is larger than a first threshold.

In one subsidiary embodiment of the above subembodiment, the phrase of the first index coming from the second entity comprises that: the first index is larger than or equal to a first threshold.

In one embodiment, the first threshold in the present application is a non-negative integer.

In one embodiment, the first threshold in the present application is no greater than 32.

In one embodiment, the first threshold in the present application is no greater than 64.

In one embodiment, the first threshold in the present application is determined through coordination of the first entity and the second entity.

In one embodiment, the first threshold in the present application is configured via a first signaling.

In one embodiment, the first threshold in the present application is configured via a second signaling.

In one embodiment, the first threshold in the present application is configured via a third signaling.

In one subembodiment, the third signaling comprises all or part of a RRCReconfiguration message.

In one subembodiment, the third signaling comprises all or part of a RRCConnectionReconfiguration message.

In one subembodiment, the third signaling comprises a Radio Resource Control (RRC) Message.

In one subembodiment, the third signaling comprises all or partial Information Elements (IEs) in an RRC message.

In one subembodiment, the third signaling comprises all or partial fields in an IE in an RRC message.

In one embodiment, any conditional configuration set in the first conditional configuration storage space in the present application comprises an eighth field, the eighth field indicating that a conditional configuration set to which it belongs comes from the first entity or from the second entity.

In one embodiment, the eighth field in the present application is set to indicate that a conditional configuration set to which the eighth field belongs comes from a first entity.

In one embodiment, the eighth field in the present application is not set to indicate that a conditional configuration set to which the eighth field belongs comes from a first entity.

In one embodiment, the eighth field in the present application is set to indicate that a conditional configuration set to which the eighth field belongs comes from a second entity.

In one embodiment, the eighth field in the present application is not set to indicate that a conditional configuration set to which the eighth field belongs comes from a second entity.

In one embodiment, the first conditional configuration set comprises the eighth field.

In one embodiment, the first conditional configuration set comprises the eighth field, the eighth field indicating that the first conditional configuration set comes from the first entity or comes from the second entity.

In one subembodiment, the eighth field in the first conditional configuration set is set to indicate that the first conditional configuration set comes from a first entity.

In one subembodiment, the eighth field in the first conditional configuration set is not set to indicate that the first conditional configuration set comes from a first entity.

In one subembodiment, the eighth field in the first conditional configuration set is set to indicate that the first conditional configuration set comes from a second entity.

In one subembodiment, the eighth field in the first conditional configuration set is not set to indicate that the first conditional configuration set comes from a second entity.

in one embodiment, the first conditional configuration storage space in the present application comprises the eighth field, and the first conditional configuration set comprises at least one of the sixth field or the seventh field, where the eighth field indicates that any conditional configuration set in the first conditional configuration storage space comes from a first entity or from a second entity.

In one subembodiment, the eighth field is set to indicate that the first conditional configuration set comes from a first entity.

In one subembodiment, the eighth field is not set to indicate that the first conditional configuration set comes from a first entity.

In one subembodiment, the eighth field is set to indicate that the first conditional configuration set comes from a second entity.

In one subembodiment, the eighth field is not set to indicate that the first conditional configuration set comes from a second entity.

In one embodiment, the eighth field in the present application comprises N1 bit(s), N1 being a positive integer.

In one subembodiment, N1 is equal to 1.

In one subsidiary embodiment of the above subembodiment, the eighth field being configured to be 1 indicates that the eighth field is set.

In one subsidiary embodiment of the above subembodiment, the eighth field being configured to be 0 indicates that the eighth field is set.

In one subsidiary embodiment of the above subembodiment, the eighth field being configured to be 1 indicates that the eighth field is not set.

In one subsidiary embodiment of the above subembodiment, the eighth field being configured to be 0 indicates that the eighth field is not set.

In one subembodiment, N1 is no greater than 8.

In one subembodiment, N1 is no greater than 1024.

In one subembodiment, the N1 is equal to a number of conditional configuration set(s) stored in the first conditional configuration storage space, where the N1 bit(s) corresponds/correspond respectively to the conditional configuration set(s) stored in the first conditional configuration storage space.

In one subsidiary embodiment of the above subembodiment, a first bit among the N1 bits corresponds to a first conditional configuration set stored in the first conditional configuration storage space; a second bit among the N1 bits corresponds to a second conditional configuration set stored in the first conditional configuration storage space; and so on.

In one subsidiary embodiment of the above subembodiment, an N1-th bit among the N1 bits corresponds to a first conditional configuration set stored in the first conditional configuration storage space; a (N1−1)-th bit among the N1 bits corresponds to a second conditional configuration set stored in the first conditional configuration storage space; and so on.

In one subsidiary embodiment of the above subembodiment, any bit of the N1 bit(s) being set to 1 indicates that a corresponding conditional configuration set comes from a first entity.

In one subsidiary embodiment of the above subembodiment, any bit of the N1 bit(s) being set to 1 indicates that a corresponding conditional configuration set comes from a second entity.

In one subsidiary embodiment of the above subembodiment, any bit of the NO bit(s) being set to 0 indicates that a corresponding conditional configuration set comes from a first entity.

In one subsidiary embodiment of the above subembodiment, any bit of the NO bit(s) being set to 0 indicates that a corresponding conditional configuration set comes from a second entity.

In one embodiment, the eighth field is an enumeration type variable.

In one embodiment, the eighth field being configured to be 1 indicates that the eighth field is set.

In one embodiment, the eighth field being configured to be 0 indicates that the eighth field is set.

In one embodiment, the eighth field is a Boolean type variable.

In one embodiment, the eighth field being configured to be true indicates that the eighth field is set.

In one embodiment, the eighth field being configured to be false indicates that the eighth field is set.

In one embodiment, the eighth field being configured to be true indicates that the eighth field is not set.

In one embodiment, the eighth field being configured to be false indicates that the eighth field is not set.

In one embodiment, the eighth field being existent indicates that the eighth field is set.

In one embodiment, the eighth field being absent indicates that the eighth field is set.

In one embodiment, the eighth field being existent indicates that the eighth field is not set.

In one embodiment, the eighth field being absent indicates that the eighth field is not set.

In one embodiment, the phrase that the first conditional configuration set comes from a first entity comprises that: the second signaling comes from the first entity.

In one embodiment, the phrase that the first conditional configuration set comes from a first entity comprises that: the second signaling comes from the first entity, the second signaling comprising the first conditional configuration.

In one embodiment, the phrase that the first conditional configuration set comes from a second entity comprises that: the second signaling comes from the second entity.

In one embodiment, the phrase that the first conditional configuration set comes from a second entity comprises that: the second signaling comes from the second entity, the second signaling comprising the first conditional configuration.

In one embodiment, the second signaling coming from the first entity indicates that the first conditional configuration set comes from the first entity.

In one embodiment, the second signaling coming from the second entity indicates that the first conditional configuration set comes from the second entity.

In one embodiment, the phrase that the first conditional configuration set comes from a first entity comprises that: the first conditional configuration set is a conditional configuration set in the first conditional configuration storage space.

In one embodiment, the phrase that the first conditional configuration set comes from a second entity comprises that: when the first conditional configuration set is a conditional configuration set in a second conditional configuration storage space, the second conditional configuration storage space is a said conditional configuration storage space.

In one subembodiment, the second conditional configuration storage space comes from a second entity.

In one embodiment, the first conditional configuration storage space and the second conditional configuration storage space are different.

In one embodiment, the phrase of the second signaling being used to determine a first conditional configuration set comprises: adding the first conditional configuration set in the first conditional configuration storage space according to the second signaling.

In one embodiment, the phrase of the second signaling being used to determine a first conditional configuration set comprises: modifying the first conditional configuration set in the first conditional configuration storage space according to the second signaling.

In one embodiment, the phrase of the second signaling being used to determine a first conditional configuration set comprises: modifying all or partial fields comprised in the first conditional configuration set in the first conditional configuration storage space according to the second signaling.

In one embodiment, the phrase of the second signaling being used to determine a first conditional configuration set comprises: when the second signaling comes from a first entity, modifying the first conditional configuration set in the first conditional configuration storage space according to the second signaling.

In one embodiment, the phrase of the second signaling being used to determine a first conditional configuration set comprises: adding the first conditional configuration set in the second conditional configuration storage space according to the second signaling.

In one embodiment, the phrase of the second signaling being used to determine a first conditional configuration set comprises: modifying the first conditional configuration set in the second conditional configuration storage space according to the second signaling.

In one embodiment, the phrase of the second signaling being used to determine a first conditional configuration set comprises: modifying all or partial fields comprised in the first conditional configuration set in the second conditional configuration storage space according to the second signaling.

In one embodiment, the phrase of the second signaling being used to determine a first conditional configuration set comprises: when the second signaling comes from a second entity, modifying the first conditional configuration set in the second conditional configuration storage space according to the second signaling.

In one embodiment, the phrase of modifying in the present application includes: adding.

In one embodiment, the phrase of modifying in the present application includes: deleting.

In one embodiment, the phrase of modifying in the present application includes: substituting/replacing.

Embodiment 5B

Figure 5B:
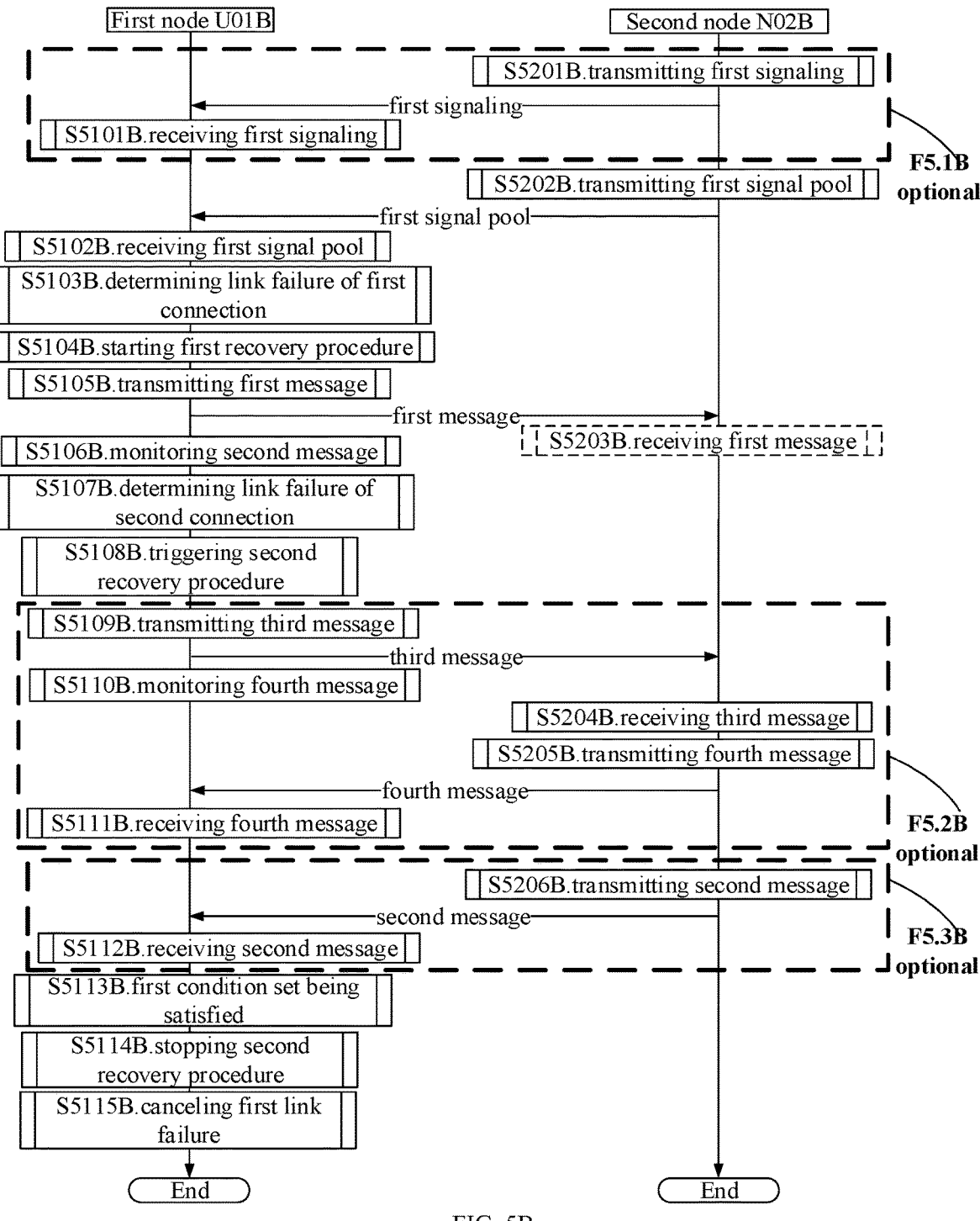
FIG. 5B illustrates a flowchart of radio signal transmission according to one embodiment of the present application.

Embodiment 5B illustrates a flowchart of radio signal transmission according to one embodiment of the present application, as shown in FIG. 5B. It should be particularly noted that the sequence illustrated herein does not set any limit to the signal transmission order or implementation order in the present application.

The first node U01B receives a first signaling in step S5101B; and receives a first signal pool in step S5102B; and determines a link failure of a first connection in step S5103B; in step S5104B, as a response to the action of determining the link failure of the first connection, starts a first recovery procedure; in step S5105B, as a response to the action of starting the first recovery procedure, transmits a first message; and monitors a second message in step S5106B; and determines a link failure of a second connection in step S5107B; in step S5108B, as a response to the action of determining the link failure of the second connection, triggers a second recovery procedure; and transmits a third message in step S5109B; and monitors a fourth message in step S5110B; receives the fourth message in step S5111B; receives the second message in step S5112B; in step S5113B, a first condition set is satisfied; in step S5114B, as a response to the first condition set being satisfied, stops the second recovery procedure; and in step S5115B, as a response to the first condition set being satisfied, cancels the first link failure.

The second node N02B transmits the first signaling in step S5201B; transmits the first signal pool in step S5202B; receives the first message in step S5203B; and receives the third message in step S5204B; and transmits the fourth message in step S5205B; and transmits the second message in step S5206B.

In Embodiment 5B, the first signal pool comprises a first signal set and a second signal set; each of the first signal set and the second signal set respectively comprises at least one reference signal resource, and there exists at least one reference signal resource that only belongs to one of the first signal set or the second signal set; a measurement of the first signal set is used to determine the link failure of the first connection; a measurement of the second signal set is used to determine the link failure of the second connection; only a latter one of the first recovery procedure and the second recovery procedure is related to a random access procedure; the first recovery procedure comprises triggering a first link failure; the first message is related to the link failure of the first connection; the random access procedure comprised in the second recovery procedure comprises transmitting a third message, the third message being used to trigger the fourth message; whether the second recovery procedure is to be stopped is determined according to a first condition set; the first condition set comprising receiving the second message; the first signaling is used to indicate a first expiration value.

In one embodiment, the first node U01B comprises a UE.

In one embodiment, the second node N02B comprises a base station.

In one embodiment, the second node N02B comprises one or more TRPs.

In one embodiment, the action of monitoring a fourth message comprises: detecting the existence of the fourth message on a channel occupied by the fourth message.

In one embodiment, the action of monitoring a fourth message comprises: detecting the existence of the fourth message according to CRC.

In one embodiment, the action of monitoring a fourth message comprises: detecting the existence of the fourth message through blind detection.

In one embodiment, the action of monitoring a fourth message comprises: detecting the existence of the fourth message through coherent detection of a characteristic sequence.

In one embodiment, the action of monitoring a fourth message comprises: receiving the fourth message when the fourth message is detected.

In one embodiment, the action of monitoring a fourth message comprises: determining whether the fourth message exists by monitoring a PDCCH.

In one embodiment, the phrase that the random access procedure comprised in the second recovery procedure comprises transmitting a third message comprises that: the third message is transmitted in the second recovery procedure.

In one embodiment, the phrase that the random access procedure comprised in the second recovery procedure comprises transmitting a third message comprises that: the second recovery procedure comprises the random access procedure, and the third message is a message in the random access procedure.

In one embodiment, the third message is transmitted via an air interface.

In one embodiment, the third message is transmitted via an antenna port.

In one embodiment, the third message is associated with the first cell.

In one embodiment, the third message is associated with a connection among the M connections.

In one embodiment, the third message is used for starting the random access procedure.

In one embodiment, the third message is transmitted on a Physical Random Access Channel (PRACH).

In one embodiment, the third message is transmitted on a PUSCH.

In one embodiment, the third message is a first message in the random access procedure.

In one embodiment, the third message comprises all or part of a Physical Layer Signal.

In one embodiment, the third message comprises all or part of an RRC message.

In one embodiment, the third message comprises an Uplink (UL) signal.

In one embodiment, the third message comprises at least one of a PRACH or a PUSCH.

In one embodiment, the third message comprises a Message 1 (Msg1).

In one embodiment, the third message comprises a Message 3 (Msg3).

In one embodiment, the third message comprises a BFR MAC CE or a Truncated BFR MAC CE.

In one embodiment, the third message comprises a MAC CE.

In one embodiment, the third message comprises a first data unit, the first data unit being used to indicate the second link failure.

In one embodiment, the third message comprises a first characteristic sequence.

In one subembodiment, the first characteristic sequence refers to a Random Access Preamble.

In one subembodiment, the first characteristic sequence comprises one or more of a pseudo-random sequence, a Zadoff-Chu sequence or a low-Peak-to-Average Power Ratio (low-PAPR) sequence.

In one subembodiment, the first characteristic sequence comprises Cyclic Prefix (CP).

In one subembodiment, the first characteristic sequence comprises a positive integer.

In one subembodiment, the first characteristic sequence comprises a bit string.

In one embodiment, the third message comprises a first sub-message and a second sub-message.

In one subembodiment, the first sub-message comprises a first characteristic sequence.

In one subembodiment, the second sub-message comprises a MAC CE.

In one subembodiment, the second sub-message comprises a BFR MAC CE or a Truncated BFR MAC CE.

In one subembodiment, the second sub-message bears a first message.

In one subembodiment, the second sub-message comprises a C-RNTI MAC CE.

In one subembodiment, the second sub-message comprises the first identifier.

In one subembodiment, the second sub-message comprises the Candidate RS ID.

In one subembodiment, the first sub-message comprises an Msg1, while the second sub-message comprises an Msg3 PUSCH.

In one subembodiment, the first sub-message comprises an Msg1, while the second sub-message comprises a PUSCH scheduled by a Random Access Response (RAR) Uplink Grant.

In one embodiment, the third message comprises an MsgA, the third message comprising the first sub-message and the second sub-message.

In one embodiment, the fourth message is transmitted via an air interface.

In one embodiment, the fourth message is transmitted via an antenna port.

In one embodiment, the fourth message is transmitted on a PDCCH.

In one embodiment, the fourth message comprises all or part of a Physical Layer Signal.

In one embodiment, the fourth message comprises all or part of a MAC layer signaling.

In one embodiment, the fourth message comprises all or part of an RRC message.

In one embodiment, the fourth message comprises a physical-layer signaling.

In one embodiment, the fourth message comprises a PDCCH.

In one embodiment, the fourth message comprises a Downlink (DL) signal.

In one embodiment, the fourth message comprises all or part of a MAC layer signaling.

In one embodiment, the fourth message comprises an activation command of a higher layer for a TCI state.

In one embodiment, the fourth message comprises an activation command for a higher-layer parameter tci-StatesPDCCH-ToAddList and/or a higher-layer parameter tci-StatesPDCCH-ToReleaseList.

In one embodiment, the fourth message comprises a MAC CE for indicating a PDCCH TCI.

In one embodiment, the fourth message comprises an RRC signaling for configuring a CORESET TCI-state.

In one embodiment, the fourth message comprises Downlink Control Information (DCI).

In one embodiment, the fourth message comprises a Message 2 (Msg2).

In one embodiment, the fourth message comprises a Message 4 (Msg4).

In one embodiment, the fourth message comprises a Message B (MsgB).

In one embodiment, the fourth message comprises an RAR

In one embodiment, the fourth message comprises a MAC subheader.

In one embodiment, the fourth message comprises a MAC sub-PDU.

In one embodiment, the fourth message comprises a Timing Advance (TA).

In one embodiment, the fourth message comprises a successRAR.

In one embodiment, the fourth message comprises at least one of a Timing Advance Command (TAC), or a UL Grant, or a Temporary C-RNTI (TC-RNTI).

In one embodiment, the fourth message is identified by a C-RNTI.

In one embodiment, a CRC of the fourth message is scrambled by a C-RNTI or a Modulation and Coding Scheme (MCS)-C-RNTI.

In one embodiment, a CRC of the fourth message is scrambled by a Temporary C-RNTI.

In one embodiment, a CRC of the fourth message is scrambled by a C-RNTI.

In one embodiment, a CRC of the fourth message is scrambled by a MsgB-RNTI.

In one embodiment, a CRC of the fourth message is scrambled by a Random Access (RA)-RNTI.

In one embodiment, a CRC of the fourth message is scrambled by the first RNTI.

In one embodiment, the fourth message comprises a third sub-message and a fourth sub-message.

In one subembodiment, the third sub-message comprises an Msg2, while the fourth sub-message comprises an Msg4.

In one subembodiment, the third sub-message comprises an MsgB, while the fourth sub-message comprises an Msg4.

In one subembodiment, the third sub-message comprises an Msg2.

In one subembodiment, the third sub-message comprises an RAR.

In one subembodiment, the third sub-message comprises a UL grant.

In one subembodiment, the third sub-message comprises a Temporary C-RNTI.

In one subembodiment, the third sub-message comprises a Timing Advance Command (TAC).

In one subembodiment, the third sub-message comprises a fallbackRAR.

In one subembodiment, the fourth sub-message comprises an Msg4.

In one subembodiment, the fourth sub-message comprises a UE Contention Resolution Identity.

In one embodiment, the second recovery procedure comprises transmitting the third message, and monitoring or receiving the fourth message.

In one subembodiment, the third message comprises a Message1 (Msg1), while the fourth message comprises a Message2 (Msg2).

In one subembodiment, the third message comprises a MessageA (MsgA), while the fourth message comprises a MessageB (MsgB).

In one embodiment, the second recovery procedure comprises transmitting the first sub-message, monitoring or receiving the second sub-message, transmitting the third sub-message, and monitoring or receiving the fourth sub-message.

In one subembodiment, the first sub-message comprises a Message1 (Msg1), the second sub-message comprises a Message2 (Msg2), the third sub-message comprises a Message3 (Msg3), and the fourth sub-message comprises a Message4 (Msg4).

In one subembodiment, the first sub-message comprises a MessageA (MsgA), the second sub-message comprises a MessageB (MsgB), the third sub-message comprises a Message3 (Msg3), and the fourth sub-message comprises a Message4 (Msg4).

In one embodiment, the fourth message comprises a Contention Resolution Physical Downlink Shared Channel (PDSCH).

In one embodiment, the phrase of the third message being used to trigger the fourth message comprises that: the second node N02B's reception of the third message is used to determine that the fourth message is to be transmitted.

In one embodiment, the phrase of the third message being used to trigger the fourth message comprises that: the fourth message is a response to the third message.

In one embodiment, the phrase of the third message being used to trigger the fourth message comprises that: the fourth message is used for an acknowledgement for the third message.

In one embodiment, the phrase of the third message being used to trigger the fourth message comprises that: the third message being transmitted is used to determine that the fourth message is monitored in a time window.

In one subembodiment, the time window comprises a positive integer number of slot(s).

In one subembodiment, the time window comprises a positive integer number of millisecond(s) (ms).

In one subembodiment, the time window comprises a contiguous time interval.

In one subembodiment, the time window comprises a ra-ResponseWindow.

In one subembodiment, the time window comprises a msgB-ResponseWindow.

In one subembodiment, the time window is configured through a BeamFailureRecoveryConfig IE.

In one subembodiment, the time window is configured through a RACH-ConfigCommon IE.

In one subembodiment, the time window is configured through a RACH-ConfigGenericTwoStepRA IE.

In one embodiment, the phrase of the third message being used to trigger the fourth message comprises that: the first sub-message being transmitted is used to determine that the third sub-message is monitored in a time window.

In one embodiment, the phrase of the third message being used to trigger the fourth message comprises that: the second sub-message being transmitted is used to determine that the fourth sub-message is monitored in another time window.

In one subembodiment, the other time window comprises a positive integer number of millisecond(s) (ms).

In one subembodiment, the other time window comprises a contiguous time interval.

In one subembodiment, the other time window comprises a timer.

In one subembodiment, the other time window comprises a ra-ContentionResolutionTimer.

In one subembodiment, the other time window is configured through a RACH-ConfigCommon IE.

In one subembodiment, the other time window is configured through a RACH-ConfigCommonTwoStepRA IE.

In one embodiment, the third message supports retransmissions.

In one embodiment, the second sub-message supports retransmissions.

In one embodiment, the third sub-message supports retransmissions.

In one embodiment, the fourth sub-message supports retransmissions.

In one embodiment, the fourth message supports retransmissions.

In one embodiment, the sentence that "as a response to the first condition set being satisfied, canceling the first link failure" comprises that: the first condition set being satisfied is used to determine the first link failure.

In one embodiment, the sentence that "as a response to the first condition set being satisfied, canceling the first link failure" comprises that: the first condition set being satisfied is a triggering condition for cancelling the first link failure.

In one embodiment, the sentence that "as a response to the first condition set being satisfied, canceling the first link failure" comprises that: when the first condition set is satisfied, the first link failure is canceled.

In one embodiment, the first signaling comprises a downlink signaling.

In one embodiment, the first signaling comprises all or part of a higher layer signaling.

In one embodiment, the first signaling comprises an RRC message.

In one subembodiment, names of the RRC message include RRCReconfiguration.

In one embodiment, the first signaling comprises one IE in an RRC message.

In one subembodiment, names of the IE include BeamFailureRecoveryConfig.

In one subembodiment, names of the IE include Cell-GroupConfig.

In one subembodiment, names of the IE include Serving-CellConfig.

In one subembodiment, names of the IE include BWP-Uplink.

In one subembodiment, names of the IE include BWP-UplinkDedicated.

In one embodiment, the first signaling comprises one field in an RRC message.

In one subembodiment, names of the field include beamFailureRecoveryTimer.

In one embodiment, the first expiration value comprises a positive integer number of millisecond(s), the positive integer being no greater than 10240.

In one embodiment, the first expiration value comprises a positive integer number of slot(s), the positive integer being no greater than 10240.

In one embodiment, the dotted-line box F5.1B exists.

In one embodiment, the dotted-line box F5.1B does not exist.

In one embodiment, the dotted-line box F5.2B exists.

In one subembodiment, each step marked by the dotted-line box F5.2B exists.

In one subembodiment, some steps marked by the dotted-line box F5.2B exist.

In one embodiment, the dotted-line box F5.2B does not exist.

In one embodiment, the dotted-line box F5.3B exists.

In one subembodiment, each step marked by the dotted-line box F5.3B exists.

In one subembodiment, some steps marked by the dotted-line box F5.3B exist.

In one embodiment, the dotted-line box F5.3B does not exist.

In one embodiment, all or partial steps marked by the dotted-line box F5.2B are before all or partial steps marked by the dotted-line box F5.3B.

In one embodiment, all or partial steps marked by the dotted-line box F5.2B are after all or partial steps marked by the dotted-line box F5.3B.

In one embodiment, neither of the dotted-line box F5.2B and the dotted-line box F5.3B exists.

In one embodiment, both of the dotted-line box F5.2B and the dotted-line box F5.3B exist.

In one embodiment, each step marked by the dotted-line box F5.3B exists, while at least the S5111B marked by the dotted-line box F5.2B does not exist.

In one embodiment, the step S5203B exists.

In one embodiment, the step S5203B does not exist.

In one embodiment, when the dotted-line box F5.3B exists, the step S5203B exists.

In one embodiment, the slot comprises at least one of slot(s), or subframe(s), or Radio Frame(s), or multiple Orthogonal Frequency Division Multiplexing (OFDM) symbols, or multiple Single Carrier Frequency Division Multiple Access (SC-FDMA) symbols.

Embodiment 6A

Embodiment 6A illustrates a schematic diagram of the structure of a measurement configuration storage space according to one embodiment of the present application, as shown in FIG. 6A. In FIG. 6A, the symbol "--ASN1START" indicates a start of an ASN message; the symbol "-- ASN1STOP" indicates an end of an ASN message; the symbol "-- TAG- measurement configuration storage space -START" indicates a start of the measurement configuration storage space variable; the symbol "-- TAG-measurement configuration storage space-STOP" indicates an end of the measurement configuration storage space variable; the symbol "::=" indicates being defined as or equivalent to.

In one embodiment, the first measurement configuration storage space comprises a measurement configuration storage space.

In one embodiment, the second measurement configuration storage space comprises a measurement configuration storage space.

In one embodiment, the measurement configuration storage space in the present application comprises a measurement configuration set list, the measurement configuration set list comprising at least one measurement configuration set; any measurement configuration set in the measurement configuration set list comprises at least one of the first field, or the second field or the third field, where the first field comprises a measurement index, the measurement index being a non-negative integer, the second field comprises a measurement target index, the measurement target index being a non-negative integer, and the third field comprises a reporting configuration index, the reporting configuration index being a non-negative integer.

In one subembodiment, the measurement configuration set list comprises multiple measurement configuration sets, with the measurement configuration set being one of the multiple measurement configuration sets.

In one subembodiment, the measurement configuration set list comprises K2 measurement configuration set(s), with the measurement configuration set being one of the K2 measurement configuration set(s), K2 being a non-negative integer.

In one subsidiary embodiment of the above subembodiment, K2 is no greater than 64.

In one subsidiary embodiment of the above subembodiment, K2 is no greater than 128.

In one subembodiment, the phrase that the first measurement configuration set is a measurement configuration set in a first measurement configuration storage space comprises that: the first measurement configuration set is a measurement configuration set in the measurement configuration set list comprised in the first measurement configuration storage space.

In one embodiment, the measurement configuration storage space comprises a UE variable VarMeasConfig, the measurement configuration set list comprises all or part of a measIdToAddModList list, and the any measurement configuration set comprises all or part of MeasIdToAddMod.

In one embodiment, the measurement configuration storage space comprises a UE variable VarMeasConfig, and the any measurement configuration set comprises all or part of MeasIdToAddMod.

In one embodiment, the measurement configuration storage space comprises all or part of a measIdToAddModList list, and the any measurement configuration set comprises all or part of MeasIdToAddMod.

In one embodiment, the first measurement configuration set comprises the first field, the second field and the third field.

In one embodiment, the second measurement configuration set comprises the first field, the second field and the third field.

In one embodiment, the first measurement configuration set is identified by the first index.

In one embodiment, the second measurement configuration set is identified by the first index.

In one embodiment, the first measurement configuration set is identified by the second index.

In one embodiment, the second measurement configuration set is identified by the second index.

In one subembodiment, the phrase that the first measurement configuration set is associated with a first index comprises that: the first index is a measurement index comprised in a first field in the first measurement configuration set.

In one subembodiment, the phrase that the first measurement configuration set is associated with a first index comprises that: the first index is identical to a measurement index comprised in a first field in the first measurement configuration set.

In one subembodiment, the phrase that the first measurement configuration set is associated with a first index comprises that: a first field in the first measurement configuration set comprises the first index.

In one subembodiment, the phrase that the first measurement configuration set is associated with a first index comprises that: the first index is a measurement target index comprised in a second field in the first measurement configuration set.

In one subembodiment, the phrase that the first measurement configuration set is associated with a first index comprises that: the first index is identical to a measurement target index comprised in a second field in the first measurement configuration set.

In one subembodiment, the phrase that the first measurement configuration set is associated with a first index comprises that: a second field in the first measurement configuration set comprises the first index.

In one subembodiment, the phrase that the first measurement configuration set is associated with a first index comprises that: the first index is a reporting configuration index comprised in a third field in the first measurement configuration set.

In one subembodiment, the phrase that the first measurement configuration set is associated with a first index comprises that: the first index is identical to a reporting configuration index comprised in a third field in the first measurement configuration set.

In one subembodiment, the phrase that the first measurement configuration set is associated with a first index comprises that: a third field in the first measurement configuration set comprises the first index.

In one subembodiment, the second index is a measurement index comprised in a first field in the first measurement configuration set.

In one subembodiment, the second index is identical to a measurement index comprised in a first field in the first measurement configuration set.

In one subembodiment, a first field in the first measurement configuration set comprises the second index.

In one subembodiment, the second index is a measurement target index comprised in a second field in the first measurement configuration set.

In one subembodiment, the second index is identical to a measurement target index comprised in a second field in the first measurement configuration set.

In one subembodiment, a second field in the first measurement configuration set comprises the second index.

In one subembodiment, the second index is a reporting configuration index comprised in a third field in the first measurement configuration set.

In one subembodiment, the second index is identical to a reporting configuration index comprised in a third field in the first measurement configuration set.

In one subembodiment, a third field in the first measurement configuration set comprises the second index.

Embodiment 6B

Embodiment 6B illustrates a flowchart of radio signal transmission according to another embodiment of the present application, as shown in FIG. 6B. It should be particularly noted that the sequence illustrated herein does not set any limit to the signal transmission order or implementation order in the present application.

The first node U01 receives a first signaling in step S6101; receives a first signal pool in step S6102; and determines a link failure of a first connection in step S6103; in step S6104, as a response to the action of determining the link failure of the first connection, starts a first recovery procedure; in step S6105, as a response to the action of starting the first recovery procedure, transmits a first message; and monitors a second message in step S6106; determines a link failure of a second connection in step S6107; in step S6108, as a response to the action of determining the link failure of the second connection, triggers a second recovery procedure; and transmits a third message in step S6109; and monitors a fourth message in step S6110; receives the fourth message in step S6111; receives the second message in step S6112; in step S6113, a first condition set is not satisfied; in step S6114, the second recovery procedure is successfully completed; and in step S6115, as a response to the second recovery procedure being successfully completed, stops the first recovery procedure.

The second node N02 transmits the first signaling in step S6201; transmits the first signal pool in step S6202; receives the first message in step S6203; and receives the third message in step S6204; and transmits the fourth message in step S6205; and transmits the second message in step S6206.

In Embodiment 6B, the first signal pool comprises a first signal set and a second signal set; each of the first signal set and the second signal set respectively comprises at least one reference signal resource, and there exists at least one reference signal resource that only belongs to one of the first signal set or the second signal set; a measurement of the first signal set is used to determine the link failure of the first connection; a measurement of the second signal set is used to determine the link failure of the second connection; only a latter one of the first recovery procedure and the second recovery procedure is related to a random access procedure; the first recovery procedure comprises triggering a first link failure; the first message is related to the link failure of the first connection; the random access procedure comprised in the second recovery procedure comprises transmitting a third message, the third message being used to trigger the fourth message; the second recovery procedure being successfully completed comprises receiving the fourth message; whether the second recovery procedure is to be stopped is determined according to a first condition set; the first condition set comprising receiving the second message; the first signaling is used to indicate a first expiration value.

In one embodiment, the first condition set not being satisfied comprises that: when the second recovery procedure is successfully completed, the second message is not received.

In one embodiment, the first condition set not being satisfied comprises that: during the performance of the second recovery procedure, the second message is not received.

In one embodiment, the first condition set not being satisfied comprises that: during a period while the first timer in the present application is running, the second message is not received.

In one embodiment, the first condition set not being satisfied comprises that: the second message is received, but the second reference signal resource does not belong to the first resource pool.

In one subembodiment, the first message is used to indicate the first reference signal resource in the present application in the first resource pool in the present application.

In one subembodiment, the third message is used to indicate a second reference signal resource.

In one embodiment, after the third message is transmitted, if a PDCCH associated with the given signal is received, it is determined that the second recovery procedure is successfully completed.

In one embodiment, after the first sub-message is transmitted, the third sub-message is received and the second sub-message is transmitted, the second sub-message comprising a C-RNTI MAC CE, after the second sub-message's being transmitted, if a PDCCH is received, it is determined that the second recovery procedure is successfully completed.

In one embodiment, after the third message is transmitted, a PDCCH is received, if the PDCCH is addressed to a C_RNTI of the first node U01, it is determined that the second recovery procedure is successfully completed.

In one embodiment, the third message comprises a C-RNTI MAC CE, after the given signal is transmitted, a PDCCH is received, the PDCCH being addressed to a C_RNTI, then it is determined that the second recovery procedure is successfully completed.

In one embodiment, after the first sub-message is transmitted, the third sub-message is received and the second sub-message is transmitted, the second sub-message comprising a C-RNTI MAC CE, after the second sub-message's being transmitted, if a PDCCH is received, and the PDCCH is addressed to a C_RNTI of the first node U01, it is determined that the second recovery procedure is successfully completed.

In one embodiment, after the third message is transmitted, a PDCCH is received in a search space indicated by a recoverySearchSpaceId, if the PDCCH is addressed to a C_RNTI, then it is determined that the second recovery procedure is successfully completed.

In one embodiment, as a response to the second recovery procedure being successfully completed, the first counter is reset.

In one embodiment, as a response to the second recovery procedure being successfully completed, the first recovery procedure is stopped.

In one embodiment, as a response to the second recovery procedure being successfully completed, the fourth counter is reset.

In one embodiment, as a response to the second recovery procedure being successfully completed, the first timer is stopped.

In one embodiment, as a response to the second recovery procedure being successfully completed, the second timer is stopped.

In one embodiment, as a response to the second recovery procedure being successfully completed, the third timer is stopped.

In one embodiment, as a response to the second recovery procedure being successfully completed, if the second reference signal resource belongs to the first resource pool, the first recovery procedure is stopped.

In one subembodiment, performing a third recovery procedure is continued, the third recovery procedure is for the link failure of the second connection, and the third recovery procedure is performed in the same way as the first recovery procedure.

In one embodiment, as a response to the second recovery procedure being successfully completed, if the second reference signal resource belongs to the first resource pool, the first counter is reset.

In one embodiment, as a response to the second recovery procedure being successfully completed, if the second reference signal resource belongs to the first resource pool, the third timer is stopped.

In one embodiment, the second recovery procedure being successfully completed comprises that: the random access procedure in the second recovery procedure is successfully completed In one embodiment, the second recovery procedure being successfully completed comprises that: after transmitting a PDCCH request, the first node U01 receives information of feedback for a beam failure recovery request.

In one embodiment, the phrase that the second recovery procedure being successfully completed comprises receiving the fourth message comprises that: as a response to receiving the fourth message, it is determined that the second recovery procedure is successfully completed.

In one embodiment, the phrase that the second recovery procedure being successfully completed comprises receiving the fourth message comprises that: receiving the fourth message is used to determine that the second recovery procedure is successfully completed.

In one embodiment, the phrase that the second recovery procedure being successfully completed comprises receiving the fourth message comprises that: after the third message is transmitted, a PDCCH is received during running of the time window in the present application, it is then assumed that the second recovery procedure is successfully completed.

In one subembodiment, the fourth message comprises the PDCCH.

In one subembodiment, the PDCCH is received in a given search space.

In one subsidiary embodiment of the above subembodiment, the given search space is associated with the third message.

In one subsidiary embodiment of the above subembodiment, when the PDCCH is received in a given search space, a physical layer of the first node U01 transmits a notification to a physical layer of the first node U01.

In one subsidiary embodiment of the above subembodiment, the fourth message comprises the notification.

In one subembodiment, the PDCCH is addressed to a C-RNTI.

In one subembodiment, the third message is used for CFRA in the second recovery procedure.

In one subembodiment, the third message comprises a CFRA Preamble of a beam failure recovery request.

In one subembodiment, the given search space is indicated by a recoverySearchSpaceId.

In one subembodiment, the given search space is associated with the first cell, the first cell being identified by a C-RNTI.

In one subembodiment, the given search space is associated with the first connection.

In one subembodiment, a random access procedure in the second recovery procedure comprises a CFRA.

In one subembodiment, when the PDCCH is received, a physical layer of the first node U01 transmits a notification to a physical layer of the first node U01.

In one embodiment, the phrase that the second recovery procedure being successfully completed comprises receiving the fourth message comprises that: after the first sub-message is transmitted, the third sub-message is received during running of the time window in the present application, and the second sub-message is transmitted, a PDCCH is received during running of the other time window in the present application, it is assumed that the second recovery procedure is successfully completed.

In one subembodiment, the third message comprises the first sub-message and the second sub-message.

In one subembodiment, the fourth message comprises the third sub-message and the fourth sub-message.

In one subembodiment, the fourth message comprises the fourth sub-message.

In one subembodiment, a random access procedure in the second recovery procedure comprises a CBRA.

In one subembodiment, a random access procedure in the second recovery procedure comprises a CFRA.

In one subembodiment, when the PDCCH is received, a physical layer of the first node U01 transmits a notification to a physical layer of the first node U01.

In one subembodiment, the fourth sub-message comprises the notification.

In one subembodiment, the fourth sub-message comprises the PDCCH.

In one embodiment, the dotted-line box F6.1 exists.

In one embodiment, the dotted-line box F6.1 does not exist.

In one embodiment, the dotted-line box F6.2 exists.

In one subembodiment, each step marked by the dotted-line box F6.2 exists.

In one subembodiment, some steps marked by the dotted-line box F6.2 exist.

In one embodiment, the dotted-line box F6.2 does not exist.

In one embodiment, the dotted-line box F6.3 exists.

In one subembodiment, each step marked by the dotted-line box F6.3 exists.

In one subembodiment, some steps marked by the dotted-line box F6.3 exist.

In one embodiment, the dotted-line box F6.3 does not exist.

In one embodiment, all or partial steps marked by the dotted-line box F6.2 are before all or partial steps marked by the dotted-line box F6.3.

In one embodiment, all or partial steps marked by the dotted-line box F6.2 are after all or partial steps marked by the dotted-line box F6.3.

In one embodiment, neither of the dotted-line box F6.2 and the dotted-line box F6.3 exists.

In one embodiment, both of the dotted-line box F6.2 and the dotted-line box F6.3 exist.

In one embodiment, the step S6203 exists.

In one embodiment, the step S6203 does not exist.

In one embodiment, when the dotted-line box F6.3 exists, the step S6203 exists.

In one embodiment, each step marked by the dotted-line box F6.2 exists, while at least the S6112 marked by the dotted-line box F6.3 does not exist.

Embodiment 7A

Embodiment 7A illustrates a schematic diagram of the structure of a conditional configuration storage space according to one embodiment of the present application, as shown in FIG. 7A. In FIG. 7A, the symbol "--ASN1START" indicates a start of an ASN message; the symbol "--ASN1STOP" indicates an end of an ASN message; the symbol "-- TAG- conditional configuration storage space -START" indicates a start of the conditional configuration storage space variable; the symbol "-- TAG-conditional configuration storage space-STOP" indicates an end of the conditional configuration storage space variable; the symbol "::=" indicates being defined as or equivalent to.

In one embodiment, the first conditional configuration storage space in the present application comprises a conditional configuration storage space.

In one embodiment, the conditional configuration storage space in the present application comprises a conditional configuration set list, the conditional configuration set list comprising at least one conditional configuration set, where any conditional configuration set in the conditional configuration set list comprises at least one of a sixth field or a seventh field; the sixth field comprises a target index, and the seventh field comprises at least one target condition index.

In one subembodiment, the conditional configuration set list comprises multiple conditional configuration sets, with the conditional configuration set being one of the multiple conditional configuration sets.

In one subembodiment, the conditional configuration set list comprises Q3 conditional configuration set(s), with the conditional configuration set being one of the Q3 conditional configuration set(s), Q3 being a non-negative integer.

In one subsidiary embodiment of the above subembodiment, Q3 is no greater than 64.

In one subsidiary embodiment of the above subembodiment, Q3 is no greater than 128.

In one subsidiary embodiment of the above subembodiment, Q3 is no greater than 1024.

In one embodiment, the first conditional configuration set is a conditional configuration set in a first conditional configuration storage space.

In one embodiment, the second conditional configuration set is a conditional configuration set in a first conditional configuration storage space.

In one subembodiment, the first conditional configuration set comprises the sixth field and the seventh field.

In one subembodiment, the second conditional configuration set comprises the sixth field and the seventh field.

In one embodiment, the second conditional configuration set is a conditional configuration set in a second conditional configuration storage space.

In one embodiment, the second conditional configuration storage space in the present application comprises a said conditional configuration storage space.

In one embodiment, the phrase of the first conditional configuration set comprising the first index comprises: the first index being a target index comprised in the sixth field in the first conditional configuration set.

In one embodiment, the phrase of the first conditional configuration set comprising the first index comprises:

the first index being a target condition index comprised in the seventh field in the first conditional configuration set.

In one embodiment, the phrase of the first conditional configuration set comprising the first index comprises: a sixth field in the first conditional configuration set comprises the first index.

In one embodiment, the phrase of the first conditional configuration set comprising the first index comprises: a seventh field in the first conditional configuration set comprises the first index.

In one subembodiment, the second index is a target index comprised in the sixth field in the first measurement configuration set.

In one subembodiment, the second index is a target condition index comprised in the seventh field in the first measurement configuration set.

In one subembodiment, a sixth field in the first conditional configuration set comprises the second index.

In one subembodiment, a seventh field in the first conditional configuration set comprises the second index.

In one embodiment, the phrase of the first conditional configuration set comprising the first index comprises: the first conditional configuration set being identified by the first index.

In one embodiment, the sixth field in the first conditional configuration set comprises the first index, while the seventh field in the first conditional configuration set comprises the second index, and the first field in the first measurement configuration set comprises the second index.

In one embodiment, the seventh field in the first conditional configuration set comprises the first index, and the first field in the first measurement configuration set comprises the first index.

In one embodiment, the seventh field in the first conditional configuration set comprises the first index, and the first field in the first measurement configuration set comprises the first index, while the second field in the first measurement configuration set comprises the second index.

In one embodiment, the sixth field in the first conditional configuration set comprises the first index, while the seventh field in the first conditional configuration set comprises the second index, and the first field in the second measurement configuration set comprises the second index.

In one embodiment, the seventh field in the first conditional configuration set comprises the first index, and the first field in the second measurement configuration set comprises the first index.

In one embodiment, the seventh field in the first conditional configuration set comprises the first index, and the first field in the second measurement configuration set comprises the first index, while the second field in the second measurement configuration set comprises the second index.

Embodiment 7B

Embodiment 7B illustrates a schematic diagram of combined designing of a first recovery procedure and a second recovery procedure according to one embodiment of the present application, as shown in FIG. 7B. In FIG. 7B, each rectangular box or diamond box represents a step of implementation. It should be particularly noted that the sequence illustrated herein does not set any limit on the orders in which signals are transmitted and implementations in this present application.

In Embodiment 7B, the first node in the present application determines a link failure of a first connection in step S701; starts a first recovery procedure in step S702; and determines a link failure of a second connection in step S703; triggers a second recovery procedure in step S704; and in step S705, determine whether a first condition set is satisfied, when the first condition set is satisfied, enter into step S706(a), or when the first condition set is unsatisfied, enter into step S706(b); stops the second recovery procedure in step S706(a); cancels the first link failure in step S707(a); and in step S706(b), determines whether the second recovery procedure is successfully completed, when the second recovery procedure is successfully completed, enter into step S707(b), otherwise, enter into step S707(c); stops the first recovery procedure in step S707(b); and determines a radio link failure in step S707(c).

In one embodiment, the phrase as a response to the second recovery procedure comprises: when the second recovery procedure is failed.

In one embodiment, the phrase as a response to the second recovery procedure comprises: a step following that the second recovery procedure failure is determined.

In one embodiment, the second recovery procedure being failed comprises that: a random access procedure in the second recovery procedure is not successfully completed.

In one embodiment, the second recovery procedure being failed comprises that: the fourth message is not successfully received in the second recovery procedure.

In one embodiment, the second recovery procedure being failed comprises that: the first timer in the present application is expired in the second recovery procedure.

In one embodiment, the second recovery procedure being failed comprises that: a number of preamble sequence transmissions reaches a maximum value in the random access procedure in the second recovery procedure, i.e., PREAMBLE_TRANSMISSION_COUNTER= preambleTransMax+1.

In one subembodiment, the third message comprises a said preamble sequence.

In one subembodiment, for the definitions of the PRE-AMBLE_TRANSMISSION_COUNTER and the preamble-TransMax and the way of counting these values, refer to 3GPP TS38.321, Section 5.1.

In one embodiment, the action of determining a radio link failure comprises: the first node transmitting an indication to upper layers of the first node, the indication being used to determine an occurrence of the radio link failure.

In one subembodiment, the indication is used for indicating a random access problem to upper layers.

In one subembodiment, the indication is used for triggering the radio link failure.

In one subembodiment, the indication is generated in a MAC layer.

In one subembodiment, the upper layers comprise a protocol layer above a MAC layer.

In one subembodiment, the upper layers comprise an RRC layer.

In one embodiment, the action of determining a radio link failure comprises: indicating the indication to the upper layers (which means indicating a Random Access problem to upper layers).

In one embodiment, the action of determining a radio link failure comprises: executing actions related to the radio link failure.

In one embodiment, the action of determining a radio link failure comprises: assuming that the radio link failure occurs.

In one embodiment, the radio link failure comprises a Radio Link Failure (RLF).

In one embodiment, the radio link failure comprises a Handover Failure (HOF).

In one embodiment, the first recovery procedure is for one or more TRPs, while the second recovery procedure is for the first cell.

In one embodiment, the first recovery procedure is for one or more TRPs, while the second recovery procedure is for the TRP.

Embodiment 8A

Embodiment 8A illustrates a schematic diagram of a first node in connection with a second node and a third node simultaneously according to one embodiment of the present application. In Embodiment 8A, the first node is a UE, while the second node and the third node are two base stations, respectively; the two solid lines respectively represent a link between the first node and a second node and a link between the first node and the third node; the broken line represents a link between the second node and the third node.

In Embodiment 8A, the first node is in connection with the second node and the third node simultaneously.

In one embodiment, the second node comprises a said second-type node in the present application.

In one embodiment, the third node comprises a said second-type node in the present application.

In one embodiment, the second node and the third node are in connection via an Xn interface.

In one embodiment, the second node and the third node are in connection via an Xn-C interface.

In one embodiment, the second node and the third node are in connection via an X2-C interface.

In one embodiment, a link between the second node and the third node is a non-ideal backhaul.

In one embodiment, a link between the second node and the third node is an ideal backhaul.

In one embodiment, the first node and the third node are in connection via a Uu interface.

In one embodiment, the first node and the second node are in connection via a Uu interface.

In one embodiment, the first node is a device supporting Dual Connectivity (DC).

In one embodiment, the first node supports Multi-Radio Dual Connectivity (MR-DC).

In one embodiment, the first node supports NR-NR Dual Connectivity (NR DC).

In one embodiment, the first node supports Intra-E-UTRA DC.

In one embodiment, the first node supports NR-E-UTRA Dual Connectivity (NE-DC).

In one embodiment, the first node supports NG-RAN E-UTRA-NR Dual Connectivity (NGEN-DC).

In one embodiment, the first node supports E-UTRA-NR Dual Connectivity (EN DC).

In one embodiment, a signaling bearer between the first node and the second node includes an SRB1.

In one embodiment, a signaling bearer between the first node and the second node includes an SRB2.

In one embodiment, a signaling bearer between the first node and the second node includes an SRB3.

In one embodiment, a signaling bearer between the first node and the third node includes an SRB1.

In one embodiment, a signaling bearer between the first node and the third node includes an SRB2.

In one embodiment, a signaling bearer between the first node and the third node includes an SRB3.

In one embodiment, the second node comprises a Master Node (MN), while the third node comprises a Secondary Node (SN).

In one embodiment, the second node comprises a Master eNodeB (MeNB), while the third node comprises a SgNB.

In one embodiment, the second node comprises a Centralized Unit (CU), while the third node comprises a DU.

In one embodiment, the second node comprises a node in a Master Cell Group (MCG), while the third node comprises a node in a Secondary Cell Group (SCG).

In one embodiment, the second node comprises a Secondary Node (SN), while the third node comprises a Master Node (MN).

In one embodiment, the second node comprises a Secondary eNodeB (SgNB), while the third node comprises a Master eNodeB (MeNB).

In one embodiment, the second node comprises a Distributed Unit (DU), while the third node comprises a CU.

In one embodiment, the second node comprises a node in an SCG, while the third node comprises a node in an MCG.

In one embodiment, the second node comprises a maintenance base station for a P Cell, while the third node comprises a maintenance base station for a PSCell.

In one embodiment, the second node comprises a maintenance base station for a PSCell, while the third node comprises a maintenance base station for a PCell.

In one embodiment, the second node corresponds to the first entity, while the third node corresponds to the second entity.

In one embodiment, the second node corresponds to the second entity, while the third node corresponds to the first entity.

Embodiment 8B

Embodiment 8B illustrates a schematic diagram of a first timer according to one embodiment of the present application, as shown in FIG. 8B. In FIG. 8B, the horizontal axis represents time; the slash-filled rectangle represents running time of a first timer, and the blank rectangle represents remaining time of the first timer; a first time, a second time and a third time are three instances of time in an ascending order; a time interval between the second time and the first time is equal to a first time length, while a time interval between the third time and the first time is equal to a first expiration value.

In Embodiment 8B, at the first time, as a response to the action of triggering a second recovery procedure, starting a first timer; at the second time, as a response to the first condition set being satisfied, stopping the first timer; at the third time, as a response to the running time of the first timer reaching the first expiration value, determining that the first timer is expired.

In one embodiment, the sentence that "as a response to the action of triggering a second recovery procedure, starting a first timer" comprises: when the second recovery procedure is triggered, starting the first timer.

In one embodiment, the sentence that "as a response to the action of triggering a second recovery procedure, starting a first timer" comprises: as a response to the action of triggering the second recovery procedure, determining that a random access procedure is started, and following initialization of the random access procedure, starting the first timer.

In one embodiment, the meaning of starting includes to start.

In one embodiment, the action of starting a first timer includes a meaning that: the first timer starts running.

In one embodiment, the action of starting a first timer includes a meaning that: the first timer begins to count time.

In one embodiment, the action of starting a first timer includes a meaning that: the first timer begins to count time from 0.

In one embodiment, the sentence that "as a response to the first condition set being satisfied, stopping the first timer" comprises: when the first condition set is satisfied, stopping the first timer.

In one embodiment, the sentence that "as a response to the first condition set being satisfied, stopping the first timer" comprises: as a response to the first condition set being satisfied, stopping the second recovery procedure, and as a response to the action of stopping the second recovery procedure, stopping the first timer.

In one embodiment, the sentence that "as a response to the first condition set being satisfied, stopping the first timer" comprises that: as a response to the first condition set being satisfied, stopping the second recovery procedure, and as a response to the action of stopping the second recovery procedure, stopping the random access procedure in the second recovery procedure, and as a response to the action of stopping the random access procedure in the second recovery procedure, stopping the first timer.

In one embodiment, when the first condition set is satisfied, if the first timer is running, the first timer is stopped.

In one embodiment, when the first condition set is satisfied, if the first timer is running and the first timer is no larger than the first expiration value, the first timer is stopped.

In one embodiment, the meaning of stopping includes to stop.

In one embodiment, the action of stopping the first timer includes a meaning that: the first timer does not continue running.

In one embodiment, the action of stopping the first timer includes a meaning that: the first timer does not continue to count time.

In one embodiment, the first expiration value refers to a maximum running time of the first timer.

In one embodiment, when the running time of the first timer reaches the first expiration value, the first timer is expired.

In one embodiment, the first expiration value is indicated by a field in an RRC message, the field comprising a beamFailureRecoveryTimer.

In one embodiment, the first expiration value comprises a positive integer number of slot(s).

In one embodiment, the first expiration value comprises a positive integer number of millisecond(s).

In one embodiment, the first expiration value is used to determine a maximum time interval of CFRA.

In one embodiment, when the first timer reaches the first expiration value, the second recovery procedure is failed.

In one embodiment, when the first timer reaches the first expiration value, CFRA can no longer be performed by the random access procedure in the second recovery procedure.

In one embodiment, when the first timer reaches the first expiration value, CFRA can no longer be used by the random access procedure in the second recovery procedure.

In one embodiment, an initial value of the first timer equals 0.

In one embodiment, the first timer is for the first cell.

In one embodiment, the first timer is for a link in the first cell.

In one embodiment, the first timer is for a TRP in the first cell.

In one embodiment, the first timer includes a timer.

In one embodiment, the first timer is a MAC layer timer.

In one embodiment, the first time length is no greater than the first expiration value.

In one embodiment, remaining time of the first timer refers to a difference between the first expiration value of the first timer and the running time of the first timer.

In one embodiment, the first timer includes a beamFailureRecoveryTimer.

In one embodiment, the first timer is configured to be used to determine a usage of CFRA.

In one embodiment, the phrase that the first signaling is used to indicate a first expiration value comprises that: the first expiration value is a field in the first signaling.

In one embodiment, the phrase that the first signaling is used to indicate a first expiration value comprises that: the first expiration value is configured through the first signaling.

Embodiment 9A

Embodiment 9A illustrates a structure block diagram of a processing device used in a first node according to one embodiment of the present application; as shown in FIG. 9A. In FIG. 9A, a processing device 900 in a first node comprises a first receiver 901, a first transceiver 902 and a first transmitter 903.

The first receiver 901 receives a first signaling, the first signaling being used to determine a first measurement configuration set, the first measurement configuration set being associated with a first index; receives a second signaling, the second signaling being used to determine a first conditional configuration set, the first conditional configuration set comprising the first index; when the first conditional configuration set comes from a first entity, performs a measurement according to the first measurement configuration set; when the first conditional configuration set comes from a second entity, performs a measurement according to a second measurement configuration set.

In Embodiment 9A, the first measurement configuration set is a measurement configuration set in a first measurement configuration storage space, the first measurement configuration storage space comprising at least one measurement configuration set; the first index is a non-negative integer; the first measurement configuration set and the second measurement configuration set are different.

In one embodiment, the first signaling comprises all or part of a RRCReconfiguration message.

In one embodiment, the first signaling comprises all or part of a RRCConnectionReconfiguration message.

In one embodiment, the first signaling comprises a Radio Resource Control (RRC) Message.

In one embodiment, the second measurement configuration set is associated with the first index.

In one subembodiment, the phrase that the second measurement configuration set is associated with the first index comprises that: the second measurement configuration set comprises the first index.

In one subembodiment, the phrase that the second measurement configuration set is associated with the first index comprises that: the second measurement configuration set is identified by the first index.

In one embodiment, the second measurement configuration set comprises the second index, the second index being associated with the first index.

The first receiver 901 receives a third signaling, the third signaling comprising the first threshold.

The first transmitter 903 transmits a fourth signaling.

In one embodiment, as a response to receiving the first signaling, a fourth signaling is transmitted.

In one embodiment, the fourth signaling indicates that the first signaling is successfully received.

In one embodiment, the fourth signaling indicates that configurations comprised in a first signaling are successfully performed.

The first transmitter 903 transmits a fifth signaling.

In one embodiment, the fifth signaling indicates that the second signaling is successfully received.

In one embodiment, the fifth signaling indicates that configurations comprised in a second signaling are successfully performed.

In one embodiment, the first receiver 901 comprises the antenna 452, the receiver 454, the multi-antenna receiving processor 458, the receiving processor 456, the controller/processor 459, the memory 460 and the data source 467 in FIG. 4 of the present application.

In one embodiment, the first receiver 901 comprises the antenna 452, the receiver 454, the multi-antenna receiving processor 458 and the receiving processor 456 in FIG. 4 of the present application.

In one embodiment, the first receiver 901 comprises the antenna 452, the receiver 454 and the receiving processor 456 in FIG. 4 of the present application.

In one embodiment, the first transceiver 902 comprises the antenna 452, the receiver 454, the multi-antenna receiving processor 458, the receiving processor 456, the controller/processor 459, the memory 460 and the data source 467, the transmitter 454, the multi-antenna transmitting processor 457 and the transmitting processor 468 in FIG. 4 of the present application.

In one embodiment, the first transceiver 902 comprises the antenna 452, the receiver 454, the multi-antenna receiving processor 458, the receiving processor 456, the transmitter 454, the multi-antenna transmitting processor 457 and the transmitting processor 468 in FIG. 4 of the present application.

In one embodiment, the first transceiver 902 comprises the antenna 452, the receiver 454, the receiving processor 456, the transmitter 454 and the transmitting processor 468 in FIG. 4 of the present application.

In one embodiment, the first transmitter 903 comprises the antenna 452, the transmitter 454, the multi-antenna transmitting processor 457, the transmitting processor 468, the controller/processor 459, the memory 460 and the data source 467 in FIG. 4 of the present application.

In one embodiment, the first transmitter 903 comprises the antenna 452, the transmitter 454, the multi-antenna transmitting processor 457 and the transmitting processor 468 in FIG. 4 of the present application.

In one embodiment, the first transmitter 903 comprises the antenna 452, the transmitter 454 and the transmitting processor 468 in FIG. 4 of the present application.

Embodiment 9B

Embodiment 9B illustrates a schematic diagram of a measurement for a given signal set being used to determine a link failure of a given connection according to one embodiment of the present application, as shown in FIG. 9B. In FIG. 9B, each step represents a step, it should be particularly noted that the sequence order of each box herein does not imply a chronological order of steps marked respectively by these boxes.

In Embodiment 9B, the first node receives a given signal set in step S901, and enters into step S902 and returns to the step S901 to continue receiving the given signal set; in step S902, determines whether a received quality of each reference signal resource in the given signal set is lower than a given threshold, when it is determined that the received quality of each reference signal resource in the given signal set is lower than the given threshold, enters into step S903, otherwise, the next step is abandoned; in step S903, as a response to the received quality of each reference signal resource in the given signal set being lower than the given threshold, reporting to a higher layer a given indication used for updating a given counter; updates the given counter in step S904; determines that the given counter reaches a given value in step S905; and in step S906, as a response to the given counter reaching the given value, determines a link failure of a given connection.

In one embodiment, the sentence that "as a response to the received quality of each reference signal resource in the given signal set being lower than the given threshold, reporting to a higher layer a given indication used for updating a given counter" comprises: when the received quality of each reference signal resource in the given signal set is lower than the given threshold, reporting to a higher layer a given indication, the given indication being used for updating a given counter.

In one embodiment, the sentence that "as a response to the received quality of each reference signal resource in the given signal set being lower than the given threshold, reporting to a higher layer a given indication used for updating a given counter" comprises: upon reception of a given indication, updating a given counter, the given indication being transmitted to the upper layers from a lower layer, where the received quality of each reference signal resource in the given signal set being lower than the given threshold is used to trigger a said given indication.

In one embodiment, updating a given counter comprises: the given counter being incremented by a first step-size.

In one embodiment, updating a given counter comprises: the given counter being decremented by a first step-size.

In one embodiment, updating a given counter comprises: when the given counter is determined to be updated, adjusting the given counter by a first step-size.

In one embodiment, the first step-size is a non-negative integer.

In one embodiment, the first step-size is equal to 0.

In one embodiment, the first step-size is equal to 1.

In one embodiment, the first step-size is larger than 1.

In one embodiment, the upper layer includes a MAC layer.

In one embodiment, the upper layer includes a Layer 2 (L2).

In one embodiment, the upper layers are above a MAC layer.

In one embodiment, the lower layer is below a MAC layer.

In one embodiment, the lower layer includes a Layer 2 (L2).

In one embodiment, the lower layer includes a Layer 1 (L1).

In one embodiment, the lower layer includes a physical layer (i.e., PHY).

In one embodiment, the phrase of reporting to a higher layer a given indication used for updating a given counter comprises that: the lower layer of the first node transmits the given indication to an upper layer of the first node.

In one embodiment, the phrase of reporting to a higher layer a given indication used for updating a given counter comprises that: the physical layer of the first node transmits the given indication to a MAC layer of the first node.

In one embodiment, the given indication comprises a beam failure instance indication.

In one subembodiment, the beam failure instance indication includes beam failure instance indication.

In one subembodiment, the beam failure instance indication is used to indicate an occurrence of a beam failure instance.

In one embodiment, the given indication comprises a LBT failure indication.

In one subembodiment, the beam failure instance indication includes LBT failure indication.

In one subembodiment, the beam failure instance indication is used to indicate an LBT failure.

In one embodiment, the given indication is for the first cell.

In one embodiment, the given indication is for a TRP in the first cell.

In one embodiment, the given indication carries a cell identity.

In one embodiment, the given indication carries a TRP identifier.

In one embodiment, the given indication does not carry a cell identity.

In one embodiment, the meaning of reaching includes being equal to.

In one embodiment, the meaning of reaching includes being greater than.

In one embodiment, the meaning of reaching includes being no less than.

In one embodiment, the given value is configurable.

In one embodiment, the given value is preconfigured.

In one embodiment, the given value is a positive integer.

In one embodiment, the given value comprises beamFailureInstanceMaxCount.

In one embodiment, the given value comprises lbt-FailureInstanceMaxCount.

In one embodiment, the given value is configured via an RRC signaling.

In one embodiment, the given value is configured via one of an RRCReconfiguration message, or an RRCResume message, or an RRCSetup message, or a SIB1 message.

In one embodiment, the given value is configured via an RRC message, where names of an Information Element (IE) in the RRC message include RadioLinkMonitoringConfig.

In one embodiment, the given value for the first counter is different from the given value for the second counter.

In one embodiment, the given value for the first counter is identical to the given value for the second counter.

In one embodiment, the action of continuing receiving the given signal set comprises: receiving the given signal set according to measurement configurations.

In one embodiment, the action of continuing receiving the given signal set comprises: receiving the given signal set at a time of receiving a next reference signal.

In one embodiment, the action of continuing receiving the given signal set comprises: with the given signal set being periodically configured, the first node receiving the given signal set within a next period.

In one embodiment, the phrase that the next step is abandoned comprises: dropping a reporting to higher layers of a given indication used for updating a given counter.

In one embodiment, the phrase that the next step is abandoned comprises: not executing the step S903.

In one embodiment, the given signal set includes a first signal set, the given threshold includes a first threshold, the given counter includes a first counter, and the given indication includes a first-type indication, the given condition includes a first condition, and the given connection includes the first connection.

In one embodiment, the given signal set includes a second signal set, the given threshold includes a second threshold, the given counter includes a second counter, and the given indication includes a second-type indication, the given condition includes a second condition, and the given connection includes the second connection.

In one embodiment, the given signal set includes a third signal set, the given threshold includes a third threshold, the given counter includes a third counter, and the given indication includes a third-type indication, the given condition includes a third condition, and the given connection includes the third connection.

In one subembodiment, before the action of determining the link failure of the first connection, the link failure of the third connection is determined.

In one subembodiment, a measurement of the third signal set is used to determine the link failure of the third connection.

In one embodiment, when the link failure of the first connection is determined, there occurs the link failure in any connection other than the second connection.

In one embodiment, when the link failure of the first connection is determined, there exists at least one link where the link failure does not occur.

In one embodiment, when the link failure of the second connection is determined, the link failure occurs in all links.

In one embodiment, the phrase that a measurement of the first signal set is used to determine the link failure of the first connection comprises that: as a response to the received quality of each reference signal resource in the first signal set being lower than a first threshold, reporting to the higher layers a first-type indication used for updating a first counter, when the first counter reaches a first value, determining the link failure of the first connection.

In one embodiment, the phrase that a measurement of the second signal set is used to determine the link failure of the second connection comprises that: as a response to the received quality of each reference signal resource in the second signal set being lower than a second threshold, reporting to the higher layers a second-type indication used for updating a second counter, when the second counter reaches a second value, determining the link failure of the second connection.

In one embodiment, a received quality of each reference signal resource in the first signal set is a Reference Signal Received Power (RSRP).

In one embodiment, a received quality of each reference signal resource in the first signal set is a L1-RSRP.

In one embodiment, a received quality of each reference signal resource in the first signal set is a Signal-to-noise and interference ratio (SINR).

In one embodiment, a received quality of each reference signal resource in the first signal set is a L1-SINR.

In one embodiment, a received quality of each reference signal resource in the first signal set is a BLock Error Rate (BLER).

In one embodiment, the first threshold is a real number.

In one embodiment, the first threshold is a non-negative real number.

In one embodiment, the first threshold is a non-negative real number no greater than 1.

In one embodiment, the first threshold is one of Qout_L, QoutLR_SSB or Qout_LR_CSI-RS.

In one embodiment, for definitions of the Qout_L, Qout_LR_SSB and Qout_LR_CSI-RS, refer to 3GPP TS38.133.

In one embodiment, the first threshold is determined by a higher layer parameter rlmInSyncOutOfSyncThreshold.

In one embodiment, as a response to the action of receiving the first-type indication from a lower layer, starting a beamFailureDetectionTimer and updating the first counter.

In one embodiment, a received quality of each reference signal resource in the second signal set is a Reference Signal Received Power (RSRP).

In one embodiment, a received quality of each reference signal resource in the second signal set is a L1-RSRP.

In one embodiment, a received quality of each reference signal resource in the second signal set is a Signal-to-noise and interference ratio (SINR).

In one embodiment, a received quality of each reference signal resource in the second signal set is a L1-SINR.

In one embodiment, a received quality of each reference signal resource in the second signal set is a BLock Error Rate (BLER).

In one embodiment, the second threshold is a real number.

In one embodiment, the second threshold is a non-negative real number.

In one embodiment, the second threshold is a non-negative real number no greater than 1.

In one embodiment, the second threshold is one of Qout_L, Qout_LR_SSB or Qout_LR_CSI-RS.

In one embodiment, for definitions of the Qout_L, Qout_LR_SSB and Qout_LR_CSI-RS, refer to 3GPP TS38.133.

In one embodiment, the second threshold is determined by a higher layer parameter rlmInSyncOutOfSyncThreshold.

In one embodiment, as a response to the action of receiving the first-type indication from a lower layer, starting a beamFailureDetectionTimer and updating the first counter.

Embodiment 10A

Embodiment 10A illustrates a structure block diagram of a processing device used in a second-type node according to one embodiment of the present application; as shown in FIG. 10A. In FIG. 10A, a processing device 1000 in the second-type node comprises a second-type transmitter 1001, a second-type transceiver 1002 and a second-type receiver 1003.

The second-type transmitter 1001 transmits a first signaling, the first signaling being used to determine a first measurement configuration set, the first measurement configuration set being associated with a first index; transmits a second signaling, the second signaling being used to determine a first conditional configuration set, the first conditional configuration set comprising the first index.

In Embodiment 10A, the first measurement configuration set is a measurement configuration set in a first measurement configuration storage space, the first measurement configuration storage space comprising at least one measurement configuration set; the first index is a non-negative integer; when the first conditional configuration set comes from a first entity, a measurement is performed according to the first measurement configuration set; when the first conditional configuration set comes from a second entity, a measurement is performed according to a second measurement configuration set; the first measurement configuration set and the second measurement configuration set are different.

The second-type receiver 1003 receives a fourth signaling.

The second-type receiver 1003 receives a fifth signaling.

In one embodiment, the second-type transmitter 1001 comprises the antenna 420, the transmitter 418, the multi-antenna transmitting processor 471, the transmitting processor 416, the controller/processor 475 and the memory 476 in FIG. 4 of the present application.

In one embodiment, the second-type transmitter 1001 comprises the antenna 420, the transmitter 418, the multi-antenna transmitting processor 471 and the transmitting processor 416 in FIG. 4 of the present application.

In one embodiment, the second-type transmitter 1001 comprises the antenna 420, the transmitter 418 and the transmitting processor 416 in FIG. 4 of the present application.

In one embodiment, the second-type transceiver 1002 comprises the antenna 420, the transmitter 418, the multi-antenna transmitting processor 471, the transmitting processor 416, the controller/processor 475 and the memory 476, the receiver 418, the multi-antenna receiving processor 472, the receiving processor 470 and the memory 476 in FIG. 4 of the present application.

In one embodiment, the second-type transceiver 1002 comprises the antenna 420, the transmitter 418, the multi-antenna transmitting processor 471, the transmitting processor 416, the receiver 418, the multi-antenna receiving processor 472 and the receiving processor 470 in FIG. 4 of the present application.

In one embodiment, the second-type transceiver 1002 comprises the antenna 420, the transmitter 418, the transmitting processor 416, the receiver 418 and the receiving processor 470 in FIG. 4 of the present application.

In one embodiment, the second-type receiver 1003 comprises the antenna 420, the receiver 418, the multi-antenna receiving processor 472, the receiving processor 470, the controller/processor 475 and the memory 476 in FIG. 4 of the present application.

In one embodiment, the second-type receiver 1003 comprises the antenna 420, the receiver 418, the multi-antenna receiving processor 472 and the receiving processor 470 in FIG. 4 of the present application.

In one embodiment, the second-type receiver 1003 comprises the antenna 420, the receiver 418 and the receiving processor 470 in FIG. 4 of the present application.

Embodiment 10B

Embodiment 10B illustrates a schematic diagram of a first condition set comprising a second reference signal resource belonging to a first resource pool according to one embodiment of the present application, as shown in FIG. 10B.

In Embodiment 10B, the first message is used to indicate a first reference signal resource in a first resource pool; the third message is used to indicate a second reference signal resource; the first condition set comprises that the second reference signal resource belongs to the first resource pool, the first resource pool comprising at least one reference signal resource.

In one embodiment, the first condition set comprises receiving the second message, and the first condition set comprises that the second reference signal resource belongs to the first resource pool.

In one embodiment, the first node in the present application receives a first signal pool; determines a link failure of a first connection; and as a response to the action of determining the link failure of the first connection, starts a first recovery procedure; as a response to the action of starting the first recovery procedure, transmits a first message; the first message being used to indicate a first reference signal resource in a first resource pool; as a response to the first message being transmitted, monitors a second message; and during the procedure of monitoring the second message, determines a link failure of a second connection; as a response to the action of determining the link failure of the second connection, triggers a second recovery procedure; and the random access procedure comprised in the second recovery procedure comprises transmitting a third message; the third message being used to indicate a second reference signal resource, and the third message being used to trigger the fourth message; as a response to the third message being transmitted, monitors a fourth message; whether the second recovery procedure is to be stopped is determined according to a first condition set; the first condition set comprising receiving the second message; the first condition set comprises that the second reference signal resource belongs to the first resource pool, the first resource pool comprising at least one reference signal resource.

In one embodiment, the phrase that the first message is used to indicate a first reference signal resource in the first resource pool comprises that: the first message carries the first reference signal resource, the first reference signal resource belonging to the first resource pool.

In one embodiment, the phrase that the first message is used to indicate a first reference signal resource in the first resource pool comprises that: the first message is used to indicate the first reference signal resource, the first reference signal resource being a reference signal resource in the first resource pool.

In one embodiment, the first resource pool is for the first connection.

In one embodiment, the first resource pool is associated with the first connection.

In one embodiment, the first resource pool indicates a candidate beam list related to the first connection.

In one embodiment, the first resource pool comprises at least one reference signal resource, and any reference signal resource in the first resource pool comprises a reference signal used for identifying a candidate beam for recovery.

In one embodiment, the first resource pool is configured via an RRC message.

In one subembodiment, the RRC message includes RRCReconfiguration.

In one embodiment, the first resource pool is configured by an IE in an RRC message.

In one subembodiment, names of the IE include BWP-DownlinkDedicated.

In one subembodiment, names of the IE include BWP-Downlink.

In one subembodiment, names of the IE include Serving-CellConfig.

In one subembodiment, names of the IE include Cell-GroupConfig.

In one subembodiment, names of the IE include BeamFailureRecoverySCellConfig.

In one subembodiment, names of the IE include BeamFailureRecoveryConfig.

In one subembodiment, the IE carries the first identifier.

In one embodiment, the first resource pool is configured by a field in an RRC message.

In one subembodiment, names of the field include candidateBeamRSList.

In one subembodiment, names of the field include candidateBeamRSSCellList.

In one subembodiment, names of the field include CandidateBeamRS.

In one subembodiment, names of the field include candidateBeamConfig.

In one subembodiment, names of the field include ssb.

In one subembodiment, names of the field include csi-RS.

In one subembodiment, the field carries the first identifier.

In one embodiment, the first reference signal resource is a reference signal resource in the first resource pool of which a measurement result meets a first given threshold.

In one subembodiment, the measurement result comprises a CSI-RSRP.

In one subembodiment, the measurement result comprises an SS-RSRP.

In one subembodiment, the measurement result comprises an L1-RSRP.

In one subembodiment, the first given threshold comprises a L1-RSRP threshold.

In one subembodiment, the first given threshold is used to determine whether a candidate beam can be added to the first message.

In one subembodiment, the first given threshold is configured for the first connection.

In one subembodiment, the first given threshold is configured for the first cell.

In one subembodiment, the first given threshold is configured by an IE in an RRC message, where the name of the IE is the same as an IE configuring the first resource pool.

In one subembodiment, the first given threshold is configured by an IE in an RRC message, where the name of the IE is different from an IE configuring the first resource pool.

In one subembodiment, the first given threshold is configured by a field in an RRC message, where the name of the field includes rsrp-ThresholdBFR.

In one subembodiment, the first given threshold is configured by a field in an RRC message, where the name of the field includes rsrp-ThresholdSSB.

In one embodiment, the first reference signal resource satisfies the first given threshold.

In one embodiment, the first reference signal resource comprises a reference signal resource that satisfies the first given threshold.

In one embodiment, the first reference signal resource is a reference signal resource among multiple reference signal resources that satisfy the first given threshold.

In one embodiment, the meaning of satisfying includes at least one of being equal to, or being greater than or being no less than or being higher than.

In one embodiment, the phrase that the third message is used to indicate a second reference signal resource comprises: the third message being associated with the second reference signal resource.

In one embodiment, the phrase that the third message is used to indicate a second reference signal resource comprises: the third message implicitly indicating the second reference signal resource.

In one embodiment, the phrase that the third message is used to indicate a second reference signal resource comprises: the third message explicitly indicating the second reference signal resource.

In one embodiment, the second reference signal resource is a reference signal resource in the second resource pool of which a measurement result meets a second given threshold.

In one subembodiment, the second resource pool is used to determine a list of reference signals of candidate beams for recovery.

In one subembodiment, the second resource pool comprises at least one reference signal resource.

In one subembodiment, the second resource pool is associated with a random access.

In one subembodiment, the second resource pool is associated with a BWP.

In one subembodiment, the second resource pool is associated with one connection among the M connections.

In one subembodiment, the second resource pool is associated with a cell.

In one subembodiment, the second resource pool is configured via an RRC message.

In one subsidiary embodiment of the above subembodiment, the RRC message comprises RRCReconfiguration.

In one subembodiment, the second resource pool is configured by an IE in an RRC message.

In one subsidiary embodiment of the above subembodiment, the IE comprises CellGroupConfig.

In one subsidiary embodiment of the above subembodiment, the IE comprises ServingCellConfig.

In one subsidiary embodiment of the above subembodiment, the IE comprises a BWP-Uplink.

In one subsidiary embodiment of the above subembodiment, the IE comprises a BWP-UplinkDedicated.

In one subsidiary embodiment of the above subembodiment, the IE comprises BeamFailureRecoveryConfig.

In one subembodiment, the second resource pool is configured by a field in an RRC message.

In one subsidiary embodiment of the above subembodiment, the field comprises a candidateBeamRSList.

In one subsidiary embodiment of the above subembodiment, the field comprises a PRACH-ResourceDedicatedBFR.

In one subsidiary embodiment of the above subembodiment, the field comprises a BFR-SSB-Resource.

In one subsidiary embodiment of the above subembodiment, the field comprises a BFR-CSIRS-Resource.

In one subsidiary embodiment of the above subembodiment, the field comprises an ssb.

In one subsidiary embodiment of the above subembodiment, the field comprises a csi-RS.

In one subembodiment, the second given threshold comprises a L1-RSRP threshold.

In one subembodiment, the second given threshold is used to determine whether a preamble sequence corresponding to the second reference signal resource is selected.

In one subembodiment, the second given threshold is configured for the first connection.

In one subembodiment, the second given threshold is configured for the first cell.

In one subembodiment, the second given threshold is configured by an IE in an RRC message, where the name of the IE is the same as an IE configuring the first resource pool.

In one subembodiment, the second given threshold is configured by an IE in an RRC message, where the name of the IE is different from an IE configuring the first resource pool.

In one subembodiment, the second given threshold is configured by a field in an RRC message, where the name of the field includes rsrp-ThresholdSSB.

In one subembodiment, the second given threshold is configured by a field in an RRC message, where the name of the field includes rsrp-ThresholdCSI-RS.

In one subembodiment, the second given threshold is configured by an IE in an RRC message, where the name of the IE includes RACH-ConfigDedicated.

In one subembodiment, the second reference signal resource is a reference signal resource in the second resource pool.

In one subembodiment, the second reference signal resource is not a reference signal resource in the second resource pool.

In one embodiment, the second reference signal resource is associated with a random access resource.

In one subembodiment, the random access resource comprises a random access sequence, the random access sequence being indicated by a ra-PreambleIndex.

In one subembodiment, the random access resource comprises a random access occasion, the random access occasion being indicated by a ra-OccasionList.

In one subembodiment, the random access resource comprises a search space, the search space being indicated by a recoverySearchSpaceId.

In one embodiment, the second reference signal resource is not associated with a random access resource.

In one embodiment, the phrase that the first condition set comprises that the second reference signal resource belongs to the first resource pool comprises that: when the second reference signal resource belongs to the first resource pool, the first condition set is satisfied; when the second reference signal resource does not belong to the first resource pool, the first condition set is unsatisfied.

In one embodiment, the phrase that the first condition set comprises that the second reference signal resource belongs to the first resource pool comprises that: whether the second reference signal resource belongs to the first resource pool is used to determine whether the first condition set is satisfied.

In one embodiment, the phrase that the second reference signal resource belongs to the first resource pool comprises that: the second reference signal resource is a reference signal resource in the first resource pool.

In one embodiment, the phrase that the second reference signal resource belongs to the first resource pool comprises that: the second reference signal resource is identical to a reference signal resource in the first resource pool.

In one embodiment, the phrase that the second reference signal resource belongs to the first resource pool comprises that: within the second recovery procedure, a selected preamble sequence is associated with the second reference signal resource, the second reference signal resource being a reference signal resource in the first resource pool.

In one embodiment, the phrase that the first resource pool comprises at least one reference signal resource comprises that: the first resource pool comprises one reference signal resource.

In one embodiment, the phrase that the first resource pool comprises at least one reference signal resource comprises that: the first resource pool comprises multiple reference signal resources.

In one embodiment, any reference signal resource in the first resource pool is used to indicate a beam.

In one embodiment, any reference signal resource in the first resource pool is used to indicate an antenna port.

In one embodiment, any reference signal resource in the first resource pool comprises an SSB.

In one embodiment, any reference signal resource in the first resource pool comprises a CSI-RS.

In one embodiment, each reference signal resource in a first resource pool is associated with a CORESETPoolIndex.

In one embodiment, a CORESETPoolIndex associated with each reference signal resource in a first resource pool is 1.

In one embodiment, there are at least two reference signal resources in a first resource pool being respectively associated with two CORESETPoolIndexes.

In one embodiment, when a reference signal resource is indicated by a tci-StatesPDCCH-ToAddList of a CORESET, the reference signal resource is associated with a CORESETPoolIndex of the CORESET.

In one embodiment, when a reference signal resource is indicated by a tci-StatesPDCCH-ToReleaseList of a CORESET, the reference signal resource is associated with a CORESETPoolIndex of the CORESET.

In one embodiment, when a reference signal resource is indicated by a MAC CE, the reference signal resource is associated with a CORESETPoolIndex indicated by the MAC CE, the MAC CE being used for activation or deactivation of a TCI state of a PDSCH.

Embodiment 11

Embodiment 11 illustrates a structure block diagram of a processing device used in a first node according to one embodiment of the present application; as shown in FIG. 11. In FIG. 11, a processing device 1100 in the first node comprises a first receiver 1101 and a first transmitter 1102.

The first receiver 1101 receives a first signal pool, the first signal pool comprising a first signal set and a second signal set; determines a link failure of a first connection; and monitors a second message; determines a link failure of a second connection; and the first transmitter 1102, as a response to the action of determining the link failure of the first connection, starts a first recovery procedure; as a response to the action of starting the first recovery procedure, transmits a first message; as a response to the action of determining the link failure of the second connection, triggers a second recovery procedure; and whether the second recovery procedure is to be stopped is determined according to a first condition set; the first condition set comprising receiving the second message.

In Embodiment 11, each of the first signal set and the second signal set respectively comprises at least one reference signal resource, and there exists at least one reference signal resource that only belongs to one of the first signal set or the second signal set; a measurement of the first signal set is used to determine the link failure of the first connection; a measurement of the second signal set is used to determine the link failure of the second connection; only a latter one of the first recovery procedure and the second recovery procedure is related to a random access procedure; the first recovery procedure comprises triggering a first link failure; the first message is related to the link failure of the first connection.

In one embodiment, the first message comprises a first identifier, the first identifier being used to indicate the link failure of the first connection.

In one embodiment, the phrase that a measurement of the first signal set is used to determine the link failure of the first connection comprises that: as a response to a received quality of each reference signal resource in the first signal set being lower than a first threshold, reporting to higher layers a first-type indication used for updating a first counter; the phrase that a measurement of the second signal set is used to determine the link failure of the second connection comprises: as a response to a received quality of each reference signal resource in the second signal set being lower than a second threshold, reporting to higher layers a second-type indication used for updating a second counter.

In one embodiment, the first receiver 1101 monitors a fourth message; herein, the random access procedure comprised in the second recovery procedure comprises transmitting a third message, the third message being used to trigger the fourth message.

In one embodiment, the first receiver 1101, as a response to the second recovery procedure being successfully completed, stops the first recovery procedure; the second recovery procedure being successfully completed comprises receiving the fourth message.

In one embodiment, the first message is used to indicate a first reference signal resource in a first resource pool; the third message is used to indicate a second reference signal resource; the first condition set comprises that the second reference signal resource belongs to the first resource pool, the first resource pool comprising at least one reference signal resource.

In one embodiment, the first receiver 1101, as a response to the first condition set being satisfied, cancels the first link failure.

In one embodiment, the first receiver 1101 receives a first signaling; as a response to the action of triggering a second recovery procedure, starts a first timer; and as a response to the first condition set being satisfied, stops the first timer; herein, the first signaling is used to indicate a first expiration value.

In one embodiment, the first receiver 1101 comprises the antenna 452, the receiver 454, the multi-antenna receiving processor 458, the receiving processor 456, the controller/processor 459, the memory 460 and the data source 467 in FIG. 4 of the present application.

In one embodiment, the first receiver 1101 comprises the antenna 452, the receiver 454, the multi-antenna receiving processor 458 and the receiving processor 456 in FIG. 4 of the present application.

In one embodiment, the first receiver 1101 comprises the antenna 452, the receiver 454 and the receiving processor 456 in FIG. 4 of the present application.

In one embodiment, the first transmitter 1102 comprises the antenna 452, the transmitter 454, the multi-antenna transmitting processor 457, the transmitting processor 468, the controller/processor 459, the memory 460 and the data source 467 in FIG. 4 of the present application.

In one embodiment, the first transmitter 1102 comprises the antenna 452, the transmitter 454, the multi-antenna transmitting processor 457 and the transmitting processor 468 in FIG. 4 of the present application.

In one embodiment, the first transmitter 1102 comprises the antenna 452, the transmitter 454 and the transmitting processor 468 in FIG. 4 of the present application.

Embodiment 12

Embodiment 12 illustrates a structure block diagram of a processing device used in a second node according to one embodiment of the present application; as shown in FIG. 12. In FIG. 12, a processing device 1200 in a second node comprises a second transmitter 1201 and a second receiver 1202.

The second transmitter 1201 transmits a first signal pool, the first signal pool comprising a first signal set and a second signal set; and as a response to receiving a first message, transmits a second message;

the second receiver 1202 receives the first message.

In Embodiment 12, a link failure of a first connection is determined; as a response to the link failure of the first connection being determined, a first recovery procedure is started; a link failure of a second connection is determined; as a response to the link failure of the second connection being determined, a second recovery procedure is triggered; whether the second recovery procedure is to be stopped is determined according to a first condition set; the first condition set comprising the second message being received; each of the first signal set and the second signal set respectively comprises at least one reference signal resource, and there exists at least one reference signal resource that only belongs to one of the first signal set or the second signal set; a measurement of the first signal set is used to determine the link failure of the first connection; a measurement of the second signal set is used to determine the link failure of the second connection; only a latter one of the first recovery procedure and the second recovery procedure is related to a random access procedure; the first recovery procedure comprises triggering a first link failure; the first message is related to the link failure of the first connection.

In one embodiment, the first message comprises a first identifier, the first identifier being used to indicate the link failure of the first connection.

In one embodiment, the phrase that a measurement of the first signal set is used to determine the link failure of the first connection comprises that: as a response to a received quality of each reference signal resource in the first signal set being lower than a first threshold, reporting to higher layers a first-type indication used for updating a first counter; the phrase that a measurement of the second signal set is used to determine the link failure of the second connection comprises: as a response to a received quality of each reference signal resource in the second signal set being lower than a second threshold, reporting to higher layers a second-type indication used for updating a second counter.

In one embodiment, the second transmitter 1201, as a response to receiving a third message, transmits a fourth message; herein, the random access procedure comprised in the second recovery procedure comprises the third message being transmitted, the third message being used to trigger the fourth message.

In one embodiment, as a response to the second recovery procedure being successfully completed, the first recovery procedure is stopped; the second recovery procedure being successfully completed comprises the fourth message being received.

In one embodiment, the first message is used to indicate a first reference signal resource in a first resource pool; the third message is used to indicate a second reference signal resource; the first condition set comprises that the second reference signal resource belongs to the first resource pool, the first resource pool comprising at least one reference signal resource.

In one embodiment, as a response to the first condition set being satisfied, the first link failure is canceled.

In one embodiment, the second transmitter 1201 transmits a first signaling; herein, as a response to the second recovery procedure being triggered, a first timer is started; as a response to the first condition set being satisfied, the first timer is stopped; the first signaling is used to indicate a first expiration value.

In one embodiment, the second transmitter 1201 comprises the antenna 420, the transmitter 418, the multi-antenna transmitting processor 471, the transmitting processor 416, the controller/processor 475 and the memory 476 in FIG. 4 of the present application.

In one embodiment, the second transmitter 1201 comprises the antenna 420, the transmitter 418, the multi-antenna transmitting processor 471 and the transmitting processor 416 in FIG. 4 of the present application.

In one embodiment, the second transmitter 1201 comprises the antenna 420, the transmitter 418 and the transmitting processor 416 in FIG. 4 of the present application.

In one embodiment, the second receiver 1202 comprises the antenna 420, the receiver 418, the multi-antenna receiving processor 472, the receiving processor 470, the controller/processor 475 and the memory 476 in FIG. 4 of the present application.

In one embodiment, the second receiver 1202 comprises the antenna 420, the receiver 418, the multi-antenna receiving processor 472 and the receiving processor 470 in FIG. 4 of the present application.

In one embodiment, the second receiver 1202 comprises the antenna 420, the receiver 418 and the receiving processor 470 in FIG. 4 of the present application.

Embodiment 13

Embodiment 13 illustrates a schematic diagram of a relation between a first connection and a second connection according to one embodiment of the present application, as shown in FIG. 13. In FIG. 13, the ellipse framed with thick broken lines represents a first cell, where a first sub-node and a second sub-node belong to the first cell, and the first sub-node is in connection with the second sub-node via a backhaul link; the double-dot-dash ellipse represents a first connection, while the dot-dash ellipse represents a second connection; an ellipse with continuous thin line or an ellipse with thin clashed-lines represents a beam, the first sub-node comprises at least one beam, the second sub-node comprises at least one beam, and the first node comprises at least one beam; the ellipsis represents there being no (0) beam or multiple beams.

In one embodiment, the dashed-line ellipse exists.

In one embodiment, the dashed-line ellipse does not exist.

In one embodiment, each of the first sub-node and the second sub-node respectively comprises one TRP.

In one embodiment, the first cell can schedule resources of multiple TRPs for the first node.

In one embodiment, the TRP comprises a network node that transmits radio signal(s) to the first node and receives a radio signal(s) from the first node.

In one embodiment, each of the first sub-node and the second sub-node respectively comprises one Distributed Unit (DU).

In one embodiment, each of the first sub-node and the second sub-node respectively comprises one base station.

In one embodiment, the backhaul link is a wired backhaul.

In one embodiment, the backhaul link is connected via optical fiber.

In one embodiment, the backhaul link is a Wireless Backhaul.

In one embodiment, the backhaul link is an Ideal Backhaul.

In one embodiment, the backhaul link is a Non-ideal Backhaul.

In one embodiment, the first connection includes a connection between the first sub-node and the first node.

In one embodiment, the first connection includes a connection between at least one beam of the first sub-node and at least one beam of the first node.

In one embodiment, the second connection includes a connection between the second sub-node and the first node.

In one embodiment, the second connection includes a connection between at least one beam of the second sub-node and at least one beam of the first node.

In one embodiment, each beam of the first sub-node and each beam of the second sub-node belong to the first cell.

In one embodiment, each beam of the first sub-node and each beam of the second sub-node share a cell identity of the first cell.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE), comprising:
a receiver configured to:
    receive a first measurement configuration set that is associated with a first index, and
    receive signaling that indicates a conditional configuration set comprising the first index,
wherein the UE is configured to modify a first stored conditional configuration set according to the signaling in response to receiving the signaling from a first entity, and modify a second stored conditional configuration set according to the signaling in response to receiving the signaling from a second entity,
wherein the UE is configured to perform a measurement according to the first measurement configuration set in response to receiving the signaling from the first entity, and perform the measurement according to a second measurement configuration set in response to receiving the signaling from the second entity,
wherein the first measurement configuration set and the second measurement configuration set are different.

2. The UE according to claim 1, wherein the UE is configured to set a first measurement configuration storage space in response to receiving the first measurement configuration set.

3. The UE according to claim 1, wherein the first measurement configuration set is identified by the first index, and the first index comprises all or part of a measId field.

4. The UE according to claim 1, wherein the first measurement configuration set comprises a second index, the second index is associated with the first index, and the first index comprises a measId field and the second index comprises a condReconfigId.

5. The UE according to claim 1, wherein receiving the signaling from the first entity includes:
    receiving the signaling via a Signaling Radio Bearer3 (SRB3),
    receiving the signaling by a Radio Resource Control (RRC) message that is embedded in another RRC message, which is received via an SRB1,
    the signaling is configured by the first entity, or
    the signaling is generated by the first entity.

6. The UE according to claim 1, wherein the first entity comprises a Secondary Cell Group (SCG), while the second entity comprises a Master Cell Group (MCG), or the first entity comprises a Secondary Node (SN), while the second entity comprises a Master Node (MN).

7. The UE according to claim 1, wherein the first index is a non-negative integer; the first index is no greater than 64.

8. The UE according to claim 1, wherein the modifying includes adding, deleting or replacing.

9. The UE according to claim 1, wherein the signaling received from the first entity indicates that the conditional configuration set comes from the first entity, and the signaling received from the second entity indicates that the conditional configuration set comes from the second entity.

10. The UE according to claim 1, wherein the first index indicates that the conditional configuration set comes from the first entity or the second entity.

11. The UE according to claim 1, wherein the first conditional configuration set comprises a field that indicates that the conditional configuration set comes from the first entity or comes from the second entity.

12. The UE according to claim 1, wherein the second measurement configuration set is associated with the first index.

13. The UE according to claim 1, wherein the second measurement configuration set is a measurement configuration set in a first measurement configuration storage space.

14. A base station, comprising:
a transmitter configured to transmit a first measurement configuration set that is associated with a first index and transmit signaling that indicates a conditional configuration set comprising the first index,
wherein a first stored conditional configuration set is modified according to the signaling in response to the signaling being received from a first entity, and a second stored conditional configuration set is modified according to the signaling in response to the signaling being received from a second entity,
wherein a measurement is performed according to the first measurement configuration set in response to the signaling being received from the first entity, and a measurement is performed according to a second measurement configuration set in response to the signaling being received from the second entity, and the first measurement configuration set and the second measurement configuration set are different.

15. The base station according to claim 14, wherein the signaling being received from the first entity indicates that the conditional configuration set comes from the first entity, and the signaling being received from the second entity indicates that the conditional configuration set comes from the second entity.

16. A method, comprising:

receiving a first measurement configuration set that is associated with a first index;

receiving a signaling that indicates a conditional configuration set comprising the first index;

modifying a first stored conditional configuration set according to the signaling in response to receiving the signaling from a first entity, and modifying a second stored conditional configuration set according to the signaling in response to receiving the signaling from a second entity; and performing a measurement according to the first measurement configuration set in response to receiving the signaling from the first entity, and performing the measurement according to a second measurement configuration set in response to receiving the signaling from the second entity, wherein the first measurement configuration set and the second measurement configuration set are different.

\* \* \* \* \*